United States Patent
Clare et al.

(10) Patent No.: US 8,786,440 B2
(45) Date of Patent: *Jul. 22, 2014

(54) CALIBRATION OF BEAMFORMING NODES IN A CONFIGURABLE MONITORING DEVICE SYSTEM

(75) Inventors: Thomas J. Clare, Media, PA (US); Venkat Krishnamurthy, Acton, MA (US)

(73) Assignee: Checkpoint Systems, Inc., Thorofare, NJ (US)

( * ) Notice: Subject to any disclaimer, the term of this patent is extended or adjusted under 35 U.S.C. 154(b) by 707 days.

This patent is subject to a terminal disclaimer.

(21) Appl. No.: 12/878,546

(22) Filed: Sep. 9, 2010

(65) Prior Publication Data

US 2011/0080267 A1    Apr. 7, 2011

Related U.S. Application Data

(60) Provisional application No. 61/248,140, filed on Oct. 2, 2009.

(51) Int. Cl.
   *G08B 13/14*   (2006.01)
   *G06K 7/00*    (2006.01)
   *H04W 16/28*   (2009.01)
   *G08B 13/24*   (2006.01)

(52) U.S. Cl.
   CPC .......... *G06K 7/0008* (2013.01); *G08B 13/2442* (2013.01); *H04W 16/28* (2013.01)
   USPC .................................... 340/572.1; 340/572.2

(58) Field of Classification Search
   CPC .......... G06K 7/0008; G06K 19/07749; G08B 13/2442; H04W 16/28; H04W 88/06
   USPC .......... 340/572.1, 572.2, 572.4, 572.7, 539.1, 340/539.21; 455/562.1, 552.1, 73; 342/418, 342/432, 465
   See application file for complete search history.

(56) References Cited

U.S. PATENT DOCUMENTS

| | | | |
|---|---|---|---|
| 5,546,090 | A | 8/1996 | Roy, III et al. |
| 5,892,441 | A | 4/1999 | Woolley et al. |
| 6,037,898 | A | 3/2000 | Parish et al. |
| 6,208,287 | B1 | 3/2001 | Sikina et al. |
| 6,236,839 | B1 | 5/2001 | Gu et al. |
| 6,252,542 | B1 | 6/2001 | Sikina et al. |
| 6,380,894 | B1 | 4/2002 | Boyd et al. |

(Continued)

FOREIGN PATENT DOCUMENTS

| | | |
|---|---|---|
| EP | 1503518 A1 | 7/2003 |
| EP | 1610258 A1 | 12/2005 |
| WO | 0106401 A1 | 1/2001 |

*Primary Examiner* — John A Tweel, Jr.
(74) *Attorney, Agent, or Firm* — Richard A. Howe, II

(57) ABSTRACT

A system for radio frequency identification of a tag in an interrogation zone, includes a calibration node disposed in the interrogation zone to measure a signal strength of radio frequency identification signals from a beamforming system and provide signal data in accordance with the signal strength. A reader node is configured to receive the signal data and adjust the radio frequency identification signals generated by the beamforming system based upon the signal data. At least one of the calibration node, the reader node and the beamforming system is a configurable monitoring system. The calibration node, the reader node, and the beamforming system are coupled in a feedback control loop. The beamforming system includes a plurality of beamforming nodes. A signal of at least one beamforming node is optimized in accordance with the feedback control loop.

20 Claims, 37 Drawing Sheets

(56) References Cited

U.S. PATENT DOCUMENTS

| | | |
|---|---|---|
| 6,486,769 B1 | 11/2002 | McLean |
| 7,030,761 B2 | 4/2006 | Bridgelall et al. |
| 7,161,489 B2 | 1/2007 | Sullivan et al. |
| 7,187,288 B2 | 3/2007 | Mendolia et al. |
| 7,248,841 B2 * | 7/2007 | Agee et al. .......... 455/132 |
| 7,345,625 B1 | 3/2008 | Urkowitz |
| 7,362,266 B2 | 4/2008 | Collinson |
| 7,378,967 B2 | 5/2008 | Sullivan et al. |
| 7,423,586 B2 | 9/2008 | Schieblich |
| 7,652,577 B1 * | 1/2010 | Madhow et al. ....... 340/572.1 |
| 8,315,327 B2 * | 11/2012 | Agee et al. .......... 375/267 |
| 2002/0042290 A1 | 4/2002 | Williams et al. |
| 2003/0007473 A1 | 1/2003 | Strong et al. |
| 2004/0061644 A1 | 4/2004 | Lier et al. |
| 2004/0108954 A1 | 6/2004 | Richley et al. |
| 2005/0018861 A1 | 1/2005 | Tashev |
| 2005/0141459 A1 | 6/2005 | Li et al. |
| 2006/0022800 A1 | 2/2006 | Krishna et al. |
| 2006/0022815 A1 | 2/2006 | Fischer et al. |
| 2006/0119511 A1 | 6/2006 | Collinson |
| 2006/0135211 A1 | 6/2006 | Chae et al. |
| 2006/0291544 A1 | 12/2006 | Fischer et al. |
| 2007/0149251 A1 | 6/2007 | Jeon |
| 2007/0205955 A1 | 9/2007 | Korisch et al. |
| 2007/0290802 A1 | 12/2007 | Batra et al. |
| 2008/0012710 A1 | 1/2008 | Sadr |
| 2008/0042847 A1 | 2/2008 | Hollister et al. |
| 2008/0061984 A1 | 3/2008 | Breed et al. |
| 2008/0068265 A1 | 3/2008 | Kalliola et al. |
| 2008/0198001 A1 | 8/2008 | Sarma et al. |
| 2008/0242240 A1 | 10/2008 | Rofougaran et al. |
| 2008/0318632 A1 | 12/2008 | Rofougaran et al. |
| 2009/0315685 A1 | 12/2009 | Bauchot et al. |

* cited by examiner

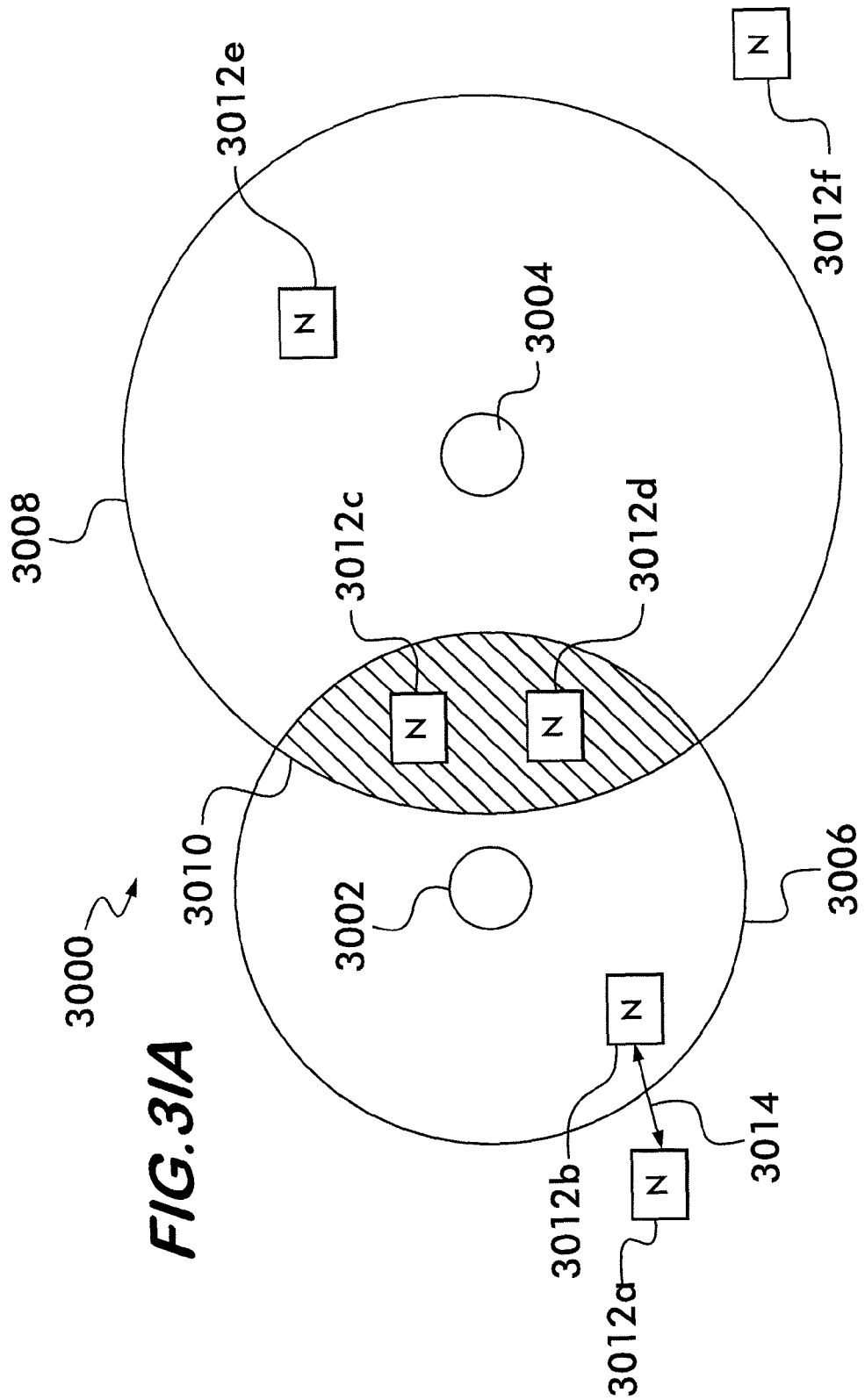

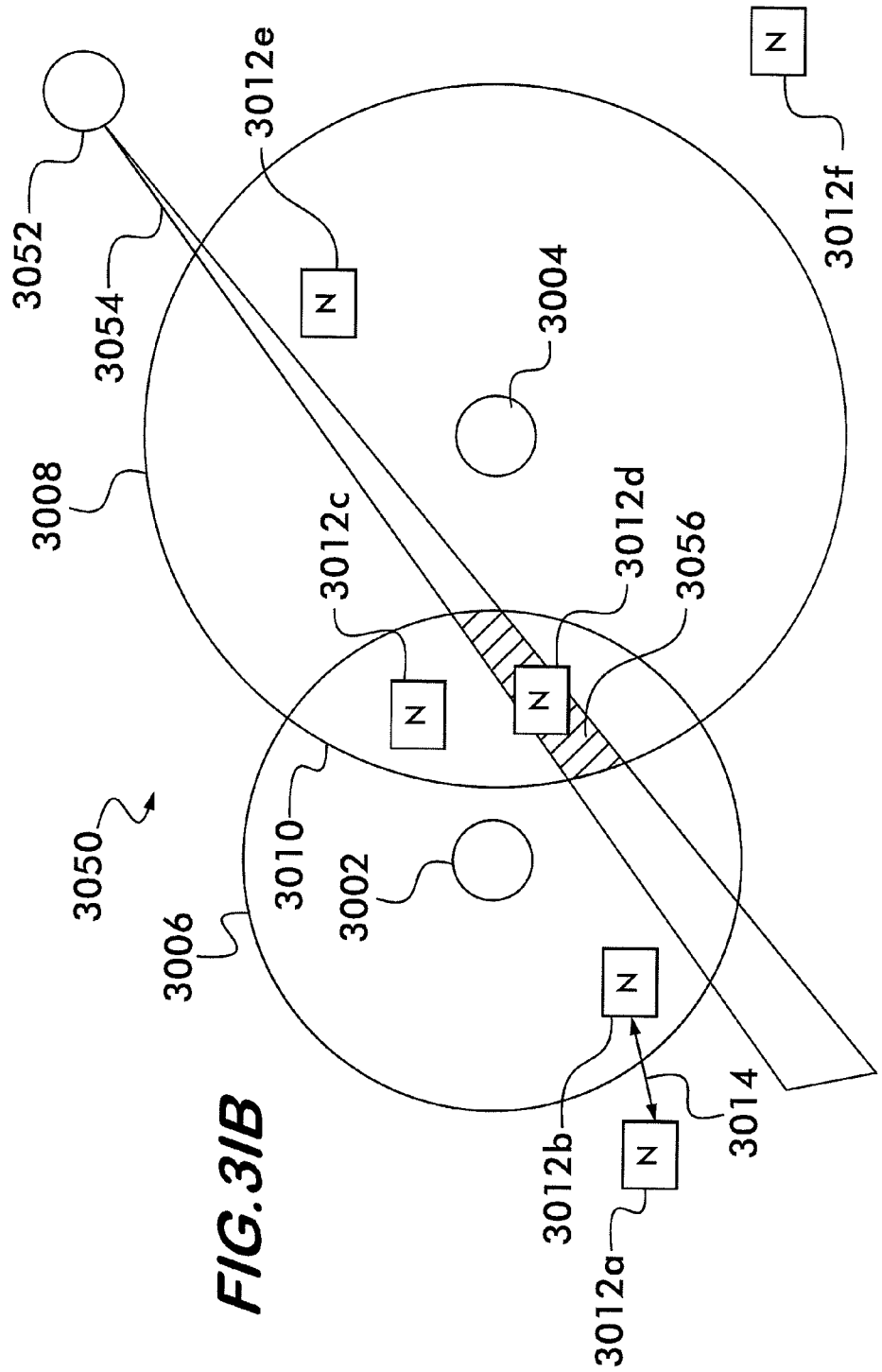

CALIBRATION OF BEAMFORMING NODES IN A CONFIGURABLE MONITORING DEVICE SYSTEM

CROSS-REFERENCE TO RELATED APPLICATIONS

This application claims priority from provisional U.S. patent application Ser. No. 61/248,140 filed Oct. 2, 2009 entitled "COMMUNICATIONS SYSTEMS AND METHODS USING CONFIGURABLE MONITORING DEVICES.".

TECHNOLOGICAL FIELD

Embodiments of the present invention relate generally to communications and systems management technology.

BACKGROUND

Conventional retail security systems, such as electronic article surveillance (EAS) systems, operate effectively to prevent shoplifting and the like. However, conventional systems are often limited to the narrow scope of providing security functionality. For example, an EAS gate located at an exit of a retail business establishment may be configured to alarm when an article with an EAS tag passes through the gate. Other than performing this important alarming functionality, many conventional systems provide nothing more to the users of the systems, such as store owners, store managers, and the like. Additionally, when store owners are considering the purchase and installation of a conventional security system in a retail establishment, the limited functionality offered by the systems can detrimentally affect the cost-benefit analysis of installing and maintaining the system.

BRIEF SUMMARY OF EXEMPLARY EMBODIMENTS

A system for radio frequency identification of a tag in an interrogation zone, includes a calibration node disposed in the interrogation zone to measure a signal strength of radio frequency identification signals from a beamforming system and provide signal data in accordance with the signal strength. A reader node is configured to receive the signal data and adjust the radio frequency identification signals generated by the beamforming system based upon the signal data. At least one of the calibration node, the reader node and the beamforming system is a configurable monitoring system. The calibration node, the reader node, and the beamforming system are coupled in a feedback control loop. The beamforming system includes a plurality of beamforming nodes. A signal of at least one beamforming node is optimized in accordance with the feedback control loop. A signal to noise ratio of at least one beamforming node is optimized in accordance with the feedback control loop. A phase of at least one beamforming node is optimized in accordance with the feedback control loop. The plurality of beamforming nodes form a one dimensional beamforming array or a two dimensional array.

A plurality of tags is arranged in a mesh with tag to tag communication between at least two of the tags in the mesh. A tag within the interrogation zone is localized in accordance with range data based on the tag to tag communication. A tag within the interrogation zone is localized in accordance with a combination of the signal data and range data based on the tag to tag communication. A tag within the interrogation zone is localized in accordance with the signal data and a beacon signal provided within the interrogation zone. The beacon signal has multiple ranges for providing multiple range determinations to localize the tag by performing a logical operation on the multiple range determinations. The beacon signal is provided by a configurable monitoring device configured as a beacon. The signal data is transmitted to the reader node by way of the tag to tag communication. The signal data is transmitted to the reader node by way of network activity nodes. The signal data is transmitted to the reader node by way of a gateway node. The beamformer system receives the signal data and adjusts the radio frequency identification signals based on the signal data. The beamformer system receives the signal data by way of a control radio frequency connection. The beamformer system receives the signal data by way of a hardwired connection.

In a tag communication system, a method includes determining range information representative of a distance between two tags of a plurality of tags, and estimating parameter information representative of backscatter signals of a marker tag and an asset tag. A tag of the plurality of tags is localized in accordance with the range information and the parameter information to provide a localized tag. The range information is determined in accordance with a beacon signal. The system includes a plurality of beacon signals and the method further includes determining the range information in accordance with at least two beacon signals of the plurality of beacon signals. A logical operation is performed on the range information of the at least two beacon signals. A further beacon signal has a plurality of signal ranges and the range information is determined in accordance with the plurality of signal ranges. A logical operation is performed on the range information of the plurality of signal ranges. The parameter information includes antenna array response information, angle information, time of flight information, signal strength information or signal to noise information.

An electromagnetic signal is scanned across a zone including the localized tag using a transmit beamforming array. The scanning is performed using a receive beamforming array with a plurality of antennas configured to receive the modulated backscatter signal from the localized tag. At least one of the localized tag and the beamforming array is a configurable monitoring device. The range information and the parameter information are represented by backscatter signals from two different sources of electromagnetic signals. The tag communication system includes an information gathering node and the range information is communicated to the information gathering node. The range information is communicated to the information gathering node by way of a gateway node.

A plurality of tags is arranged in a mesh and the range information is communicated to the information gathering node by way of the mesh. The mesh includes at least two tags with tag to tag communication and the range information is communicated to the information gathering node by way of the tag to tag communication within the mesh. The range information is communicated to the information gathering node by way of a network activity node. The beacon signal is provided by a configurable monitoring device configured as a beacon. The estimating is performed in accordance with a configurable monitoring device configured as a calibration node in a beamforming feedback loop.

Some example embodiments of the present invention are therefore provided that support security system functionality, as well as additional functionalities that would be beneficial to store owners, store managers, and customers. For example, some example embodiments support inventory and marketing functionality, as well as advanced security functionality.

According to some example embodiments, a system is provided for managing configurable monitoring devices. A configurable monitoring device may be a microprocessor-based wireless communication device that can assume configurable roles or modes of operation within the system. A mode of operation may be implemented based on configuration information stored on the configurable monitoring device. The configuration information may be pre-loaded on the configurable monitoring device, or configurable monitoring devices may receive the configuration information via a wireless connection to a network.

The system, referred to as a monitoring system, may include any number of configurable monitoring devices configured to operate, for example, as a mesh network. Regardless of whether a network in accordance with example embodiments of the present invention is a mesh network, a network may include a gateway node that supports a monitoring terminal (also referred to as a coordinator). The gateway node may operate as an interface between the configurable monitoring device network and the monitoring terminal, for example, via an external network. The monitoring terminal may be configured to interact with the configurable monitoring devices and the configurable monitoring device network to implement a variety of functionalities.

BRIEF DESCRIPTION OF SEVERAL VIEWS OF THE DRAWINGS

The invention will be described in conjunction with the following drawings in which like reference numerals designate like elements and wherein:

FIGS. 31A-D illustrate embodiments of configurable monitoring systems suitable for beamforming and localization of devices in tag communication systems.

DETAILED DESCRIPTION

Figure 1:
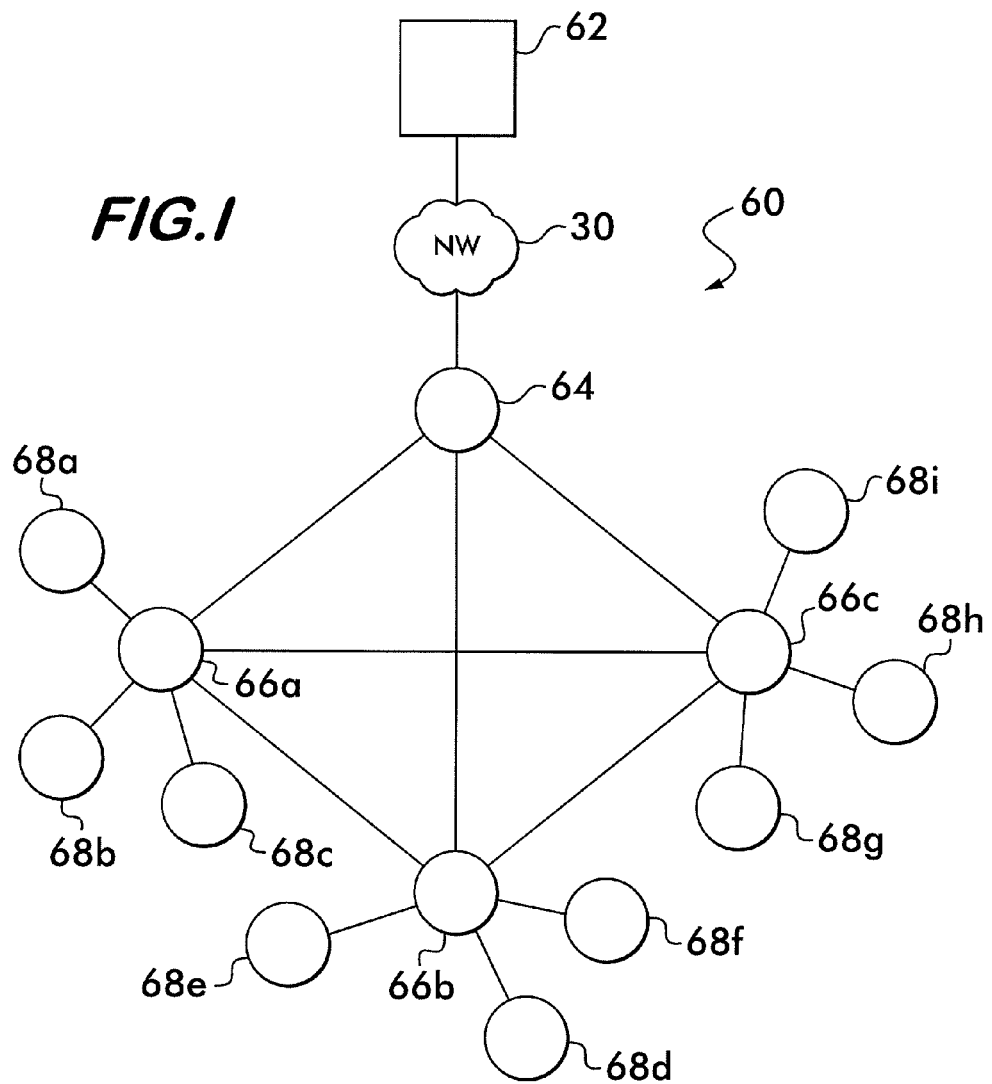
FIG. 1 is a schematic block diagram of a monitoring system including a number of configurable monitoring devices according to an example embodiment of the present invention.

The following disclosure is an improvement on the following U.S. utility applications or provisional applications, namely, U.S. Application Ser. Nos. 61/244,320 filed Sep. 21, 2009 and 61/246,388 filed Sep. 28, 2009 both entitled "A CONFIGURABLE MONITORING DEVICE;" U.S. Application Ser. No. 61/246,393 filed Sep. 28, 2009 entitled "SYSTEMS, METHODS AND APPARATUSES FOR MANAGING CONFIGURABLE MONITORING DEVICES;" U.S. Application Ser. No. 61/246,393 filed Sep. 28, 2009 entitled "SYSTEMS, METHODS AND APPARATUSES FOR MANAGING CONFIGURABLE MONITORING DEVICES;" U.S. Application Ser. No. 60/765,331 filed Feb. 4, 2006 titled "METHODS AND ARCHITECTURES FOR INCREASING RANGE AND RELIABILITY IN RFID SYSTEMS;" Ser. No. 11/702,980 filed Feb. 5, 2007, entitled "SYSTEMS AND METHODS OF BEAMFORMING IN RADIO FREQUENCY IDENTIFICATION APPLICATIONS;" Ser. No. 12/072,423 filed Feb. 25, 2008 titled "LOCALIZING TAGGED ASSETS USING MODULATED BACKSCATTER;" 61/070,024 filed Mar. 20, 2008 titled "FUNCTIONALITY ENHANCEMENT IN RADIO FREQUENCY IDENTIFICATION SYSTEMS;" Ser. No. 12/407,383 filed Mar. 19, 2009 titled "APPLIQUE NODES FOR PERFORMANCE AND FUNCTIONALITY ENHANCEMENT IN RADIO FREQUENCY IDENTIFICATION SYSTEMS;" 61/069,812 filed Mar. 19, 2008 and Ser. No. 12/406,629 filed Mar. 18, 2009 both titled "RANGE EXTENSION AND MULTIPLE ACCESS IN MODULATED BACKSCATTER SYSTEMS," 61/190,791 filed Sep. 3, 2008 and Ser. No. 12/548,993 filed Aug. 27, 2009 both titled "RFID REPEATER FOR RANGE EXTENSION IN MODULATED BACKSCATTER SYSTEMS;" and 61/159,305 filed Mar. 11, 2009 titled "LOCALIZATION USING VIRTUAL ANTENNA ARRAYS IN MODULATED BACKSCATTER RADIO FREQUENCY IDENTIFICATION SYSTEMS."

All of these entire disclosures are incorporated by reference herein.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements Like reference numerals refer to like elements throughout.

As defined herein a "computer-readable storage medium," which refers to a physical storage medium (e.g., volatile or non-volatile memory device), can be differentiated from a "computer-readable transmission medium," which refers to an electromagnetic signal. Additionally, as used herein, the term "circuitry" refers to not only hardware-only circuit implementations including analog and/or digital circuitry, but at least also to combinations of circuits with corresponding software and/or instructions stored on a computer-readable storage medium.

As indicated above, example embodiments of the present invention may be configured to support various security, inventory, marketing, and other functionalities in, for example, a retail sales environment. To do so, configurable monitoring devices may be installed within the retail sales environment. A description of some example embodiments of configurable monitoring devices, and the monitoring systems that may support configurable monitoring devices, is provided in U.S. Provisional Patent Application 61/244,320 filed Sep. 21, 2009, entitled "A Configurable Monitoring Device", the content of which is hereby incorporated by reference in its entirety. The configurable monitoring devices may be wireless communication devices that can be dynamically configured to assume one or more roles within the operation of a monitoring system. To facilitate the ability to dynamically change roles, the configurable monitoring devices may include a processor, memory, communications interface (e.g., radio transmitter/receiver, Radio Frequency ID (RFID) module, or the like). Based on a role that a configurable monitoring device is expected to assume, the configurable monitoring device may also include more specialized hardware components such as, an alarm, a sensor, a display, and the like.

As indicated above, the configurable monitoring devices may assume a variety of roles within the monitoring system. For example, a configurable monitoring device may be configured as a security tag that is affixed to an article via a mounting device. The security tag may be configured to alarm or transmit an alarm message, if the security tag determines that an alarm condition has been met. In another example, a configurable monitoring device may be configured to operate as a node within a monitoring system. As a node, the configurable monitoring device may support communications and message routing within the communications network defined by the system. In this regard, the node may be configured to determine routing paths within the network for the efficient delivery of messages. According to another example, a configurable monitoring device may be configured to operate as a gateway between the monitoring system and an external network such as a wired local area network (LAN) or the Internet. Further, a configurable monitoring device may be configured to operate as a security key for locking and unlocking a mounting device associated with a security tag. In this regard, the security key may be configured to activate or deactivate electronic security features of a security tag. For purposes of explanation, a configurable monitoring device configured to operate in node mode will be referred to as a "node", a configurable monitoring device configured to operate in tag mode will be referred to as a "tag", a configurable monitoring device configured to operate in gateway mode will be referred to as a "gateway", and a configurable monitoring device configured to operate in key mode will be referred to as a "key".

The roles of the configurable monitoring devices described above, and further described below is not an exhaustive list of the roles that may be implemented by the configurable monitoring devices. Additionally, while the various roles may be described separately, it is contemplated that a single configurable monitoring device may be configured to simultaneously assume more than one of the roles.

FIG. 1 illustrates an example monitoring system 60 that includes a number of configurable monitoring devices in various roles. Tags 68 (e.g., tags 68a-68i) may be configurable monitoring devices affixed to a product for the purpose of supporting security, inventory, marketing, as well as other functionalities. Network activity nodes 66 (e.g., nodes 66a-66c) may be configured to support network level activities such as communications routing, tag locating, and the like.

Gateway node 64 may be configured as a gateway node to provide a network interface between the monitoring system 60 and the external network 30. A monitoring terminal 62 may be in communication with the gateway node 64, for example, via the external network 30 or via a direct connection to the gateway node 64, to facilitate management of the configurable monitoring devices by the monitoring terminal 62 and to further facilitate the aggregation and analysis of data received from the configurable monitoring devices. A gateway node may interface with a cellular network to gain access to other networks, such as the Internet. In some example embodiments, a gateway node may support USB and Ethernet connectivity for connection to USB or Ethernet networks.

The gateway node 64 may also include or be associated with a network coordinator. The network coordinator may be configured to oversee and manage various network operations. For example, the network coordinator may implement the forming of the network, allocate network addresses to entities of the network, and maintain a binding table for the network.

In some cases, the monitoring system 60 may be made up of a plurality of communication devices (e.g., such as a plurality of configurable monitoring devices) in communication with each other via device-to-device communication to form a mesh network. However, in other situations, the network may include a plurality of devices that transmit signals to and receive signals from a base site or access point, which could be, for example a base site or access point of a data network, such as a local area network (LAN), a metropolitan area network (MAN), and/or a wide area network (WAN), such as the Internet.

Other devices such as processing elements or devices (e.g., personal computers, server computers, displays, point of sale (POS) terminals and/or the like) may be coupled to a configurable monitoring device to access the monitoring system 60. By directly or indirectly connecting the configurable monitoring devices to various network devices and/or to other configurable monitoring devices via the monitoring system 60, the configurable monitoring devices may be enabled to receive configuration modifications dynamically and perform various functions or tasks in connection with network devices or other configurable monitoring devices based on the current configuration of the configurable monitoring devices.

The configurable monitoring devices, and the monitoring system 60 generally, may utilize any wireless communication technique for communicating information between the devices or to the monitoring terminal 62. For example, the configurable monitoring devices may be configured to support communications protocols built on the IEEE 802.15.4 standard, such as Zigbee or a proprietary wireless protocol. According to some example embodiments, the communications within the monitoring system 60 may be performed based on a Route Under MAC (Media Access Control) (RUM) protocol or a modified RUM protocol. Regardless of the protocol, communications within the monitoring system may be associated with a network identifier, such as a personal area network (PAN) identifier. In some example embodiments, configurable monitoring devices might not be permitted to communicate within the monitoring system without having a matching network identifier. In some example embodiments, the monitoring system may regularly or irregularly change the network identifier and transition to a new network identifier for security purposes.

Additionally, to support network communications within the monitoring system, a system-wide synchronized clock may be implemented. Synchronization of the clock may be maintained via a clock signal. Configurable monitoring devices may include real time clock circuitry to support the synchronized clock and to regulate the use of precise communications windows.

The configurable monitoring devices may also support RFID communications, such as communications based on Generation II Ultra High Frequency (UHF) RFID standards. In example embodiments where a configurable monitoring device includes a radio (e.g., an IEEE 802.15.4 radio) and an RFID module, the configurable monitoring device may be configured to operate as an interface that allows RFID devices to access the monitoring system 60. For example, an RFID reader or other RFID device, that does not include a configurable monitoring device, may communicate with a configurable monitoring device, such as a tag, and the configurable monitoring device may relay such communications to entities connected to the monitoring system. In the same manner, the tag may relay communications originating on the monitoring system to an RFID device that has interfaced with a tag. As such, the configurable monitoring devices may operate as gateway to the monitoring system for RFID communications.

Figure 10:
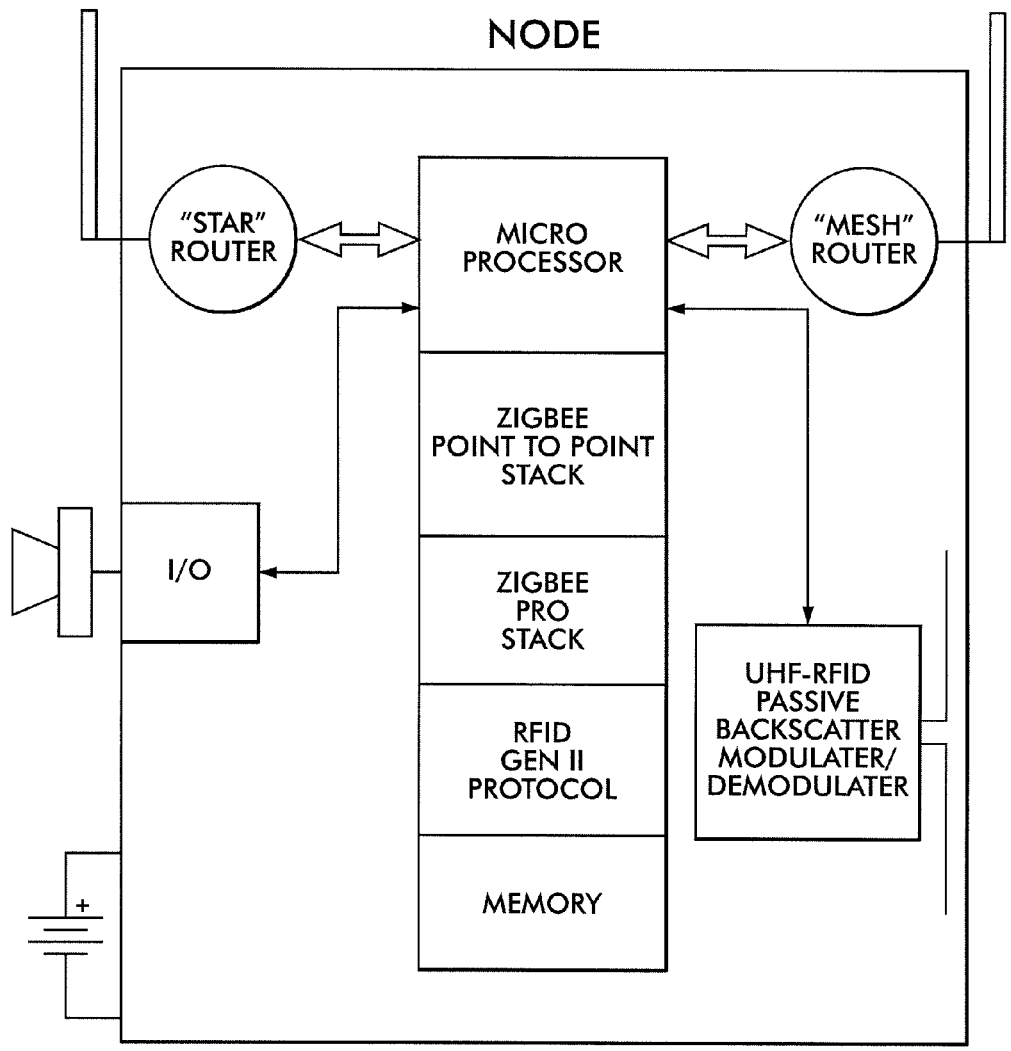
FIG. 10 illustrates an example configurable monitoring device with specialized hardware for performing some of the functionality within the role of a node according to an example embodiment.

The monitoring system 60 may be configured to operate as a mesh network or a hybrid mesh network. In some example embodiments, the monitoring system is configured in a star network structure, a hybrid star network structure, a cluster tree or the like. In this regard, the monitoring system 60 may support message hopping and network self-healing. With respect to message hopping, the nodes 66 may be configured to receive communications from nearby or assigned tags 68. The nodes 66 may be configured to determine a system architecture and/or efficient pathways for communicating messages to the various entities within the network. In this regard, the nodes 66 may be configured to generate and maintain routing tables to facilitate the efficient communication of information within the network. A block diagram of an example node device in accordance with various example embodiments is depicted in FIG. 10. The example node of FIG. 10 supports both star and mesh networks by including star and mesh network routers. The example node of FIG. 10 is also depicted as being configured to communicate using Zigbee, as well as RFID protocols.

For example, in accordance with implemented marketing functionality, tag 68h may be configured to communicate that the product that tag 68h is affixed to has been moved from its display location. Tag 68b may be configured to communicate this information to tags 68g and 68d, because the products affixed to tags 68g and 68d are related products that a customer may be interested in purchasing, given the customer's apparent decision to purchase the product affixed to tag 68h. Accordingly, tag 68h may generate and transmit a message addressed to tags 68g and 68d. The message may be received by node 66c, and node 66c may be configured to determine bow to route the message, given current network traffic, such that the message is efficiently received by tags 68g and 68d. For example, using generated routing tables, node 66c may determine that the message can first be transmitted directly to tag 68g, since tag 68g is connected to or in direct communication with the node 66c. To transmit the message to tag 68d, node 66c may determine that the message should be forwarded to node 66b. Node 66h may perform a similar analysis and determine that the message can be forwarded to tag 68d, directly from node 66b. Tag 68h may also be configured to transmit the message to the monitoring terminal 62. Node 66e may route the message accordingly, such that the gateway 64 may forward the message to the monitoring terminal 62.

As indicated above, the nodes 66 may be configured to perform communications routing within the monitoring system 60. In this regard, nodes 66 may operate to extend the range of the monitoring system. However, according to some example embodiments, all configurable monitoring devices within the monitoring system 60 may be configured to perform routing functionality. As such, configurable monitoring devices configured to operate both as tags and as nodes may communicate directly with each other, if within range, without having to route the communications through another node.

Further, since the monitoring system 60 may be configured as a mesh or hybrid mesh network, the monitoring systems 60 may support self-healing. In this regard, in the event that a node 66 should fail and no longer be able to communicate, messages may be automatically routed via a path that does not involve the failed node. For example, in a given scenario, a tag may be connected to more than one node. In the event that one of the nodes fails, the tag may simply cause messages to be routed through another node to which the tag is connected.

According to some example embodiments, for example in the event that another available node is not present, a tag may be triggered, directed, or configured to implement node functionality (e.g., stored in the memory of the tag and implemented by a processor of the tag). The tag may therefore become a node to support communications of other tags.

According to some example embodiments, configurable monitoring devices that are installed and configured with the intention that the devices be primarily utilized as nodes may be powered through a building's wired power system or be mains powered (in contrast to being only battery powered). Since nodes may be involved in the frequent transmission of communications, power utilization of a node may be relatively high. As such, since configurable monitoring devices configured to operate primarily as tags would likely be battery powered for mobility purposes, an example embodiment that implements node functionality within a tag may be a temporary solution to maintain network continuity while the failed node is repaired.

Additionally, the monitoring system 60 may be configured to compensate for interference and multi-path conditions that can arise in enclosed environments, such as retail stores. To do so, the monitoring system 60 may be configured, for example by the monitoring terminal 62, to modify the signal power of select nodes and tags to minimize interference. According to some example embodiments, directional antennas may also be used by configurable monitoring devices to minimize interference.

According to various example embodiments, the monitoring system 60 may be configured to interface with any number of other types of networks and/or systems. For example, the monitoring system 60 may interface with EAS systems, RFID systems, closed circuit television systems, inventory systems, security systems, sales systems, shipping systems, point of sale terminals, advertising systems, marketing compliance systems, ordering systems, restocking systems, virtual deactivation systems, Lojack® systems, and the like.

While the monitoring system 60 may be configured to operate in a distributed fashion, the monitoring terminal 62 may be configured to coordinate operations of the monitoring system 60, as well as, retrieve, aggregate, and analyze data provided by the configurable monitoring devices of the system.

Based on the foregoing, and in accordance with some example embodiments, the nodes may be configured to provide a wireless signal that may be received by tags that are within range. According to some example embodiments, the range of a node or the power of the signal provided by the node may be set based on the size of the area that the node is responsible for. For example, if the node is associated with a small floor display, the signal power may be relatively low. On the other hand, if a node is responsible for a large shelf unit, the signal power may be set to a higher level to ensure coverage of the entire shelf unit.

Tags may be configured to receive a signal that is associated with a node and respond to the node indicating that the tag is now associated with the node, for example, because the tag is located on the floor display associated with the node. For example, a tag may be configured to periodically or pseudo-randomly power up (e.g., based on a wake-up timer), listen for a node signal (e.g., a beacon signal), perform a time synchronization based on the nodes signal, and transmit a message indicating which node the tag has received a signal from. Subsequently, a tag may perform a second clock synchronization and then power down into a sleep mode for another period of time. From the signal provided by the node, the tag may receive a unique identifier for a node that the tag has detected and may store the identifier. As such, the tag would know to which node the tag has been associated. Similarly, the node may receive a communication from a tag including a unique identifier of the tag, and the node may therefore know to which tags the node is associated, and the node may be configured to report the node/tag associations back to a monitoring terminal, or monitoring system coordinator. Via these and other types of defined tag/node relationships, various functionalities, as mentioned above and otherwise herein, may be implemented.

Figure 9:
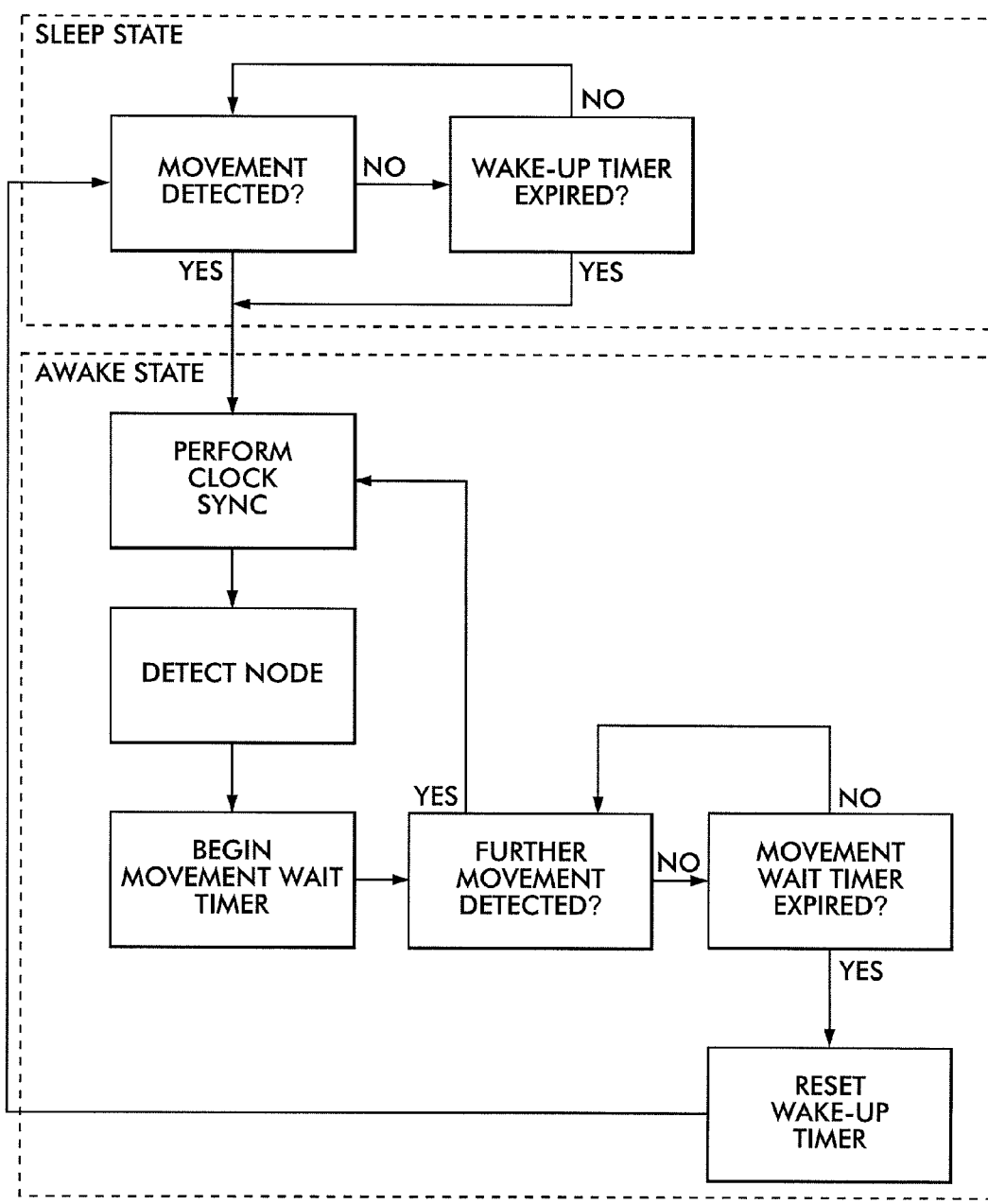
FIG. 9 illustrates a flow chart of an example tag according to an example embodiment.

Additionally, as further described herein, a tag may include a jiggle switch, the actuation of which may indicate that a tag is being moved. Upon detecting actuation of the jiggle switch, a tag may move from a sleep state into an awake state. Upon entering the awake state, the tag may perform one or more clock synchronizations with a node and determine the identifier of the node to which the tag is currently connected, and transmit a message indicating the identifier of the node to which the tag is currently connected (possibly a new node since movement may have occurred). In the event that a tag does not detect a node, the tag may alarm. A tag that has detected a node may implement a movement wait timer to facilitate determining whether further movement of the tag is occurring. In the event that further movement is detected during the movement wait time, the tag may again perform a time synchronization and detect a node. If the movement wait time expires, the tag may determine a time until a next wake up into the awake state and an associated wake-up timer may be reset. Upon beginning the wake-up timer the tag may transfer into a sleep state. FIG. 9 illustrates a flow chart of the operation of an example tag as described above.

Figure 1A:
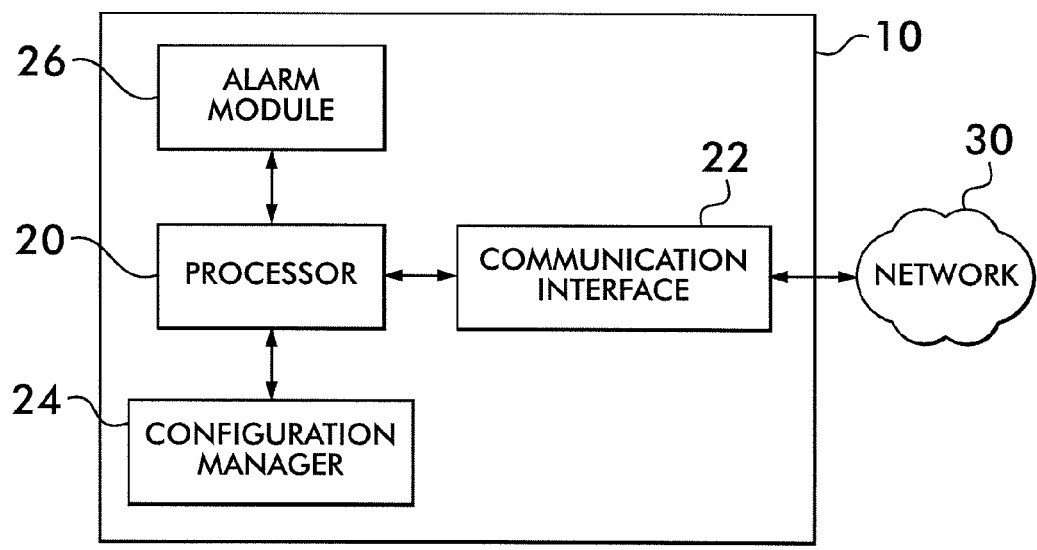
FIG. 1A is a block diagram showing various function components of a configurable monitoring device (CMD) according to an exemplary embodiment of the present invention.
Figure 1B:
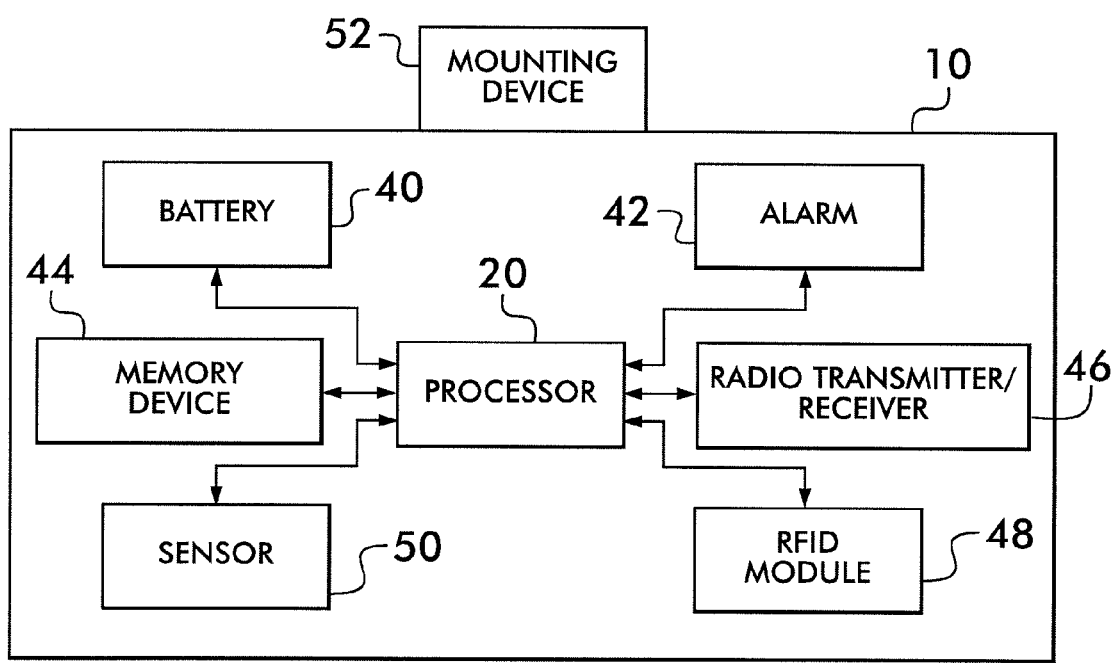
FIG. 1B is a block diagram of various physical components of the CMD according to an exemplary embodiment of the present invention.
Figure 2:
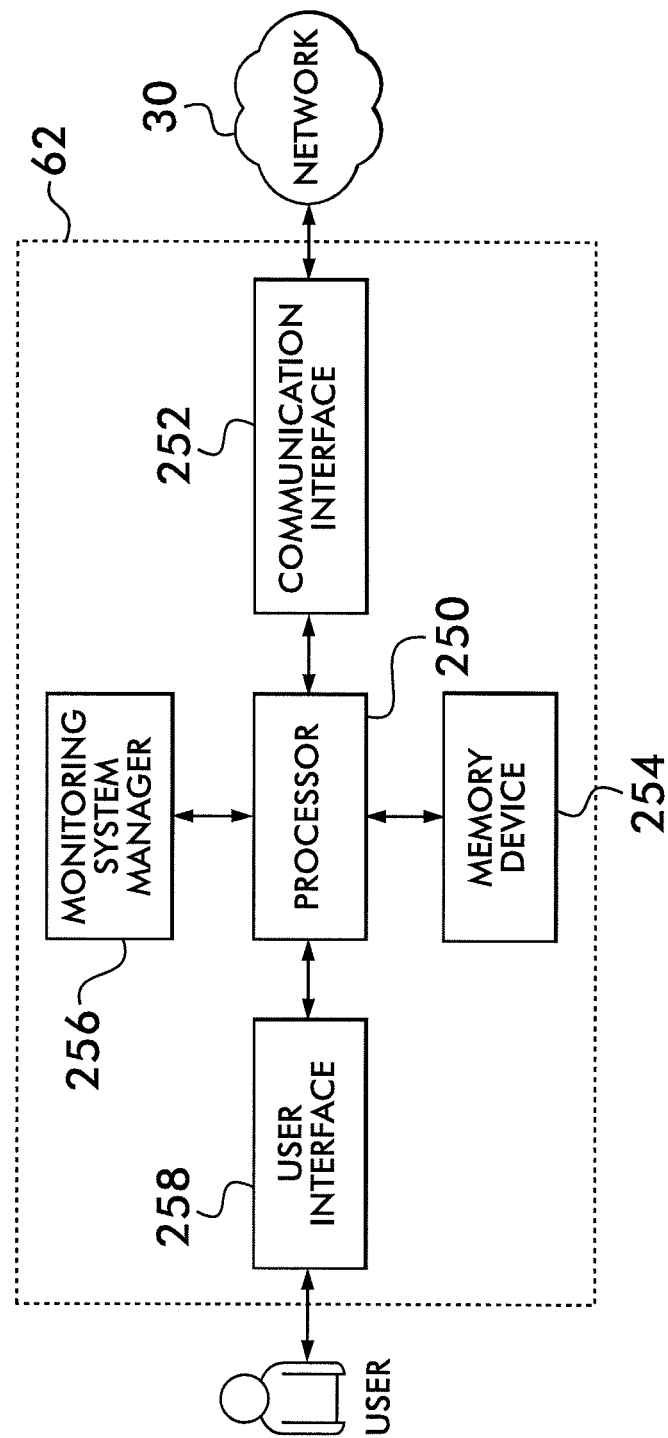
FIG. 2 illustrates a block diagram of a monitoring terminal according to an example embodiment.

FIGS. 1A and 1B illustrate basic block diagrams of a configurable monitoring device 10 according to an exemplary embodiment. As shown in FIGS. 1A and 1B, the configurable monitoring device 10 may include various components that support both basic operation of the configurable monitoring device 10 and operation of the configurable monitoring device 10 in any of its various configurable roles and/or modes. Some examples of these components are shown in FIGS. 1 and 2. However, it should be appreciated that some embodiments may include either more or less than the example components illustrated in FIGS. 1A and 1B. Thus, the embodiments of FIGS. 1A and 1B are provided by way of example and not of limitation.

FIG. 1A is a block diagram showing various functional components of the configurable monitoring device 10 according to an exemplary embodiment. FIG. 1B is a block diagram of various physical components of the configurable monitoring, device 10 according to an exemplary embodiment. Reference will now be made to both FIGS. 1A and 1B in order to describe an example structure and functional operation of the configurable monitoring device 10 according to an exemplary embodiment. In this regard, as shown in FIG. 1A, the configurable monitoring device 10 may include a processor 20 and a communication interface 22. In some example embodiments, the processor 20 may be part of a Linux single board computer (SBC) and configured to support and execute a Structured Query Language (SQL) server. The processor 20 may in turn communicate with, control or embody (e.g., via operation in accordance with corresponding instructions) a configuration manager 24 and an alarm module 26. Meanwhile, as shown in FIG. 1B, the configurable monitoring device 10 may include such physical components as the processor 20, a battery 40, an alarm 42, a memory device 44, a radio transmitter/receiver 46, and an RFID module 48. In some cases, the configurable monitoring device 10 may further include a sensor 50 and a mounting device 52.

In an exemplary embodiment, the processor 20 may be configured (e.g., via execution of stored instructions or operation in accordance with programmed instructions) to control the operation of the configurable monitoring device 10. The processor 20 may be embodied in a number of different ways. For example, the processor 20 may be embodied as one or more various processing means or devices such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCI)), a hardware accelerator, a special-purpose computer chip, or the like. In an exemplary embodiment, the processor 20 may be configured to execute instructions stored in a memory device (e.g., memory device 44 of FIG. 1B) or otherwise accessible to the processor 20. The instructions may be permanent (e.g., firmware) or modifiable (e.g., software) instructions. Alternatively or additionally, the processor 20 may be configured to execute hard coded functionality. As such, whether configured by hardware or software methods, or by a combination thereof, the processor 20 may represent an entity (e.g., physically embodied in circuitry) capable of performing operations according to embodiments of the present invention while configured accordingly. Thus, for example, when the processor 20 is embodied as an ASIC, FPGA or the like, the processor 20 may be specifically configured hardware for conducting the operations described herein. Alternatively, as another example, when the processor 20 is embodied as an executor of software or firmware instructions, the instructions may specifically configure the processor 20 to perform the algorithms and/or operations described herein when the instructions are executed. The processor 20 may include, among other things, a clock, an arithmetic logic unit (ALU) and logic gates configured to support Operation of the processor 20.

The processor 20 may also include input/output (I/O) ports (or pins). Via configuration information, the I/O ports may be configured to interface with any number of external devices such as, electronic security devices, alarms, speakers, piezo buzzer, microphones, lights (e.g., light emitting diodes (LEDs) including dual-color LEDs), buttons, keypads, monitors, displays (e.g., for changeable pricing labels), sensors (e.g., accelerometers, movement sensors (e.g., jiggle switch), light sensors, temperature sensors, cameras, security gates, store audio systems, customer counters, lighting switches, employee communicators (e.g., headsets, handheld radios), door strike mats, jewelry case mats, Lojack® devices, global positioning system (GPS) devices, barcode scanners, loyalty card scanners, and the like. As such, the I/O ports may be configured to support one or more roles that the configurable monitoring device may be configured to perform. For example, an I/O port that is configured to interface with a light sensor may be used to determine whether a protected article has been placed under a coat or otherwise concealed. As another example, an I\O port may interface with an LED to cause the LED to flash at a regular interval to provide a visual indication of the status of the configurable monitoring device and a deterrent to would-be thieves. For yet another example, an I\O port may be configured to interface with a piezo buzzer to play various tones by the processor 20. According to various example embodiments, actuation of the jiggle switch and detection of the actuation by the I/O ports may be a trigger for the configurable monitoring device to transition from a sleep state to an awake state.

Via the I/O ports of the processor 20, various functionalities may be triggered, based on the role and the configuration information of the configurable monitoring device. Triggering may be initiated either at the configurable monitoring device level or at the system or monitoring terminal level. For example, the I/O ports of a configurable monitoring device's processor may interface with a display for a price tag, where the configurable monitoring device is configured as a tag. Within the tag's configured role, for example, the price depicted on the display may be set to reduce at a given time. In some example embodiments, the time may be monitored by the processor of the tag and when the given time is reached, the processor may direct the I/O ports and the connected display to depict a reduced price. Alternatively, an example that includes triggering at the monitoring terminal level may include the time being monitored by the monitoring terminal, and the monitoring terminal may communicate a message including a reduced price, or an indication to reduce the price, to the tag at the given time to trigger the tag to reduce the price accordingly.

The memory device 44 may include, for example, one or more volatile and/or non-volatile memories. In other words, for example, the memory device 44 may be an electronic storage device (e.g., a computer-readable storage medium) comprising gates configured to store data (e.g., bits) that may be retrievable by a machine (e.g., a computing device including a processor such as processor 20). The memory device 44 may be configured to store information, data, applications, instructions or the like for enabling the configurable monitoring device 10 to carry out various functions in accordance with exemplary embodiments of the present invention. For example, the memory device 44 could be configured to buffer input data for processing by the processor 20. Additionally or alternatively, the memory device 44 could be configured to store instructions for execution by the processor 20.

In some environments, the communication interface 22 may alternatively or also support wired communication. For example, in some example embodiments, such as when the configurable monitoring device is configured to operate as a POS (point of sale) node, the communications interface may support wired communication via an RJ45 port. As such, for example, the communication interface 22 may include a communication modem and/or other hardware/software for supporting communication via cable, digital subscriber line (DSL), universal serial bus (USB) or other mechanisms.

In an exemplary embodiment, the communication interface 22 may support communication via one or more different communication protocols or methods. In some embodiments, the communication interface 22 may be configured to support relatively low power, low data rate communication. As such, for example, a low power and short range communication radio (e.g., radio transmitter/receiver 46) may be included in the communication interface 22. In some examples, the radio transmitter/receiver 46 may include a transmitter and corresponding receiver configured to support radio frequency (RF) communication in accordance with an IEEE (Institute of Electrical and Electronics Engineers) communication standard such as IEEE 802.15. As such, for example, some embodiments may employ Bluetooth, Wibree, ultra-wideband (UWB), WirelessHART, MiWi or other communication standards employing relatively short range wireless communication in a network such as a wireless personal area network (WPAN). In some cases, IEEE 802.15.4 based communication techniques such as ZigBee or other low power, short range communication protocols such as a proprietary technique based on IEEE 802.15.4 may be employed. According to some example embodiments, the communications interface 22 may be configured to support an Internet Protocol version 6 (IPV6) stack.

The communications interface 22 may also support a Route Under MAC (Media Access Control) (RUM) protocol or a modified RUM protocol. Regardless of the protocol, the communications interface 22 may be configured to utilize a network identifier, for example stored in the memory device 44, such as a personal area network (PAN) identifier. In some example embodiments, a configurable monitoring device might not be permitted to communicate within the monitoring system without using a matching network identifier.

According to some example embodiments, a configurable monitoring device, or the monitoring system, may select a communications channel for use with monitoring system communications to implement a fixed channel scheme. A monitoring device may, based on the noise or channel traffic, select a quiet channel. However, a procedure may be implemented by the monitoring terminal and the configurable monitoring devices that provides for changing channels, for example, when a channel begins to operate poorly. According to some example embodiments, the monitoring terminal may communicate to the nodes to change channels, but the tags may perform a channel scan to determine the new channel.

In example embodiments where a configurable monitoring device 10 includes a radio transmitter/receiver 46 (e.g., an IEEE 802.15.4 radio) and an RFID module 48, the configurable monitoring device may be configured to operate as an interface that allows RFID devices to access a monitoring system. For example, an RFID reader or other RFID device, that does not include a configurable monitoring device, may communicate with a configurable monitoring device, such as a tag, and the configurable monitoring device may relay the communications to entities connected to the monitoring system. In the same manner, the tag may relay communications initiated on the monitoring system to an RFID device that has interfaced with a tag. As such, the configurable monitoring devices may operate as a gateway to the monitoring system for RFID communications.

The network 30 to which the communication interface 22 may connect (which may include the monitoring system) may be a local network (e.g., a WPAN) that may in some cases further connect to or otherwise communicate with a remote network on either a periodic or continuous basis. For example, via the communications interface 22, a configurable monitoring device may interface with EAS systems, RFID systems, closed circuit television systems, inventory systems, security systems, sales systems, shipping systems, point of sale terminals, advertising systems, marketing compliance systems, ordering systems, restocking systems, virtual deactivation systems, Lojack® systems, and the like.

The network 30 may include a collection of various different nodes, devices or functions that may be in communication with each other via corresponding wired and/or wireless interfaces. As such, the illustration of FIG. 1A should be understood to be an example of a broad view of the network and not an all inclusive or detailed view of the network 30. In some cases, the network 30 may be made up of a plurality of communication terminals (e.g., such as a plurality of configurable monitoring devices) in communication with each other via device-to-device communication to form a mesh network. However, in other situations, the network may include a plurality of devices that each include an antenna or antennas for transmitting signals to and for receiving signals from a base site or access point, which could be, for example a base site or access point of a data network, such as a local area network (LAN), a metropolitan area network (MAN), and/or a wide area network (WAN), such as the Internet. In turn, other devices such as processing elements or devices (e.g., personal computers, server computers, displays, point of sale (POS) terminals and/or the like) may be coupled to the configurable monitoring device 10 via the network 30. By directly or indirectly connecting the configurable monitoring device 10 to various network devices and/or to other configurable monitoring devices via the network 30, the configurable monitoring device 10 may be enabled to receive configuration modifications dynamically and perform various functions or tasks in connection with network devices or other configurable monitoring devices based on the current configuration of the configurable monitoring device 10.

As indicated above, the processor 20 of an exemplary embodiment may be embodied as, include or otherwise control the configuration manager 24 and/or the alarm module 26. The configuration manager 24 and the alarm module 26 may each be any means such as a device or circuitry operating in accordance with firmware/software or otherwise embodied in hardware or a combination of hardware and firmware/software (e.g., processor 20 operating under software control, the processor 20 embodied as an ASIC or FPGA specifically configured to perform the operations described herein, or a combination thereof) thereby configuring the device or circuitry to perform the corresponding functions of the configuration manager 24 and/or the alarm module 26, respectively, as described herein. Thus, in examples in which software is employed, a device or circuitry (e.g., the processor 20 in one example) executing the software forms the structure associated with such means.

The configuration manager 24 may be configured to control operation of the configurable monitoring device 10 based on configuration information provided to the configurable monitoring device 10 (e.g., via the communication interface 22) or pre-stored in the configurable monitoring device 10. According to some example embodiments, the configuration manager 24, with the communications interface, may support a wireless bootloading. As such, for example, the configuration manager 24 may be configured to determine and/or control the configuration and thereby also the operation of the configurable monitoring device 10 based on the current situation as determined by the configuration manager 24 or based on the instructions received by the configuration manager 24.

Roles or configurations may be simple or complex based on, for example, the processing capabilities of the processor 20 and the memory storage of the memory device 44. In this regard, a configurable monitoring device may be configured to perform minimal data processing, and a monitoring terminal that coordinates and manages a monitoring system may be configured to perform incrementally more processing of data. Alternatively, some configurable monitoring devices may include relatively higher processing power and larger memory storage to support increased data processing at the configurable monitoring device, rather than at the monitoring terminal.

For example, in embodiments where a configurable monitoring device, configured as a tag, includes minimal storage memory, attribute information describing an article to which the tag is affixed may be stored at the monitoring terminal. When an inquiry device (e.g., price scanner, inventory scanner) requests the attribute information from the tag, the tag may communicate the request to the monitoring terminal, and the monitoring terminal may provide the attribute information to the inquiry device, either through the monitoring system or through a connection external to the monitoring system.

Alternatively, in embodiments where memory device 44 includes a relatively large storage memory, attribute information describing the article to which a tag is affixed may be stored local to the tag, within the memory device 44. When an inquiry device (e.g., price scanner, inventory scanner) requests the attribute information from the tag, the tag may directly communicate, or initiate the communication of, the attribute information from the tag to the inquiry device.

A configurable monitoring device may also be configured by being provided configuration information via physical connection to a configuring device, such as a monitoring terminal. The physical connection may support the transmission of electrical signals between the configuring device and the configurable monitoring device. Alternatively, if wireless configuring of configurable monitoring devices is to be utilized to configure a plurality of devices, according to some example embodiments, the power of the signals including the configuration information may be precisely set, so as not to configure configurable monitoring devices that were not intended to be configured.

After being initially configured, the configurable monitoring device 10 may be considered to be "commissioned". In this regard, commissioning of the configurable monitoring device 10 may include providing the configurable monitoring device 10 with an initial configuration as defined by its assigned role/mode. However, in some instances, an already configured device may be commissioned by modifying existing configuration information, replacing the existing configuration information, and/or providing additional hardware in communication with the configurable monitoring device 10 to add further functional capabilities, and/or guidance for operation. The commissioning process, which may be handled internally by the configuration manager 24, may include providing the configurable monitoring device 10 with configuration information or identifying configuration information (e.g., pre-stored configuration information) to be employed. However, in some cases, the commissioning process may further include providing the configurable monitoring device 10 with information directing changes to an already existing configuration of the configurable monitoring device 10. This may occur, for example, when a commissioned configurable monitoring device is to be re-tasked for use with another product rather than being decommissioned. In such a situation, since there is already existing information that is changed, the operation of changing the existing configuration may be viewed as re-commissioning. The commissioning (or re-commissioning) may be accomplished via wireless instructions received by the communication interface. Commissioning may also be provided via scanning of an RFID tag, reading a barcode, adding specialized hardware, bringing the configurable monitoring device 10 into proximity of specialized hardware, etc.

In some example embodiments, a configurable monitoring device may be first configured as a tag, and the tag may then be commissioned. To commission a tag, the following example procedure may be undertaken. The tag may be first affixed to an article and brought into close proximity to a commissioning node. The commissioning node may communicate directly with the tag via wireless communications when the tag is brought into range of the commissioning node. While the tag is within range of the commissioning node, a barcode scanner connected to the commissioning node may be used to scan the barcode of the article to which the tag is affixed. By scanning the barcode, a barcode to tag relationship may be defined. Having generated the tag/barcode relationship, the tag may be considered commissioned. The tag/barcode relationship may be stored on the tag and/or on memory storage accessible to a monitoring terminal that oversees the operation of the monitoring system. Upon being commissioned, the tag may be configured to confirm the proper commissioning by generating an audible sound, such as two beeps.

While commissioned, the configurable monitoring device 10 may continue to receive instructions (e.g., via the communication interface 22) or other information useful for making determinations as to the configuration to be employed and the corresponding role/mode of operation to assume. However, in some cases, information useful for making determinations regarding configuration changes (e.g., mode and/or role shifts) may be made responsive to activity that may be sensed (e.g., via sensor 50 of FIG. 1B) or determined locally.

Decommissioning of the configurable monitoring device 10, which may also be handled by the configuration manager 24, may include powering down the configurable monitoring device 10, clearing or resetting configuration information, or directing the configurable monitoring device 10 to enter an idle or non-transmitting mode in order to conserve battery power until the configurable monitoring device 10 is re-commissioned. The configurable monitoring device 10 may be decommissioned by instructions received via the communication interface 22 (e.g., via a software or coded key) or by manual activity taken by a user (e.g., with a physical key). Upon being decommissioned, a tag may enter a forever sleep mode, until, for example, a switch on the tag is actuated by a user.

According to some example embodiments, a battery check may be performed by the processor 20 of a configurable monitoring device configured as a tag during decommissioning, in this regard, the tag may include the hardware and software (e.g., processor configured by instructions) to provide for monitoring the battery charge level. If the battery charge level for a tag has fallen below a given threshold, the tag may alarm or otherwise indicate to the store personnel that the tag should be removed from service for recharging or battery replacement. Tags that, have battery levels above the given threshold may be decommissioned and identified as being available re-commissioning. According to some example embodiments, a tag having a battery level that has fallen below a given threshold may be prevented from being re-commissioned until the battery charge level is sufficiently improved. In this manner, the situation where a tag's battery discharged while the tag is on the sales floor can be minimized or avoided.

Accordingly, in general terms, the configurable monitoring device 10 may be dynamically configurable via wireless instructions to alter the operating mode of the configurable monitoring device 10 and thereby also modify the role of the configurable monitoring device 10 in its network environment. The different configurations that are available at the configurable monitoring device 10 may be changed dynamically as well and may be managed by the configuration manager 24. Thus, the configuration manager 24 (e.g., via execution of stored instructions by the processor 20) may provide control over the operation of the configurable monitoring device 10 based on the configuration information stored and/or received at the configurable monitoring device 10 and, in some cases, also or alternatively based on local conditions sensed at the configurable monitoring device 10.

Some configurations in which the configurable monitoring device 10 operates may specify specific alarm conditions to be triggered. As such, when alarm conditions are triggered based on the current configuration, the configuration manager 24 may communicate with the alarm module 26 to manage alarm function of the alarm 42. The alarm 42 may be configured to produce an output, typically in the form of sound energy, although light, vibration or other outputs are also possible. As such, the alarm 42 may include an output device such as one or more of a speaker, vibration pack, light (e.g., a light emitting diode (LED)) or other device. The alarm module 26 may be configured to control operation of the alarm 42 based on instructions received from the configuration manager 24. In this regard, based on the current configuration of the configurable monitoring device 10 as determined by the configuration manager 24, an alarm condition may be identified and signaled to the alarm module 26. In some embodiments, the alarm condition may be associated with a predetermined alarm signal, which the alarm module 26 may be configured to provide to the alarm 42 to direct an output. The alarm 42 may be configured to provide any number of different outputs in response to the alarm signal including but not limited to a tone or series of tones, a ringing noise, a recorded or synthetic voice output, a solid or flashing light with any of various predetermined flash sequences, a vibration that is either continuous or pulsed with various different pulse sequences, or various other outputs or combinations of the above and/or other outputs.

In some embodiments, the alarm module 26 may provide alarm responses that are not necessarily just audible, light or mechanical vibration outputs. In this regard, for example, the alarm module 26 may be configured to further provide alerts to monitoring devices (e.g., an alarm panel, a network monitoring server or computer and/or a local computer or server). The alerts may be text alerts describing a corresponding situation that triggered the alert. However, in other cases, the alerts may go to an alarm panel to be indicated by pre-configured light sequences, etc. As such, for example, when certain conditions or stimuli are encountered, the alarm module 26 may be configured to provide an alert that may be reviewed and either acted upon or noted and cleared by monitoring or management personnel. In some embodiments, the alerts may be routine alerts such as maintenance warnings, low battery indications, or other network or system related alerts. However, the alerts could also have a marketing purpose in some embodiments. In this regard, specific activity may trigger an alert to a customer that a related item is on sale, trigger asking the customer whether a particular type of assistance may be offered, or may trigger an identification of a matching item and its location via a video display proximate to the product being inspected by a customer and including the configurable monitoring tag.

In an exemplary embodiment, the alarm module 26 may merely direct, for all alarm conditions, a single response (e.g., one of the above listed alarm outputs). However, in an exemplary embodiment, the alarm response generated by the alarm 42 may vary based on the current situation. Thus, for example, the configuration manager 24 may provide the alarm module 26 with information identifying a specific alarm response (e.g., a selected one or combination of the above listed possible alarm outputs) to be provided based on the current mode of operation of the configurable monitoring device 10. In some cases, the identified specific alarm response identified may be identified based at least in part on current conditions associated with the current mode of operation. Thus, for example, the current mode of operation may define no alarm response unless a specific stimulus is encountered. In response to the stimulus being encountered locally (e.g., via information provided by the sensor 50) or remotely (e.g., via information provided through the communication interface 22), the configuration manager 24 may signal the alarm module 26 to select an appropriate alarm response. The alarm 42 may therefore be employed for a variety of reasons due to the flexibility associated with the alarms that may be provided and the conditional awareness associated with generation of the alarm responses. For example, the alarm 42 may be used to identify product location for a product near the configurable monitoring device 10 or a product to which the configurable monitoring device 10 is affixed. Alternatively, the alarm 42 may be used to signal a potential theft situation or even the presence (e.g., within a relatively short distance) of another configurable monitoring device that may be in the process of being stolen, tracked, or located.

The sensor 50 may be an optional device added to the configurable monitoring device 10 in some situations (e.g., including optional hardware that can be placed in operable communication with the configurable monitoring device 10). In this regard, the sensor 50 could be used for making determinations of local conditions at the configurable monitoring device 10. The sensor 50 could be embodied as any of various sensing devices configured to detect motion, light, images, sound, or other environmental stimuli. As such, the sensor 50 may include a light detector, an optical scanner, a motion detector or other sensing devices. In an exemplary/embodiment, the sensor 50 may be configured to detect a particular indicia of attempts to remove the configurable monitoring device 10 from as product to which the configurable monitoring device 10 is affixed or of other attempts to steal the product. As such, for example, if a particular type of product to which the configurable monitoring device 10 is affixed is typically susceptible to handling in a specific manner by thieves attempting to conceal the product being stolen, remove the configurable monitoring device 10 from the product, or damage the product, the sensor 50 may be configured to sense indicia of the corresponding handling. Thus, for example, in response to the configurable monitoring device 10 being in a theft deterrent related mode when the indicia of the corresponding, handling indicative of improper activity is received, the sensor 50 may provide a signal to the configuration manager 24 to indicate the current conditions to enable the configuration manager 24 to alter the operation of the configurable monitoring device 10 accordingly (e.g., by instructing the alarm module 26 to generate an alarm response at the alarm 42 that is indicative of the respective improper activity).

The battery 40 may be any type of battery or battery pack that provides sufficient power to permit extended operation of the configurable monitoring device 10. The battery 40 may be rechargeable or replaceable and may be of any suitable size. In some embodiments, the battery 40 may have terminals that extend from a casing or housing of the configurable monitoring device 10 to enable the configurable monitoring device 10 to be placed on a charging stand. In some situations, a single or multiple element charging stand may be provided to enable out of service (or some in service) configurable monitoring devices to be recharged. The terminals may also enable wired communication with the configuration manager 24 to enable the provision of configuration information to the configurable monitoring device 10 via the charging stand while the battery 40 is being charged or otherwise when the configurable monitoring device 10 is being commissioned, re-commissioned or even while the configurable monitoring device 10 is decommissioned. In some example embodiments, such as when the configurable monitoring device is configured to operate as a stationary node, a configurable monitoring device may alternatively, or additionally, include a mains power connection for powering the configurable monitoring device.

As indicated above, the configurable monitoring device 10 may, in some cases, operate in a tag mode. When operating in a tag mode, it may often be desirable for the configurable monitoring device 10 to be affixed to a particular product or retail article. When operating in node mode, it may be desirable for the configurable monitoring device 10 to be disposed at a centralized location relatively near to a plurality of tags or otherwise strategically located at a selected location to facilitate communication with and/or information extraction from tags. However, exceptions to the situations described above are permissible and may in fact be common in many exemplary architectures employing embodiments of the present invention. In any case, the configurable monitoring device 10 may include a mounting device 52 to facilitate placement of the configurable monitoring device 10.

In situations where the configurable monitoring device 10 is affixed to a product or retail article, the mounting device 52 may be configured to be tailored to providing an appropriate mechanism of affixing the configurable monitoring device 10 to the corresponding product. As such, for example, in some situations, an adhesive, snap fastener, clip, clasp, tether, hook-and-loop fastener, magnetic fastener, pin connector, or other fastening device enabling direct connection of the configurable monitoring device 10 to the corresponding product may be provided as the mounting device 52. One such mounting device may be configured to attach to the shaft of a golf club or similar article such as the device disclosed in U.S. Pat. No. 7,266,979 herein incorporated by reference in its entirety. Other such mounting devices may be configured to attach to a bottle neck or a bottle cap such as the devices disclosed in U.S. Pat. Nos. 7,259,674 and 7,007,523, both herein incorporated by reference in their entirety. Still other mounting devices may be configured to attach through a product such as an article of clothing or a blister pack such as the hard-tag disclosed in U.S. Pat. No. 6,920,769 incorporated herein by reference in its entirety. Each of the aforementioned patents is commonly owned by the assignee of the present application.

However, in other situations, some products may not be suitable for direct attachment to the product. For example, while a product such as a golf club, bottle, shoe or article of clothing may be suitable for the attachment via direct connection thereto, articles that are sold in a packaging box are often less suitable for such attachment. In this regard, packaging boxes may be opened and the article therein may then be stolen without the box. Moreover, it may not be practical or desirable to open packaging in order to directly connect the configurable monitoring device 10 to the product. Accordingly, in some embodiments, the mounting device 52 may actually be a wrap such as Alpha Security Products' Spider Wrap™ disclosed in U.S. Pat. No. 7,162,899 herein incorporated by reference in its entirety. Further, a cable lock, such as the Alpha Security Products' Cablelok™ device disclosed in U.S. Pat. No. 7,249,401 or a keeper, such as that disclosed in U.S. Pat. No. 6,832,498 may include the configurable monitoring device 10. Each of the aforementioned patents being commonly owned by the assignee of the present application and herein incorporated by reference in their entirety. The wrap may be particularly useful in connection with six-sided box packaging for larger articles. The enclosure (or keeper) may be particularly useful for smaller articles such as CDs, DVDs, bottles, tubes or other containers of health, beauty and/or other products.

Depending on the type of mounting device 52, a configurable monitoring device configured as a tag may be configured to operate differently. For example, a hard tag may be aimed to alarm by insertion of a pin to activate or arm the alarm. The hard tag may then alarm when the pin is violated. A CableLok™ device may be armed in response to a bayonet being inserted and the continuity of the bayonet may be monitored such that the device is configured to alarm in response to the bayonet being cut and the continuity being disrupted. SpiderWraps™ may also alarm in response to a cable being cut. Keepers may arm via a slide switch and may alarm in response to the lid of the keeper being violated.

In some applications, the mounting device 52 may be unlockable by the implementation of a key. The key may be embodied in many different ways. In this regard, in some situations, the key may be a specially formed device that mates mechanically with some portion of the mounting device 52 in order to disable a locking mechanism of the mounting device 52. As an alternative, the key may be a magnetic device configured to interface with a locking mechanism of the mounting device 52 to enable the mounting device 52 to be unlocked to permit removal of the mounting device 52 from the corresponding product to which the mounting device 52 is affixed. As yet another alternative, the key may actually include an electrical component for exchanging signals or information with the mounting device 52 to enable unlocking of the mounting device 52. As such, for example, the key could be an embodiment of the configurable monitoring device 10 that is provided with specific configuration information defining functionality for the configurable monitoring device 10 to function as the key for unlocking the mounting devices of other configurable monitoring devices. In such implementations, the key (or the configuration information associated with the key) may include a software component or code that is unique to a particular individual (e.g., a specific manager or assistant manager). Furthermore, the configurable monitoring device 10 configured to function as a key may report unlocking activities and/or other information regarding other devices encountered or activities undertaken to a local or remote database so that activity of the key may be monitored. Additionally, authenticity of the code may be defined or verified so that, for example, if a particular manager's key is lost or a manager leaves, the corresponding code for the manager's key may be invalidated so that further unlocking operations with the manager's key may not be possible. In addition to or as an alternative to unlocking mounting devices, the key may be useful for setting an alarm or turning an alarm on or off.

In some embodiments, the sensor 50 may be a portion of or otherwise positioned to monitor activity with respect to the mounting device 52. Thus, for example, the sensor 50 may be configured to determine whether the enclosure is opened or the wrap is cut, stretched, mutilated or otherwise damaged. The sensor 50 may alternatively be configured to determine whether the mounting device 52 is removed from the corresponding product to which the mounting device 52 was attached. Accordingly, in response to the sensor 50 detecting attempts to remove the configurable monitoring device 10 from the product, the sensor 50 may provide an indication to the configuration manager 24 (e.g., via the processor 20) and the configuration manager 24 may take appropriate action (e.g., change the mode of operation of the configurable monitoring device 10 or signal the alarm module 26 to issue an alarm response, and/or the like).

As indicated above, the mounting device 52 may, in some cases, not attach the configurable monitoring device 10 to a product. As such, the mounting device 52 may alternatively comprise a stand, base or other support for enabling the positioning of the configurable monitoring device 10 in a desirable location. In some situations, the mounting device 52 may include an adhesive or other mechanism for attaching the configurable monitoring device 10 to a surface such as a ceiling, floor, desk, display case, table, platform, door, door jamb, vehicle, or other structure. When mounted to such structures, the configurable monitoring device 10 may often be operated in a node (router), hub or gateway mode. In an exemplary embodiment, by providing a configurable monitoring device on each door jamb of a building exit, the configurable monitoring devices on each side of the door jamb may form an EAS gate.

In various embodiments, the configurable monitoring device 10 may operate in any of various different modes and therefore perform any of various corresponding roles. Some examples of some of these modes will be described in greater detail below. Multi-modal operation of the configurable monitoring device 10 may, in some cases, extend to relatively broad classifications that relate to corresponding operational roles of the configurable monitoring device 10. For example, in some situations, the configurable monitoring device 10 may be dynamically configured to operate in accordance with roles defined for a security mode, a marketing mode, an inventory management mode, and/or the like. Furthermore, each mode may include sub-modes. For example, some examples of sub-modes of operation may include a tag mode or node mode, each with a corresponding role of acting as a tag or a node, respectively. Some embodiments may permit definition of additional sub-modes and corresponding roles such as, for example, operation as a hub or gateway. However, in alternative embodiments, tag mode, node mode and other modes of operation may themselves be primary modes of operation and not necessarily sub-modes.

Figure 1C:
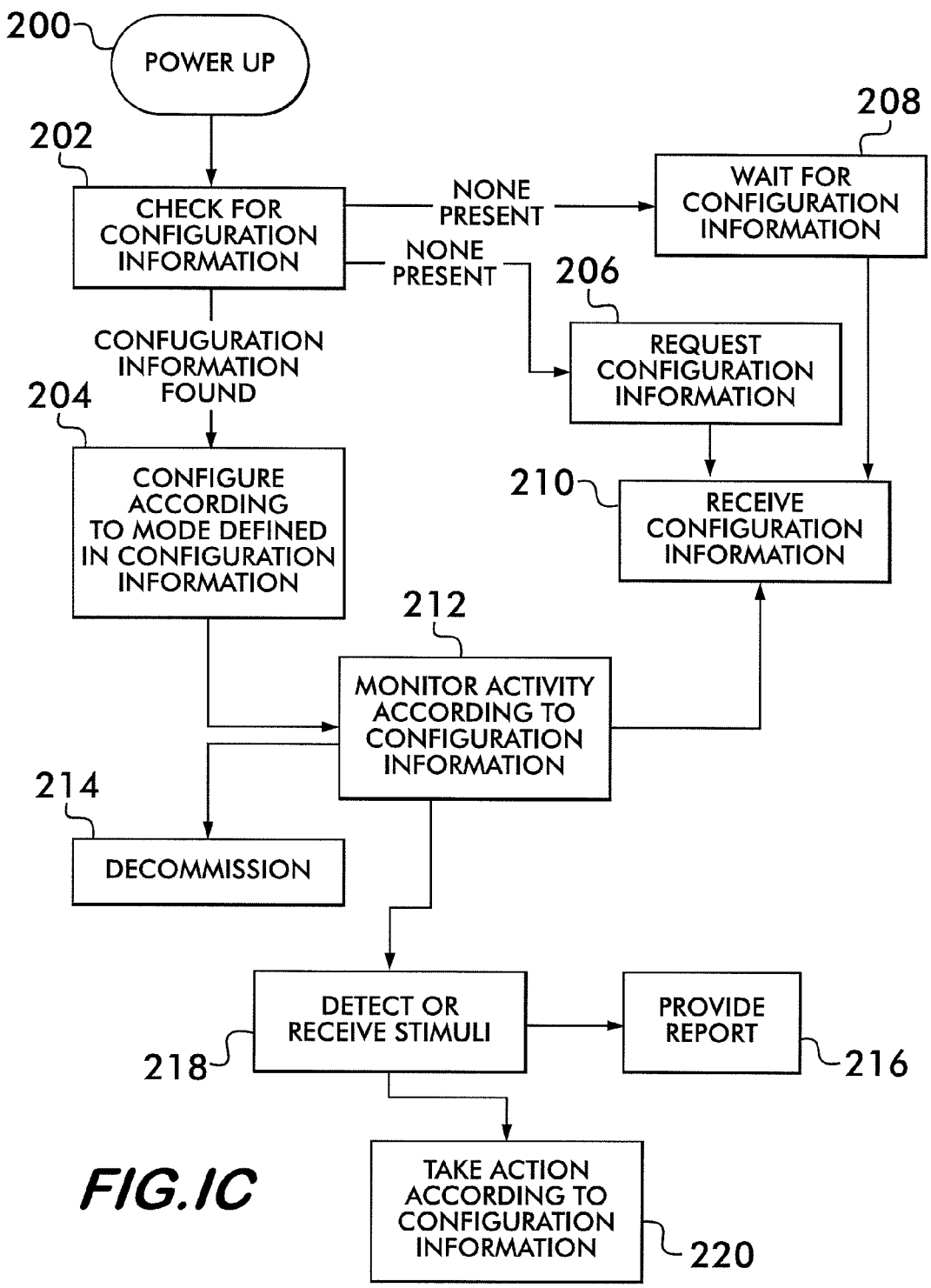
FIG. 1C illustrates is a flow diagram illustrating the configuration of a CMD according to an exemplary embodiment.

FIG. 1C shows an example of a flow diagram illustrating configuration of the configurable monitoring device according to an exemplary embodiment. In this regard, as shown in FIG. 1C, a configurable monitoring device may initially be powered up (or initialized) at operation 200. Subsequent to power up or initialization, the configurable monitoring device may check for configuration information at operation 202. If configuration information is found, the configurable monitoring device may configure itself according to the configuration information found at operation 204. If no configuration information is found, the configurable monitoring device may either request configuration information from the nearest node or gateway at operation 206 or simply wait to receive configuration information and enter an idle mode in the meantime at operation 208. At operation 210, either in response to a request for configuration information or responsive to direction to provide configuration information to the configurable monitoring device that is either manually or automatically generated, the configurable monitoring device may receive configuration information. Reception of configuration information may trigger the configurable monitoring device to configure itself according to the configuration information found at operation 204. After being configured, the configurable monitoring device may monitor activity according to the configuration information at operation 212. At any time during monitoring, new configuration information may be received to trigger reconfiguring of the configurable monitoring device at operation 204. However, during monitoring, any one of several occurrences may be encountered. For example, the configurable monitoring device could be decommissioned at operation 214 or report activity to another configurable monitoring device (e.g., a node, gateway or hub) or an external device at operation 216. In some cases, a specific stimulus may be detected at the configurable monitoring device or the configurable monitoring device may receive notification of the stimulus from another configurable monitoring device at operation 218. In response to the detection of the stimuli, the configurable monitoring device may report the activity at operation 216 or take action according to the configuration information (e.g., as defined by the configuration manager 24) at operation 220.

FIG. 2 illustrates basic block diagram of a monitoring terminal 62 according to an exemplary embodiment. As shown in FIG. 2, the monitoring terminal 62 may include various components that support both the basic operation of the monitoring terminal 62 and the relatively more sophisticated operation of the monitoring terminal 62 as a coordinator of a monitoring system. Some examples of these components are shown in FIG. 2. However, it should be appreciated that some example embodiments may include either more or less than the example components illustrated in FIG. 2. Thus, the example embodiment of FIG. 2 is provided by way of example and not by way of limitation.

Reference will now be made to FIG. 2 to describe an example structure and functional operation of the monitoring terminal 62 according to an exemplary embodiment. In this regard, as shown in FIG. 2, the monitoring terminal 62 may include a processor 250 and a communication interface 252. In some example embodiments, the monitoring terminal 62 may include a user interface 258. The processor 250 may in turn communicate with, control or embody (e.g., via operation in accordance with corresponding instructions) a monitoring system manager 256.

In an exemplary embodiment, the processor 250 ma be configured (e.g., via execution of stored instructions or operation in accordance with programmed instructions) to control the operation of the monitoring terminal 62. The processor 250 may be embodied in a number of different ways. For example, the processor 250 may be embodied as one or more of various processing means or devices such as a coprocessor, a microprocessor, a controller, a digital signal processor (DSP), a processing element with or without an accompanying, DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an exemplary embodiment, the processor 250 may be configured to execute instructions stored in a memory device (e.g., memory device 254 of FIG. 2) or otherwise accessible to the processor 250. The instructions may be permanent (e.g., firmware) or modifiable (e.g., software) instructions. Alternatively or additionally, the processor 250 may be configured to execute hard coded functionality. As such, whether configured by hardware or software methods, or by a combination thereof, the processor 250 may represent an entity (e.g., physically embodied in circuitry) capable of performing operations according to embodiments of the present invention while configured accordingly. Thus, for example, when the processor 250 is embodied as an ASIC, FPGA or the like, the processor 250 may be specifically configured hardware for conducting the operations described herein. Alternatively, as another example, when the processor 250 is embodied as an executor of software or firmware instructions, the instructions may specifically configure the processor 250 to perform the algorithms and/or operations described herein when the instructions are executed. The processor 250 may include, among other things, a clock, an arithmetic logic unit (ALU) and logic gates configured to support operation of the processor 250.

The memory device 254 may include, for example, one or more volatile and/or non-volatile memories. In other words, for example, the memory device 254 may be an electronic storage device (e.g., a computer-readable storage medium) comprising gates (e.g., logic gates) configured to store data (e.g., bits) that may be retrievable by a machine (e.g., a computing device including a processor such as processor 250). The memory device 254 may be configured to store information, data, applications, instructions or the like for enabling the monitoring terminal 62 to carry out various functions in accordance with exemplary embodiments of the present invention. For example, the memory device 254 could be configured to buffer input data for processing by the processor 250. Additionally or alternatively, the memory device 254 could be configured to store instructions for execution by the processor 250.

The user interface 258 may be in communication with the processor 250 to receive user input via the user interface 258 and/or to present output to a user as, for example, audible, visual, mechanical or other output indications. The user interface 258 may include, for example, a keyboard, a mouse, a joystick, a display (e.g., a touch screen display), a microphone, a speaker, or other input/output mechanisms. Further, the processor 250 may comprise, or be in communication with, user interface circuitry configured to control at least some functions of one or more elements of the user interface. The processor 250 and/or user interface circuitry may be configured to control one or more functions of one or more elements of the user interface through computer program instructions (e.g., software and/or firmware) stored on a memory accessible to the processor 250 (e.g., volatile memory, non-volatile memory, and/or the like). In some example embodiments, the user interface circuitry is configured to facilitate user control of at least some functions of the monitoring terminal 62 through the use of a display configured to respond to user inputs. The processor 250 may also comprise, or be in communication with, display circuitry configured to display at least as portion of a user interface, the display and the display circuitry configured to facilitate user control of at least some functions of the monitoring terminal 258.

The communication interface 252 may be any means such as a device or circuitry embodied in either hardware, software, or a combination of hardware and software that is configured to receive and/or transmit data from/to a network and/or any other device or module in communication with the monitoring terminal 62. According to some example embodiments where the monitoring terminal 62 is directly connected to the monitoring system, the communications interface 252 may include an appropriately configured configurable monitoring device. Further, the communication interface 252 may include, for example, an antenna (or multiple antennas) and supporting hardware and/or software for enabling communications with a wireless communication network 30 or other devices (e.g., other configurable monitoring devices). In some environments, the communication interface 252 may alternatively or additionally support wired communication. As such, for example, the communication interface 252 may include a communication modem and/or other hardware/software for supporting communication via cable, digital subscriber line (DSL), universal serial bus (USB) or other mechanisms.

In an exemplary embodiment, the communication interface 252 may support communication via one or more different communication protocols or methods. In some embodiments, the communication interface 252 may be configured to support relatively low power, low data rate communication. As such, for example, a low power and short range communication radio (e.g., radio transmitter/receiver) may be included in the communication interface 252. In some examples, the radio transmitter/receiver may include a transmitter and corresponding receiver configured to support radio frequency (RF) communication in accordance with an IEEE (Institute of Electrical and Electronics Engineers) communication standard such as IEEE 802.15. As such, for example, some embodiments may employ Bluetooth, Wibree, ultra-wideband (UWB), WirelessHART, MiWi or other communication standards employing relatively short range wireless communication in a network such as a wireless personal area network (WPAN). In some cases, IEEE 802.15.4 based communication techniques such as ZigBee or other low power, short range communication protocols such as a proprietary technique based on IEEE 802.15.4 may be employed.

In an exemplary embodiment, the communication interface 252 may additionally or alternatively be configured to support communication via radio frequency identification (RFID) or other short range communication techniques. Accordingly, the monitoring terminal 62 may be configured to interface configurable monitoring devices, in addition to conventional RFID tags and modules. In another embodiment, the monitoring terminal 62 may be configured to interface a barcode scanner, or other data entry devices.

As mentioned above, monitoring terminal 62 may be directly connected to the monitoring system via a configurable monitoring device configured as a gateway, or the monitoring terminal 62 may be connected to the monitoring system 60 via a gateway and an external network 30. The network 30 to which the communication interface 252 may connect may be a local network (e.g., a WPAN) that may in some cases further connect to or otherwise communicate with a remote network on either a periodic or continuous basis. The network 30 may include a collection of various different nodes, devices or functions that may be in communication with each other via corresponding wired and/or wireless interfaces.

As indicated above, the processor 1250 of the monitoring terminal 62 may be embodied as, include or otherwise control the monitoring system manager 256. The monitoring system manager 256 may be any means such as a device or circuitry operating in accordance with firmware/software or otherwise embodied in hardware or a combination of hardware and firmware/software (e.g., processor 1250 operating under software control, the processor 1250 embodied as an ASIC or FPGA specifically configured to perform the operations described herein, or a combination thereof) thereby configuring the device or circuitry to perform the corresponding functions of the monitoring system manager 256, as described herein. Thus, in examples in which software is employed, a device or circuitry (e.g., the processor 1250 in one example) executing the software forms the structure associated with such means.

The monitoring system manager 256 of the monitoring terminal may be configured to coordinate, manage, and configure the operation of configurable monitoring devices. In this regard, the monitoring system manager 256 may be configured to perform a number of activities with regard to a monitoring system as further described below and otherwise herein. While the monitoring system manager 256 may be configured to perform all of the functionality described with respect to the monitoring system manager 256 herein, it is also contemplated that the monitoring system manager 256 could be configured to perform any sub-set of the described functionality.

The configuration information may include role policy information that indicates the functionality that the configurable monitoring device should perform within the device's assigned role, and attribute information, such as associated product attributes. Attribute information may be data that a configurable monitoring device may utilize within the role to perform functionality. For example, if a product that the configurable monitoring device is affixed to is clothing, the attribute information may include a clothing classification (e.g., shirt, pants, tie, dress, etc.), a color or colors indicator, a size indicator, a price indicator, a lot indicator, and the like.

Based on the attribute information, the functionality performed by a configurable monitoring device may be determined. For example, configurable monitoring devices configured with the same role policy information, may trigger different types of alarm responses based on the price of the product. According to some example embodiments, attribute information may be stored in a central location, rather than at the configurable monitoring device, and the configurable monitoring devices may access this information remotely via the network of the monitoring system as needed.

According to some example embodiments, the configuration information may include executable code that is possibly decompressed, and stored on the configurable monitoring, device for subsequent execution by the configurable monitoring device. However, in some example embodiments, to configurable monitoring device may be manufactured with executable code in the form of configuration information stored within the memory of the device. Alternatively, a hardware device, such as a memory device or preconfigured processing device with pre-stored configuration information may be inserted into and/or electrically connected to the configurable monitoring device to provide configuration information and assign a role to the configurable monitoring device. The pre-stored configuration information may be directed to a number of possible roles that the configurable monitoring device could be configured to perform. In this regard, to configure the configurable monitoring device, the monitoring, system manager 256 may provide a message including an indicator of which role the configurable monitoring device is to perform. The configurable monitoring device may receive the indicator and begin performing the role described by the indicator by executing the appropriate portion of the pre stored configuration information.

In addition or as an alternative, the gateway node (G) may be in communication with a monitoring terminal (MT) 190. The monitoring terminal 190 may be a computing device such as a laptop, PC, server or other terminal to which information exchanged within the mesh network is reported and from which information may be received. In some embodiments, the monitoring terminal 190 may include a database and/or other information recording devices configured to record activity reported by the nodes. For example, movement of tags, product and/or marketing information received from tags or provided responsive to movement of tags, tag position and/or position history, mode changes, configuration changes and other information may be recorded for monitoring by store personnel or other operators either locally or remotely. Furthermore, in some cases, the monitoring terminal 190 may be used to interface with tags or nodes by providing configuration information for communication to specific tags and/or nodes. As such, according to an exemplary embodiment, the monitoring terminal 190 may also include at least a display and user interface to enable an application with a graphical user interface (GUI) tailored to enabling monitoring activities associated with and/or communicating with configurable monitoring devices. Accordingly, the GUI may also be configured to enable use of the monitoring terminal 190 for defining configuration information for provision to the tags or nodes.

Once a configurable monitoring device is assigned a role via the configuration information, the device may begin operating within its respective role. Roles or configurations may be simple or complex based on, for example, the processing capabilities and the memory storage available to a configurable monitoring device. In this regard, a configurable monitoring device may be configured to perform minimal data processing, and the monitoring terminal 190 may be configured to perform incrementally more processing of data. Alternatively, some configurable monitoring devices may include relatively higher processing power and larger memory storage to support increased data processing at the configurable monitoring device, rather than at the monitoring terminal 190.

Alternatively, in embodiments where the configurable monitoring device includes a relatively large storage memory, attribute information describing the article to which a configurable monitoring device is affixed may be stored local to the tag, within the storage memory of the tag. When an inquiry device (e.g., price scanner, inventory scanner) requests the attribute information from the tag, the tag may directly communicate, or initiate the communication of, the attribute information from the tag to the inquiry device.

The following describes some of the roles that may be implemented by the configurable monitoring devices and the interactions that may involve the monitoring terminal 62 and the monitoring system manager 256 while the configurable monitoring devices are operating within their roles. As described above, and generally herein, a configurable monitoring device may include a processor and a memory. The processor may be configured to support network communications. According to various example embodiments, the processor may be configured, for example, via instructions stored on the memory (e.g., instructions derived from configuration information), to support communications in accordance with a role defined by configuration information. Further, the processor of the configurable monitoring device may include input/output (I/O) ports (or pins). Via configuration information, the I/O ports may be configured to interface with any number of external devices such as, electronic security devices, alarms, speakers, microphones, lights (e.g., light emitting diodes (LEDs)), buttons, keypads, monitors, displays (e.g., for changeable pricing labels), sensors (e.g., accelerometers, movement sensors, light sensors, temperature sensors), cameras, security gates, store audio systems, customer counters, lighting switches, employee communicators (e.g., headsets, handheld radios), door strike mats, jewelry case mats, Lojack® devices, global positioning system (GPS) devices, and the like. As such, the I/O ports may be configured to support one or more roles that the configurable monitoring device may be configured to perform.

Via the I/O ports of the processor, various functionalities may be triggered, based on the role and the configuration information of the configurable monitoring, device. Following from the discussion above, triggering may be initiated either at the configurable monitoring device level or at the monitoring terminal level. For example, the I/O ports of a configurable monitoring device's processor may interlace with a display for a price tag, when the configurable monitoring device is configured as a tag. Within the tag's configured role, for example, the price depicted on the display may be set to reduce at a given time. In some example embodiments, the time may be monitored by the processor of the tag and when the given time is reached, the processor may direct the I/O ports and the connected display to depict a reduced price. Alternatively, an example that includes triggering at the monitoring terminal level may include the time being monitored by the monitoring terminal, and the monitoring terminal may communicate a message including a reduced price, or an indication to reduce the price, to the tag at the given time to trigger the tag to reduce the price accordingly.

While the roles described herein may be considered from the perspective of an implementation in a retail sales environment, the scope of the invention should not be limited to such implementations. For ease of understanding, FIG. 3, which illustrates an example retail environment 100, is referred to in order to describe some of the roles that may be implemented by the configurable monitoring devices within an exemplary monitoring system.

Figure 3:
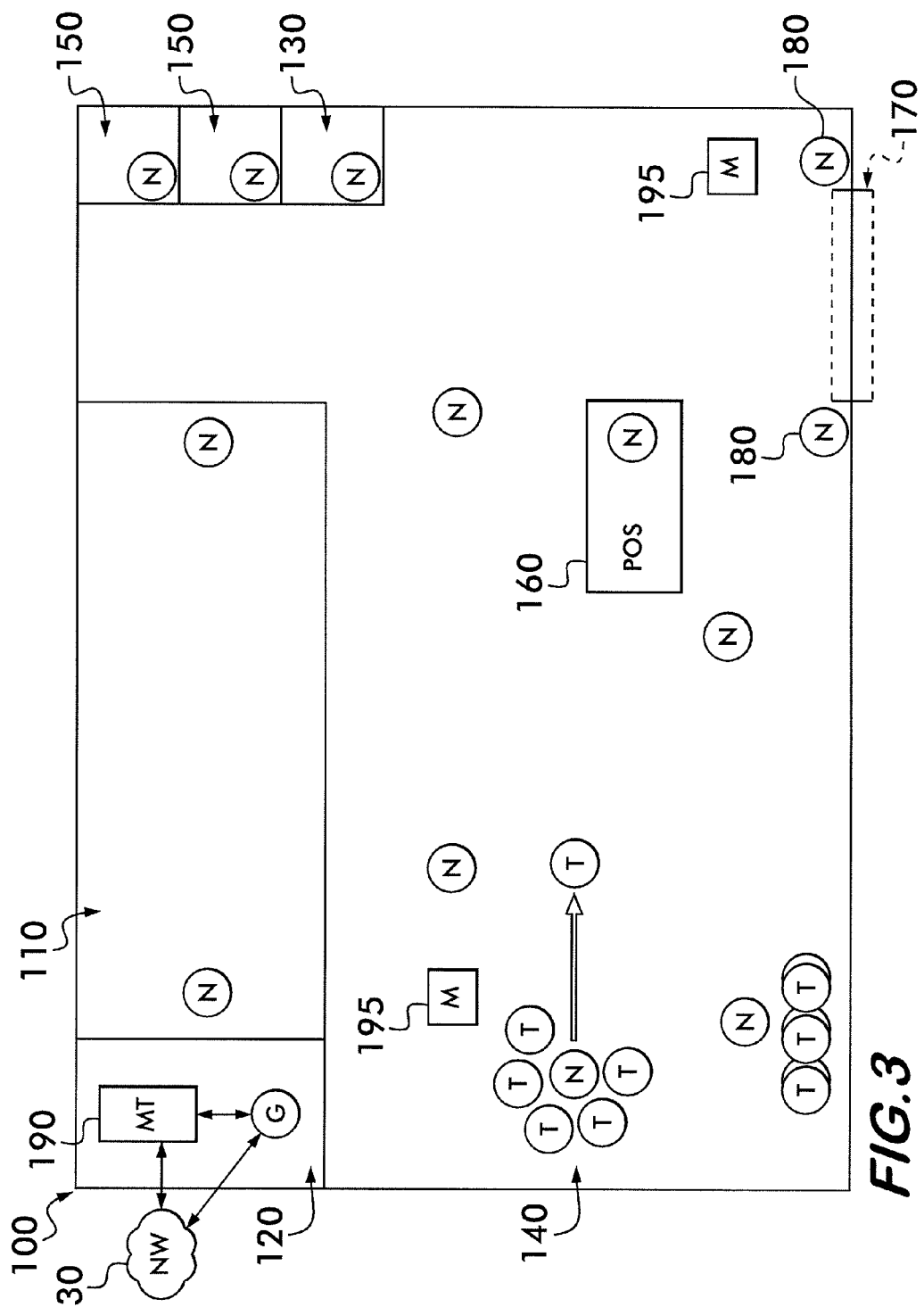
FIG. 3 illustrates a diagram of various configurable monitoring devices implemented in an example retail environment in accordance with an example embodiment of the present invention.

FIG. 3 illustrates a diagram of various configurable monitoring devices configured to define a monitoring system. In this regard, FIG. 3 depicts an exemplary retail environment 100 including a stock room 110 where excess inventory is maintained, an office space 120 from which monitoring activity may be coordinated or otherwise viewed (e.g., via a monitoring terminal 62), fitting rooms 130 in which articles of clothing may be tried on by potential buyers, a retail floor 140 on which various products may be displayed or otherwise made available for buyers to purchase and restrooms 150. FIG. 3 also depicts a point of sale (POS) terminal 160 at which payment may be made for products and a door 170 through which customers may enter and exit the retail floor 140.

Within a retail environment application, various different products may each be provided with a corresponding configurable monitoring device operating as a tag. Furthermore, several other configurable monitoring devices may be provided at various locations throughout the retail environment to operate, for example, as nodes. In this regard, the location of a node within the retail environment may be known (e.g., coordinates of the nodes may be known) to, for example, the monitoring terminal 62 and the monitoring system manager 256 to facilitate implementation of a real-time location system (RTLS) for the tags via the nodes. Several configurable monitoring devices operating in a tag mode are illustrated in FIG. 3 as circles with the letter "T" therein. Some other configurable monitoring devices may be configured during commissioning to operate in a node mode. Examples of configurable monitoring devices operating in node mode are shown in FIG. 3 as circles with the letter "N" therein. Still others (or a single configurable monitoring device) may be configured to operate as gates or in a hub or gateway mode. While configurable monitoring devices may be configured as tags, nodes, gateways, etc., each of these roles may be further refined, for example via configuration information, to specialize the functionality of a configurable monitoring device within a particular role.

Figure 12:
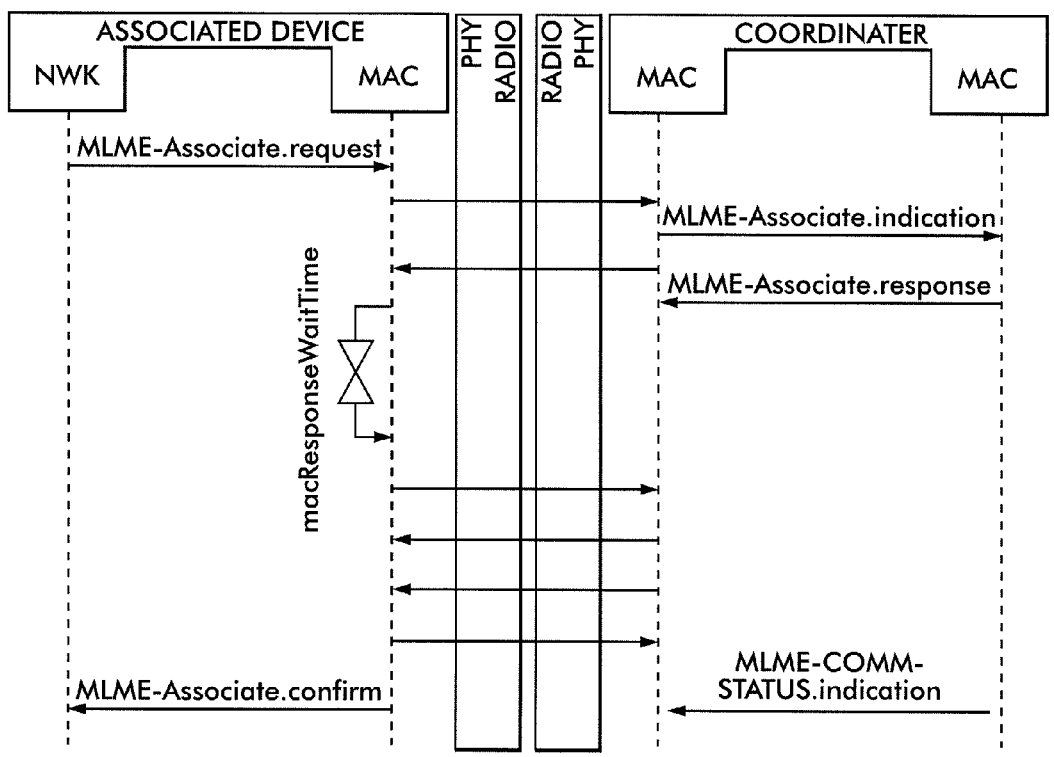
FIG. 12 illustrates a signaling diagram for an association procedure according to an example embodiment.
Figure 13:
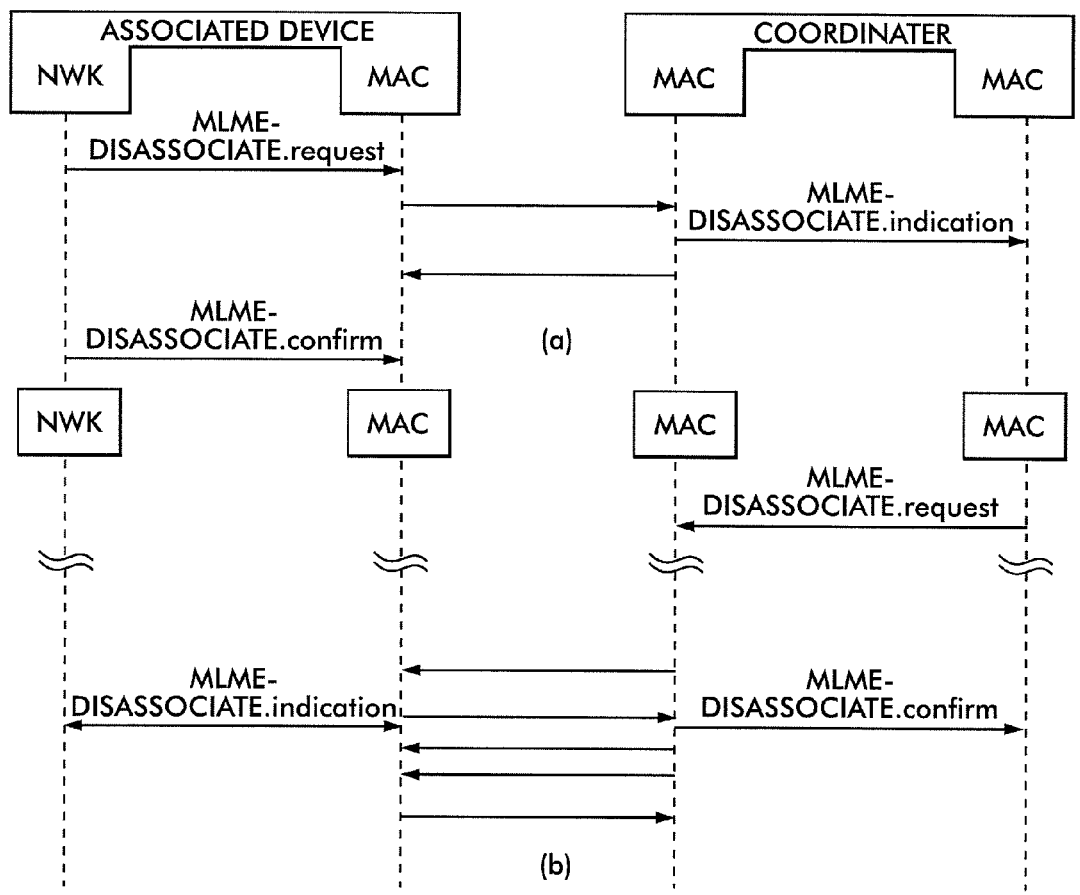
FIG. 13 illustrates a signaling diagram for a dissociation procedure according to an example embodiment.

To join the monitoring system, a configurable monitoring device may first be associated with the monitoring system. To associate the configurable monitoring device to a monitoring system, and join the communications network of the monitoring system, a configurable monitoring device to be associated may perform an association procedure, such as the example association procedure depicted in FIG. 12. To associate a configurable monitoring device a network coordinator may be utilized. A messaging procedure, such as the procedure described in FIG. 12 may be performed between the coordinator and the associated device. The associated device may provide MAC layer association procedures as a service to the network (NWK) layer. The NWK layer may manage the network formation. Similarly, FIG. 13 depicts an example dissociation procedure for use when a configurable monitoring device intends to leave the network.

Various techniques may be utilized to associate and dissociate a configurable monitoring device. For example, a specific network identifier (e.g., PAN ID) may be provide to the configurable monitoring device at manufacturing. Further, low transmission power association and dissociation may be implemented using close proximity signaling. Further, hardware, switches (e.g., DIP (dual in-line processor) switches), jumpers, MAC address filtering, button actuated association/dissociation, separate communications associating/dissociating, or a barcodes scanner may be used for associated or dissociated.

A configurable monitoring device configured to operate as a tag may perform functionalities supporting security functions, inventory functions, marketing functions, combinations thereof, and the like. In this regard, subsequent to configuring a configurable monitoring device as a tag, a commissioning or binding procedure may be performed. Prior to commissioning, a configurable monitoring device may be configured as a tag, but the device may not yet be associated with, or affixed to, a product. Upon associating the tag with a product, the tag may be commissioned. The monitoring terminal 62 and the monitoring system manager 256 may manage the commissioning and decommissioning of tags via wireless communications with the tags. For example, the procedure for commissioning and decommissioning a tag may include RFID scanning the tag, a barcode scanning the tag, and/or hardware (e.g., specialized microchip) attachment or connection.

To commission a tag, the monitoring system manager 256 may provide a signal to the tag indicating that the tag is now active with respect to its configured role. In this regard, alarming, inventory, and marketing functionality may be activated. While commissioned, the tag may continue to receive instructions or other information useful for making determinations as to the functionality to be employed and the corresponding role/mode of operation to assume.

Decommissioning of the tag may include powering down the tag, clearing or resetting data (e.g., product specific information), or directing the tag to enter an idle or non-transmitting mode in order to conserve battery power until the tag is re-commissioned. The tag may be decommissioned by instructions and/or signals received from the monitoring terminal 62 and the monitoring system manager 256.

Decommissioning may occur at a point of sale, such as POS 160. A node associated with the point of sale (POS node) may be configured, via configuration information, to perform decommissioning functionality. In this regard, the POS node may be configured to decommission the tag when the product is entered into a sales transaction. The monitoring system manager 256 may be configured to interface with a sales database or sale system to monitor transactions. Upon detecting a transaction, data about the product involved in the transaction may be acquired, and, based on the acquired data, a decommission signal may be transmitted to the affected tag. According to some example embodiments, direct access to a sales database or sales system may not be available due to concerns regarding the confidentiality of sales and customer information. In these situations, example embodiments of the present invention may implement a barcode scanning wedge as an interface to the transaction activities without accessing the sales database or sales system.

According to some example embodiments, a battery check may be performed by a tag during decommissioning. In this regard, the configurable monitoring device may include the hardware and software (e.g., processor configured by instructions) to provide for monitoring the battery charge level. If the battery charge level for a tag has fallen below a given threshold, the tag may alarm or otherwise indicate to the store personnel that the tag should be removed from service for recharging or battery replacement. Tags that have battery levels above the given threshold may be decommissioned and identified as being available for re-commissioning. According to some example embodiments, a tag having a battery level that has fallen below a given threshold may be prevented from being re-commissioned until the battery charge level is sufficiently improved. This would also desirably limit the need for a store clerk to retrieve low battery tags from the field or store environment.

The barcode scanning wedge may be installed in-line between a barcode scanner and a point of sale checkout terminal for receiving data acquired by the barcode scanner. The wedge may be configured to intercept some or all data acquired by the barcode scanner and to provide the data to a monitoring system, for example, via a POS node, without otherwise interrupting the flow of data to the point of sale terminal.

The wedge may be configured to facilitate the commissioning or decommissioning of a communications tag that is part of a monitoring system. For example, when a cashier scans a barcode of a product during a purchase transaction, data confirming the transaction may be uploaded to the monitoring system and the monitoring system manager 256 via the wedge. Confidential consumer and sales information would not be uploaded to the retail security network. In response to receiving a sales confirmation, the monitoring system manager 256 may be configured to transmit a decommission signal to an associated tag attached to the purchased product to cause the tag to be decommissioned. Decommissioning may be associated with removal of the tag from the product and/or removal or modification of a record or information (e.g., inventory information) for the tag stored by the monitoring system manager 256, for example, in the memory device 254.

Figure 11:
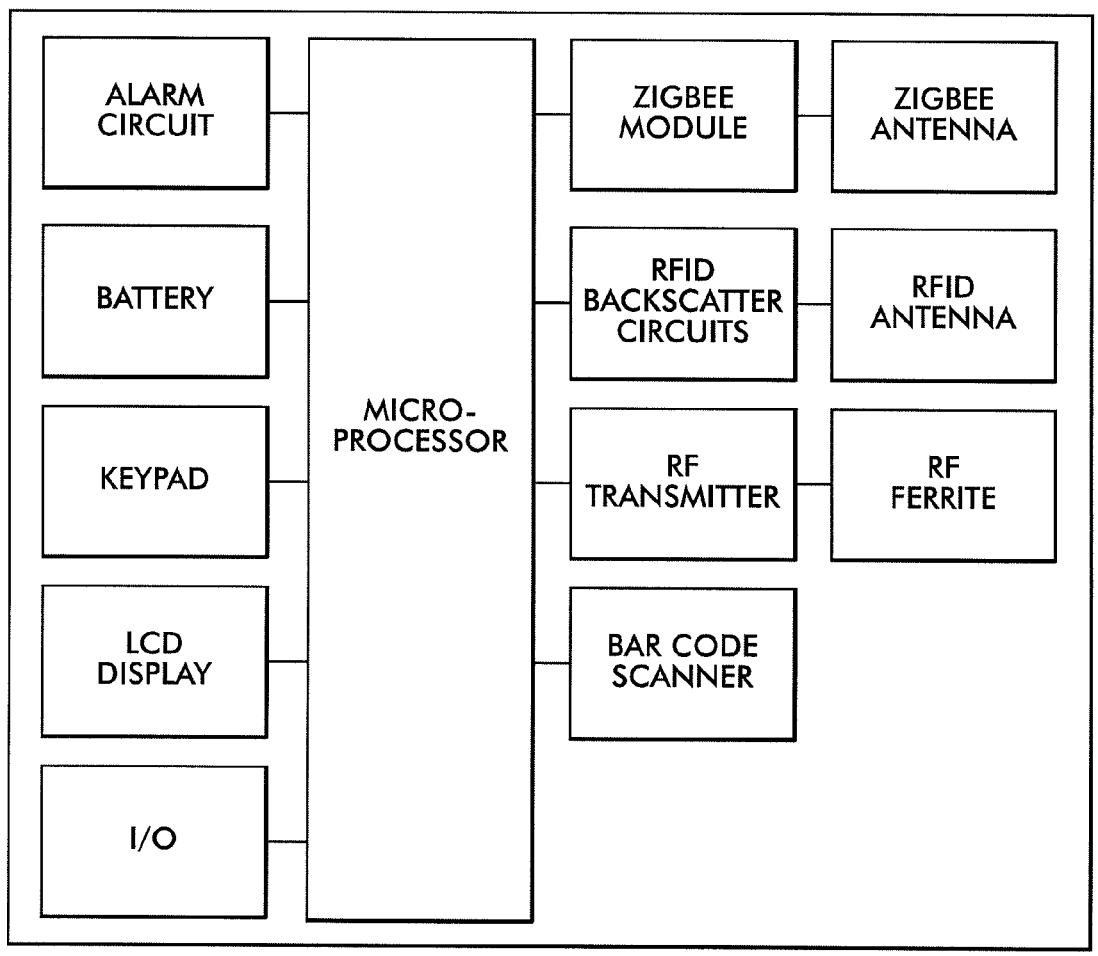
FIG. 11 illustrates an example configurable monitoring device with specialized hardware for performing some of the functionality within the role of a key according to an example embodiment.

A configurable monitoring device may also be configured as a manager's key to be implemented within the monitoring system. FIG. 11 depicts an example Nock diagram of a key, such as manager's key. The key of FIG. 11 is depicted as using the Zigbee protocol, but any protocol may be used. In some applications, a mounting device that mechanically protects a product may be unlockable by the implementation of a key. According to some exemplary embodiments, the mourning device may be a pin tag (for protecting: clothing), a keeper or plastic enclosure (for protecting compact disks, software, cologne, and the like), a Spider Wrap™ or wire wrap device (for protecting larger boxed products), or the like. One such mounting device ma be configured to attach to the shaft of a golf club or similar article such as the device disclosed in U.S. Pat. No. 7,266,979 herein incorporated by reference in its entirety. Other such mounting devices may be configured to attach to a bottle neck or a bottle cap such as the devices disclosed in U.S. Pat. Nos. 7,259,674 and 7,007,523, both herein incorporated by reference in their entirety. Still other mounting devices may be configured to attach through a product such as an article of clothing or a blister pack such as the hard-tag disclosed in U.S. Pat. No. 6,920,769 incorporated herein by reference in its entirety. Each of the aforementioned patents being commonly owned by the assignee of the present application.

As mentioned above, Alpha Security Products' Spider Wrap™, which is disclosed in U.S. Pat. No. 7,162,899 and herein incorporated by reference in its entirety, may also be configured to operate as a mounting device. Further, a cable lock, such as the Alpha Security Products' Cablelok™ device disclosed in U.S. Pat. No. 7,249,401 or a keeper, such as that disclosed in U.S. Pat. No. 6,832,498 may be a mounting device. Each of the aforementioned patents being commonly owned by the assignee of the present application and herein incorporated by reference in their entirety.

The key may be embodied in many different ways. In this regard, in some situations, the key may be a specially formed device that mates mechanically with some portion of the mounting device in order to disable a locking mechanism of the mounting device. As an alternative, the key may be a magnetic device configured to interface with a locking mechanism of the mounting device to enable the mounting device to be unlocked to permit removal of the mounting device from the corresponding product to which the mounting device is affixed. As yet another alternative, the key may actually include an electrical component for exchanging signals or information with the tag associated with the mounting device to enable unlocking of the mounting device. As such, for example, the key could be an embodiment of a configurable monitoring device that is provided with specific configuration information defining functionality for the configurable monitoring device to function as the key for unlocking the mounting devices of tags. In such implementations, the key (or the configuration information associated with the key) may include a software component or code that is unique to a particular individual (e.g., a specific manager or assistant manager).

The key may also report unlocking activities and/or other information regarding other devices encountered or activities undertaken to monitoring system manager 256, so that activity of the key (or persons possessing the key) may be monitored, logged, and/or tracked. Additionally, authenticity of the code may be defined or verified so that, for example, if a particular manager's key is lost or a manager leaves, the corresponding code for the manager's key may be invalidated so that further unlocking operations with the manager's key may not be possible. With respect to the security of the key itself, the key may be configured to alarm and/or destroy necessary aspects of the key's functionality if the key is, for example, improperly removed from the retail environment. For example, the key may clear the memory of the key, rendering the key useless.

Utilization of the key for unlocking security devices may be limited by rules stored on the key or at a monitoring terminal. For example, rules for using the key may be defined with respect to the location of the key (e.g., inside/outside the store, inside/outside a department zone), the employee using the key (e.g., as indicated by a pass code or detection of a user's RFID tag), a time of day, a day of the week, a work schedule. Use of the key in violation of the rules may cause the key to alarm.

In addition to, or as an alternative to unlocking mounting devices, the key may be useful for setting an alarm or turning an alarm on or off. In this regard, to utilize the key, a button on the key may be actuated which indicates that the key is preparing to or is performing a locking or unlocking function. An indication that the button has been pressed may be commutated to the tag that is to be interacted with or the monitoring terminal. Further, in consideration of the locating functionality described below, the key may be located and tracked, and zones of use (e.g., the key cannot be used in the stock room 110) and other rules may be defined and enforced with respect to the key.

According to some example embodiments, a configurable monitoring device configured as a tag, whether commissioned or decommissioned, may provide a status signal (or heartbeat signal) to the monitoring system. The status signal may be a short transmission of a unique identifier for the tag. The status signal may be provided an indication that a battery is not yet drained or that the tag is otherwise properly functioning. The status signal may also be used for RTLS purposes as further described below. The status signal may be received by the monitoring system manager 256. The monitoring system manager 256 may maintain a log of the most recent receipt of a status signal from a tag. If the tag fails to provide a status signal within a threshold period of time, an alarm or error indication may be generated.

According to some example embodiments, nodes of the monitoring system may be configured to provide beacon signals. The tags may be configured to receive a beacon signal and communicate information in response to receipt of a beacon signal. For example, battery status, alarm status, received signal strength, and the like may be provided in response to a beacon signal.

As alluded to above, within the role of a tag various functionalities may be implemented, such as advanced security functionalities. For example, complex alarming conditions may be defined for a tag based on data received from sensors on the tag, location information, movement information, and the like. For example, tags may be configured to operate as or with EAS tags, such that when the tag passes through an EAS gate, the EAS gate may detect the tag (or a connected EAS tag), and possibly sound an alarm. According to some example embodiments, the monitoring terminal 62 may have received a communication regarding the alarm condition.

With regard to operation within EAS systems, configurable monitoring devices may be configured to operate as tags to be detected, or as gate nodes for detecting tags. In this regard, via configuration information provided to a configurable monitoring device, the configurable monitoring device may assume the role of a gate node, such as gate nodes 180 located at the doorway 170. The gate nodes may be configured to detect passing EAS tags, such as a conventional EAS tag or a configurable monitoring device configured to operate as an EAS tag, and sound an alarm (e.g., an alarm included on the tag, an alarm included with the gate node, a storewide alarm). A gate node may directly sound a local alarm, or the gate node may communicate with the monitoring system manager 256 to sound an alarm.

It is noteworthy that, due to the dynamic reconfiguration ability of configurable monitoring devices, any configurable monitoring device may be configured to operate as a gate node. As such, EAS gates may be implemented dynamically at many locations within a retail environment. For example, configurable monitoring devices that have been configured to operate as tags and are affixed to a product on a shelf within the retail environment may also be re-configured to operate as a gate node for the aisle where the products are located.

In addition to performing EAS functionality, a monitoring system may be configured to perform additional advanced security functionality. Some advanced security features, as well as a number of other inventory, marketing, and other features may rely upon implementation of an RTLS within a monitoring system. To implement RTLS solutions, configurable monitoring devices may be configured as location nodes.

According to some example embodiments, the beacon signals generated by the nodes may be used for locating a tag. In this regard, a tag may be configured to report to, for example, the monitoring terminal that the tag is currently within the range of a beacon signal provided by a particular node. The nodes may be configured to randomly, based on an algorithm, modify the beacon signal strength. When the signal strength is modified, some tags that were in range may no longer be in range, or some tags that were previously in range may now be within range of the beacon signal. As tags come in and out of range, due to the changing signal strength, the signal strength at the time may be used to determine the distance that a tag is from a particular node. In some cases, if the distance is determined with respect to multiple nodes, a physical location of the tag can be determined.

According to some example embodiments, standard operating power settings (describing standard fluctuations in power) may be utilized in a standard locating mode. However, in an active locate mode, when the location of a specific article is desired, an active locate power setting may be utilized.

Additionally, or alternatively, a locating node may be configured to use multilateration, hyperbolic positioning, time difference of arrival (TDOA), trilateration, triangulation, received signal strength indication (RSSI), global positioning systems (GPS), or other locating mechanisms to support identifying the location of a tag within a retail environment. According to some example embodiments, a locating node may operate in isolation to detect the presence, and possibly the strength of a signal to determine when a tag is nearby. Locating nodes may take signal measurements and forward the information to, for example, the monitoring system manager 256 to analyze the signal and determine a location. According to some example embodiments, location nodes may be placed at strategic locations within the retail environment to support accurate locating of tags.

Due to interference that can occur in enclosed environments, such as retail stores, a signal power optimization procedure may be performed by the monitoring system, for example, directed by the monitoring terminal, to minimize interference and determine optimum signal strength for beacon signals. In this regard, the signal strength of the various nodes may be modified to determine settings where minimal interference and node signal overlap occurs.

To support real-time locating of tags (and the products to which the tag is affixed), tags may be configured to provide locating signals (e.g., status signals) that may be received, for example, by configurable monitoring devices configured as locating nodes. Indications of the locating signals may be provided to the monitoring system manager 256 for analysis to determine the location of the tags within the retail environment. Upon determining the location of a tag, the monitoring system manager 256 may be configured to output the location of the tag on a map displayed via the user interface 258 as shown for example in FIGS. 3 and 5.

In addition to simply outputting the location of the tag to the user interface 258, the monitoring system manager 256 may be configured to consider the location information of a tag with respect to defined rules, alarm conditions, and alarm responses. In this regard, zones of interest within a retail environment may be defined, and when the monitoring system manager 256 determines that a tag has entered a zone of interest security functionality, such as an alarm response, may be implemented. For example, store personnel may wish to define an alarm condition when products enter the restroom area 150 of FIG. 3. As such, a zone of interest may be defined for the restroom area 150. Accordingly, when the monitoring system manager 256 determines that a tag has entered the restroom area, an alarm signal or message may be generated, and an alarm response may be implemented sounding an alarm. The alarm signal or message may be sent to the tag, and an alarm on the tag may be activated. Additionally or alternatively, a notification may be provided to store personnel, via for example, a mobile communications terminal and/or a remote alarm may be activated. Further, zones of interest may be defined with respect a variety of areas within the retail environment (e.g., the stock room, point of sale, fitting room, etc.).

A zone of interest may also be associated with additional parameters, such as a time interval or duration. For example, a customer may be permitted to bring an article with a tag into the fitting room 130, but only for a threshold duration of time. Store personnel may, for example, wish to set a thirty minute duration for the fitting room. Accordingly, the monitoring system manager 256 may be configured to define a duration of time, such as thirty minutes, for a zone of interest. The monitoring system manager 256 may be configured to implement a timer based on the threshold duration. The timer may continue to run while the tag is located within the zone of interest and, when the time reaches the threshold, an alarm signal or message may be generated and transmitted by the monitoring system manager 256. If the monitoring system manager 256 determines that the tag has moved out of the zone of interest, the monitoring system manager 256 may be configured to reset the timer.

Locating a tag may also allow for tracking the movement of a tag and the associated product through the store. Tracking the movement of the product may provide inventory, security, and marketing functionality. With respect to security functionality, it has been determined that many experienced shoplifters move about a store in a particular manner. Based on the location information determined for a tag, the movement of a product may be tracked by the monitoring system manager 256 and a movement profile may be generated and compared to suspicious activity movement profiles. If a match is identified, a notification may be provided to a manager, security guard, or the like via a mobile communications terminal to investigate the situation. Further, according to some example embodiments, the monitoring system manager 256 may have configured other tags, or may signal other tags on nearby devices to alarm when a match is identified to, for example, assist in locating the shoplifter. Adjacent tags could provide an alarming pattern that "follows" a would-be shoplifter around or through the retail environment.

Additionally, the monitoring system manager 256 may be configured to interface, via a network connection or the like, with customer information terminals 195 to support security functionality. Customer information terminals 195 may be computing devices including a display and audio output capabilities (e.g., speaker, speaker driver, etc.). A customer information terminal may be located at strategic security locations such as exits and entrances. The monitoring system manager 256 may be configured to interface with the customer information terminals 195, via for example a network connection, to provide output to customers and would-be shoplifters. For example, a customer information terminal and a movable video camera may be located at the exit of a retail environment. The moveable video camera may be controlled by the monitoring system manager 256. When the monitoring system manager 256 determines that a tag has moved into a zone of interest defined near the exit, the movable camera may move to capture the image of the individual carrying the tag (and the associated product). The video captured by the camera may be displayed on the customer information terminal to indicate to the shoplifter that they are being recorded and thereby have a deterrent effect.

In a similar application involving customer information terminals, tags entering a store may be considered. For example, if the monitoring system manager 256 determines that a tag has entered the store through the front entrance, the monitoring system manager 256 may be configured to cause the customer information terminal to either visually and/or audibly direct the customer to the customer service desk for product returns.

In addition to configurable monitoring devices being configured as EAS gate nodes, configurable monitoring devices may also be configured to operate as gate nodes via the locating functionality described above or based on a determination that a tag is within range of a gate node's beacon signal. In some example embodiments, a gate node may detect the proximity of a tag by receiving communications from the tag in response to a beacon signal provided by the gate node. To avoid situations where a gate node detects the proximity of a tag that is properly within the retail environment, and is not located so close to the exit so as to indicate that the attached article is being stolen, guard nodes may be implemented. The guard nodes may be located near an exit and may be configured to prevent tags within the store from improperly associating themselves to the gate nodes and causing erroneous alarming.

A gate node may be connected to mains power, and may include a battery to support operation when mains power is lost. The gate node may transmit regular beacon signals, which include the gate node's unique identifier, and listen for responses from tags that are within range. If a tag detects that the strongest beacon signal that the tag is receiving is from a gate node, the tag may transmit a message including the tag's unique identifier to the gate node and the tag may enter a first alarm mode. In this regard, a tag may maintain a list of identifiers for gate nodes to determine when a signal is being detected from a gate node.

In the first alarm mode, the tag may be configured to emit an audible chip every second (or other predetermined time period), providing a deterrent indication to an individual holding the article to which the tag is affixed. While in the first alarm mode, the tag may continue to listen for beacon signals from other nodes, and if a beacon signal from a non-gate node becomes the strongest beacon signal detected by the tag, the tag may transfer from the first alarm mode to a normal mode (e.g., since the tag has apparently moved away from the gate node and the exit). However, if the strongest received beacon signal continues to be the signal from the gate node, and the received signal strength passes a predefined gate node signal strength threshold, the tag may transfer into a second alarm mode. In the second alarm mode, the tag may be configured to alarm continuously. Again, the tag may continue to listen for beacon signals from other nodes, and if a beacon signal from a non-gate node becomes the strongest beacon signal detected by the tag, the tag may transfer from the second alarm mode to the first alarm mode or a normal mode (e.g., since the tag has apparently moved away from the gate node and the exit).

As mentioned above, tag tracking may also provide marketing benefits. Movement of tags associated with particular products may be logged by the monitoring system manager 256 over a period time, and the monitoring system manager 256 may be configured to identify customer trends by aggregating the data. Using the trends, product layout within a store may be modified to increase sales. The customer trends may reveal purchasing patterns, customer traffic patterns, in-store dead-spots, and the like, which may not have otherwise been identified. Further, information regarding the effects of moving product display racks and associated products within the store may be determined based on the movement of customers and the sales of the associated products.

With respect to additional marketing functionality, since the location of a product can be determined, the monitoring system and the monitoring system manager 256 may be configured to make suggestions to customers for purchasing other products. For example, movement of a tag associated with a dress shirt may be detected, and the movement may be tracked to a sales area for neck ties. The monitoring system manager 256 may be configured to consult a database to suggest a neck tie that matches the shirt, based on attribute information associated with the tag affixed to and associated with the shirt. To implement the suggestion procedure, the monitoring system manager 256 may interface with a customer information terminal 195 located near the neck tie retail area.

Example marketing compliance applications and functionality may also be implemented by the monitoring system. In this regard, some retail stores may have requirements for how the store should be set (i.e., where particular products should be located within the store). A floor plan or set design may be followed for setting the store. To ensure that a store complies with a given set design, the location of tags may be queried. Tags associated with particular products may be checked against a stored, electronic set design to ensure that the products are located in the correct locations within the store. For example, the location of the winter sweaters within the store may be queried, to determine if the winter sweaters have been located on a table at the entrance of the store in accordance with a set design. The results of the query may be compared to the set design to determine whether the store complies in this regard.

Another example marketing application may be automatic price modification. In this regard, a tag may be configured to change the price of a product (or suggest the change of a price for the product) based on various factors. A tag may be configured to implement a timer and determine, for example, a "time on the sales floor" value. If the time on the sales floor value reaches a threshold level, the price for the article that the tag is associated with may be modified. To support this functionality, according to some example embodiments, when the tag is commissioned or is placed on the sales floor, a time and date threshold for the article may be defined. For example, a thirty day threshold may be set. When thirty days has passed, as determined by the tag or the monitoring terminal, the tag may be configured to, or the monitoring terminal may direct the tag to, modify or suggest modification of the price of the article. Additionally, or alternatively, the tag may alarm when the threshold is reached indicating to sales personnel that the tag should be moved to the clearance rack. The price may also be modified based on the sales of related products. For example, if sales of a particular product have been increasing, the price could be raised.

Another example marketing application may involve a tag being associated with, or assigned to, a specific customer (customer tag). In this regard, the customer tag may be permanently assigned to a customer (e.g., the customer leaves the retail store with the tag), or the tag may be temporarily assigned to a customer upon visiting the retail store (e.g., the customer returns the tag upon leaving the store). The tag and/or the monitoring system may be configured to store profile information about the customer in association with the tag. In this regard, the customer's profile information may be stored on the tag or at the monitoring terminal. In some example embodiments, the tag may be configured to wirelessly interface with a cell phone to retrieve profile information. The profile information may include the customer's name, age, gender, home address, phone numbers, credit card numbers, credit information, purchasing preferences, and the like.

The profile information may also include information indicative of a customer loyalty level. In this regard, based on the customer loyalty level, various loyalty program features may or may not be available to the customer. For example, tags associated with a customer having a particular customer loyalty level may be configured to allow a customer to use the self check out lane at a retail store, open a display case without the assistance of store personnel, open a security device that protects a product, purchase a product using pre-stored credit card information, de-commission security tags associated with a purchased product, and the like.

The customer tag may also be configured to provide for tracking and positioning the customer in the store. Further, the customer tag may be configured to receive, for example via the monitoring system, a product list (e.g., a grocery list), and the customer tag may assist the customer in locating the products on the list.

According to various example embodiments, a tag, such as a tag configured for security functionality, marketing functionality, inventory functionality, or as a key (e.g., a manager's key) may be configured to provide for assisting an individual with locating another tag and the associated product. In this regard, a locator tag, in the possession of an individual attempting to locate a target tag, may be configured to provide a user with an indication of where the target tag is located or how far the target tag is away from the locator tag. The locating tag and/or the target tag may be configured to provide audible and/or visual feedback to the user to indicate the location of the target tag. For example, the locating tag and/or the target tag may be configured to output audible beeps or clicks (similar to the sound of a Geiger counter), the frequency of which ma increase as the locating tag moves closer to the target tag. The output may be based on locating that is performed via the beacon nodes described above, or via signal strength detection directly between the locating tag and the target tag.

As mentioned above, tag location assistance functionality, such as the Geiger counter-type functionality described above may be implemented in a number of applications. In another example, a locator tag, such as a tag configured as a manager's key, may be used to locate tags that have reached a threshold battery charge level. A tag with a low battery level, where the tag includes battery monitoring circuitry (e.g., via a processor) may be configured to alarm to indicate the low battery condition. Additionally, a tag with low battery level may be configured to provide a wireless signal indicating the low battery condition. The wireless signal may be detected by the locator tag and the locator tag may be configured to provide an indication of the location of the low battery level to a user of the locator tag. According to some example embodiments, tags near a low battery level tag may be configured to relay the low battery level indication via a wireless signal to neighboring tags, and the neighboring tags may report the low battery power condition to provide for locating the low battery level tag, even after the low battery level tag can no longer communicate.

With respect to inventory applications, the monitoring system manager 256 may be configured to track inventory generally, as well as track the location of inventory via tags. The monitoring system manager 256 may be configured to track inventory by monitoring and logging status signals provided by the tags, in addition to commissioning and decommissioning activities.

The monitoring system manager 256 may also assist in locating particular inventory to, for example, assist in a sale. The monitoring system manager 256 may be configured to receive requests for a particular product (e.g., brown slacks, waist size 32, in-seam length 30) and communicate with tags that meet the criteria of the request to cause the tags to alarm. An alarm in this regard, may be a subtle, soft audio alarm that would assist a sales person and a customer in locating the desired product.

Another example inventory application may involve the monitoring system's interaction with totes. A tote may be a shipping container, such as a plastic shipping container, that can hold smaller, and often higher value, products, such as pharmaceuticals, makeup, batteries, film, jewelry, and the like. Totes may be loaded at a warehouse, or another store, and shipped to a destination store. A tote may include a mechanical locking mechanism that requires, for example, a magnetic key or mechanical interaction with a key, to open the tote and access the products inside the tote. In some example embodiments, a tote may also include a configurable monitoring device configured as a tote tag.

A tote tag may be used for locating the tote, similar to the manners described above. A tote tag may also be configured to detect the presence of tags, and associated products within the tote. In this manner, a tote tag may operate similar to a node, with respect to the tags stored within the tote. In some embodiments, the tote tag may maintain an inventory of the products within the tote by virtue of communication with each respective tagged product in the tote and the extraction and/or storage of product related information associated with each respective tag. As the tote moves from the warehouse to a destination store, the inventory information may be verified at both locations to ensure that the contents of the tote have not been tampered with or stolen.

The tote tag may also interface with a key, such as a manager's key. In this regard, the key may be enabled to deactivate security functionality of the tote tag, such as alarming. The tote tag may be configured to alarm if an attempt is made to open the tote without the key or with an unapproved key. The tote tag may also alarm if communication is lost with the tag of one or more of the tagged products within the tote. A key may be configured to interface with the tote tag, either directly or through the monitoring system, to deactivate, or activate, the tote tag's alarming functionality. The monitoring system, or the tote tag may be configured to manage access to the contents of the tote by, for example, maintaining a list identifying the particular keys or the types of keys (e.g., high level manager's key) that have been enabled to open the tote. In the event that an unapproved key is used, or is attempted to be used, for opening a tote, the tote tag may alarm.

Figure 4:
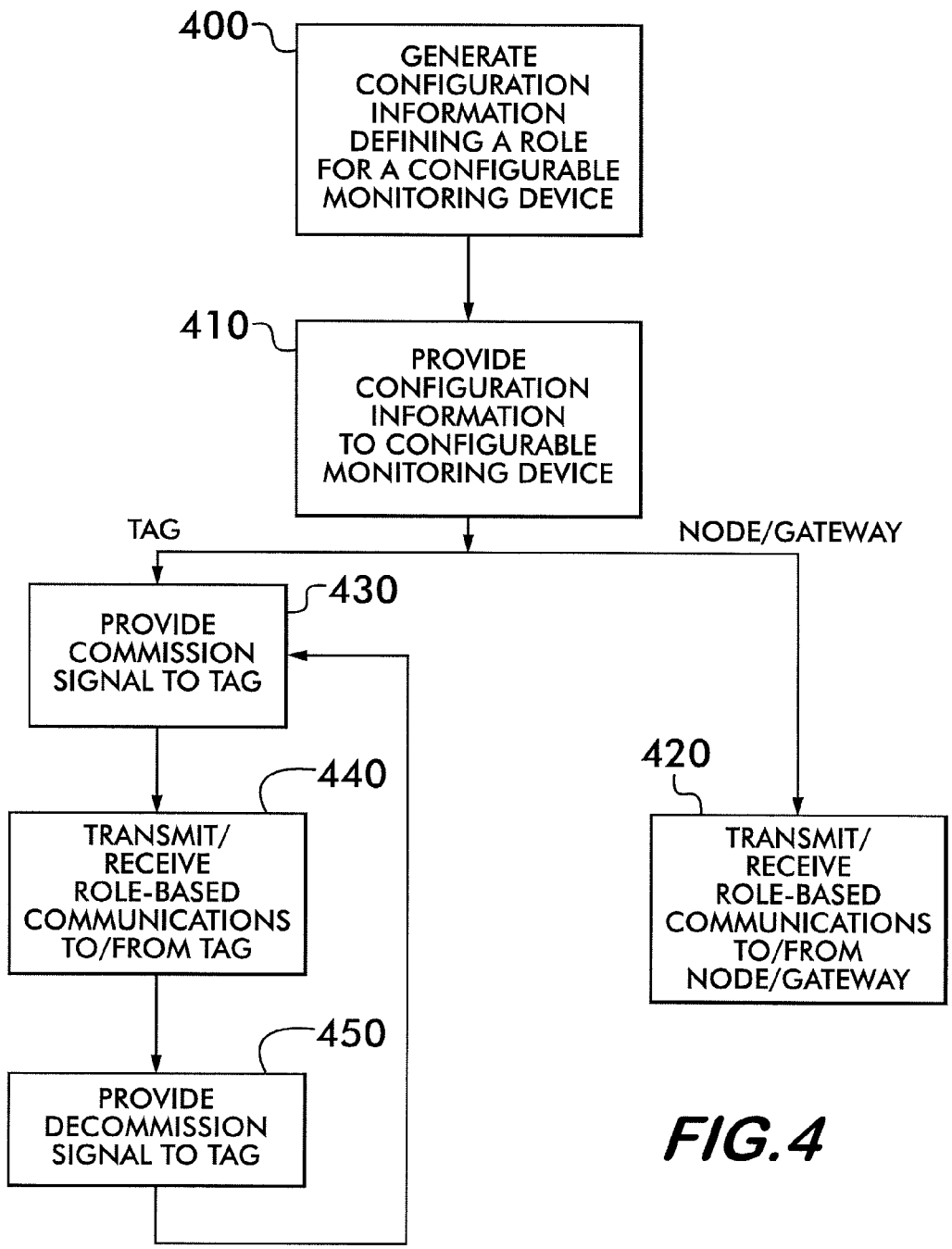
FIG. 4 illustrates an example of a flow diagram illustrating an example method for managing configurable monitoring devices according to an example embodiment.

Based on the forgoing, FIG. 4 illustrates an example method for managing configurable monitoring devices in accordance with various example embodiments of the present invention that may be implemented by the monitoring system manager 256. At 400, configuration information for a configurable monitoring device may be generated that defines a role for the target configurable monitoring device. Specific parameters such as rules, alarming conditions, alarming responses, attribute information, and the like may be defined and included in the configuration information. At 410, the configuration information may be provided to a target configurable monitoring device via, for example, a wireless network connection. The target configurable monitoring device may receive and store the configuration information and subsequently operate within the role defined by the configuration information. If the configuration information defines the role of a node or a gateway, role-based communications may be received from, and transmitted to, the node or gateway during the operation of the configurable monitoring device as a node or gateway.

If the configuration information defines the role of a tag, a commission signal may subsequently be provided to commission the tag at 430. Subsequently, role-based communications may be received from, and transmitted to, the tag at 440 during the operation of the configurable 4 monitoring device as a tag. The tag may later be provided a decommission signal to decommission the tag 450. Once decommissioned, the tag may await re-commissioning at 430 by providing another commission signal.

Figure 5A:
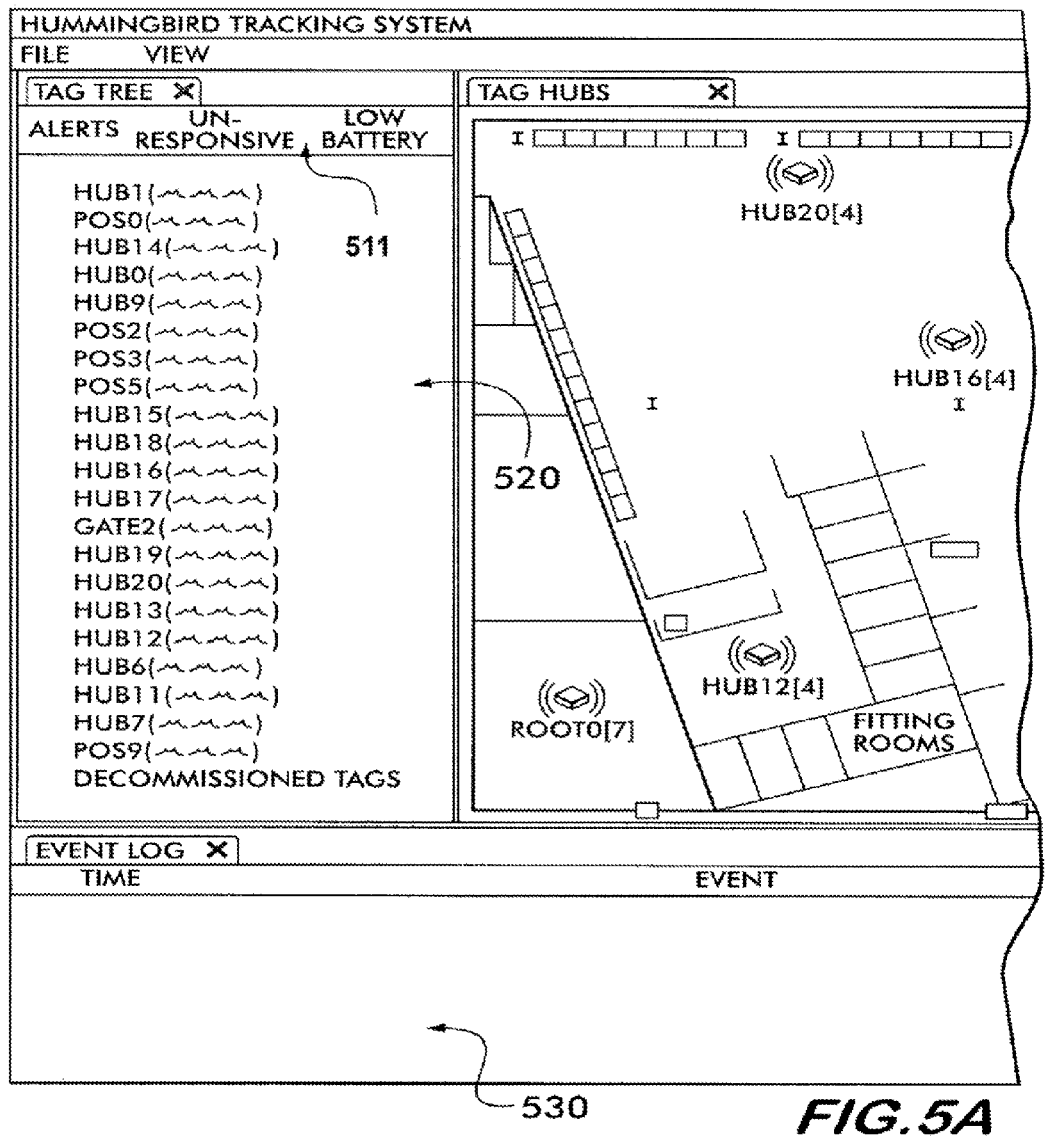
FIGS. 5A,B illustrate an example user interface window implemented by a monitoring terminal and depicting a representation of a monitoring system according to an example embodiment.
Figure 5B:
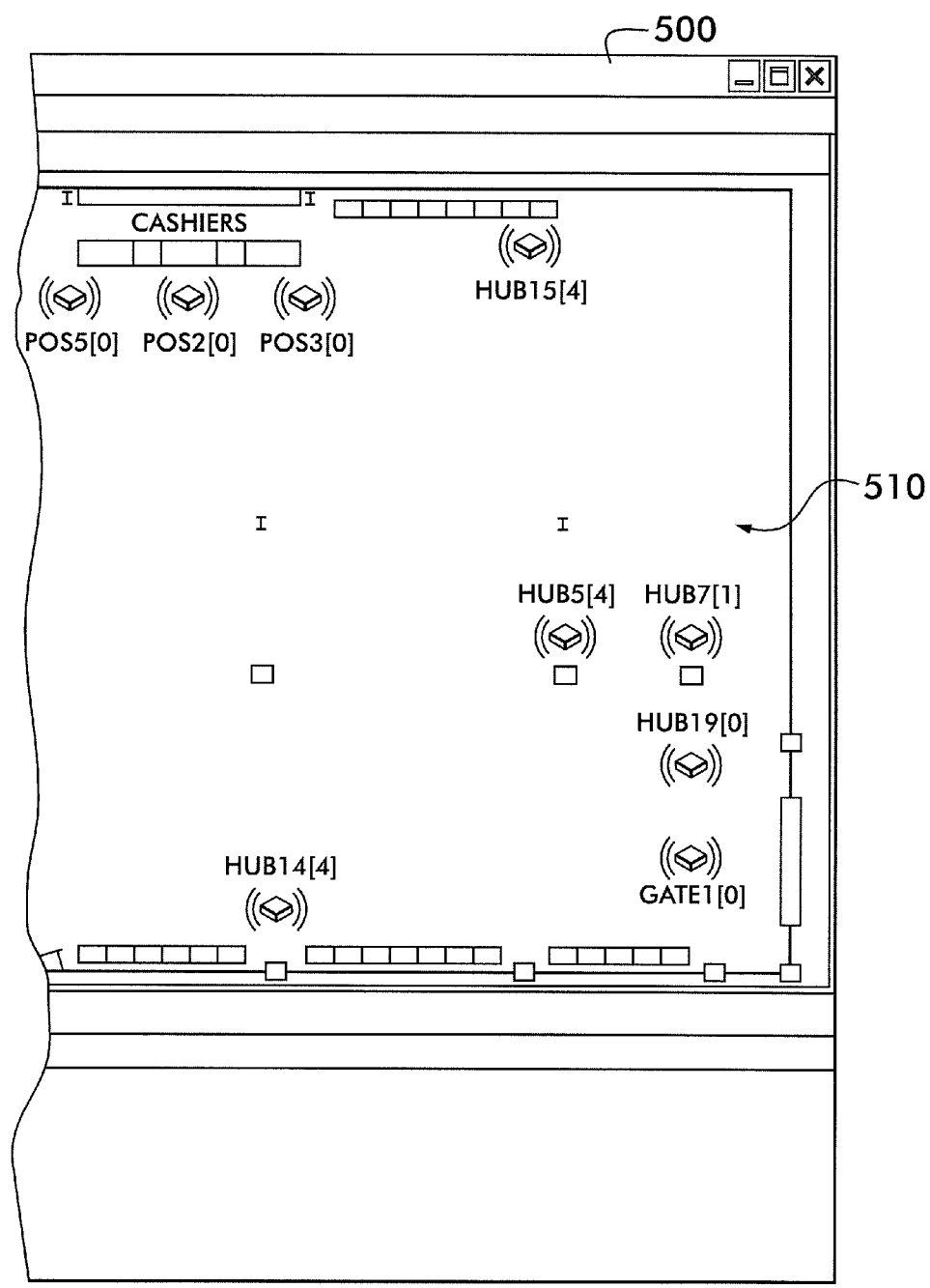

FIGS. 5A-8 illustrate example windows for displaying aspects of a user interface that may be implemented on a monitoring terminal. FIGS. 5A,B illustrate an example window 500 displaying a rendered representation of a monitoring system. The tag map 510 illustrates an example sales floor for a retail environment. The tag map 510 includes location-based representations of nodes (referred to as "hubs") that are positioned at various locations throughout the sales floor. The nodes are uniquely identified by a label (e.g., "Hub 14") followed by an associated tag count in parentheses, indicating the number of nearby tags (or tags within range of the signals (e.g., beacon signals) being provided by the nodes. When the monitoring terminal determines, based on communications from the tags or the nodes, that a tag has moved, such that the tag is disassociated with a first node and newly associated with a second node, the tag count may be decremented at first node and incremented at the second node. The tag map 510 also depicts POS nodes (e.g., "Pos2", "Pos 3", etc.). Near the entry area a gate node, "Gate1", is depicted which is configured to protect the entry/exit area. The tag map 510 also includes a gateway node, "Root0" configured to interface with an external network, to which the monitoring terminal may be connected.

The example window 500 also includes a tag tree 520. The tag tree 520 includes a listing of the nodes that are members of the monitoring system. A node that has tags within range, such as Hub16, may be expanded to display entries for each tag that is currently within range of, or otherwise associated with the node. As tags move form node to node, the tag tree 520 may be updated to show the current associations between the tags and the nodes. The tag tree 520 also includes a status legend 511 for describing the status of the tags or nodes. In this regard, the monitoring terminal may be configured to highlight, for example, an alarming tag red, an unresponsive tag purple, and a low battery tag yellow, or some other color/highlighting scheme may be employed.

The example window 510 also includes an event log 530. The information depicted in the event log may be linked to the currently selected item in the tag tree 520. As such, event information for the selected tag may be displayed. A time stamp may be associated with each event. Example events may include tag movement between node events, alarm events, failed communications events, tamper events, low battery events, etc.

Figure 6:
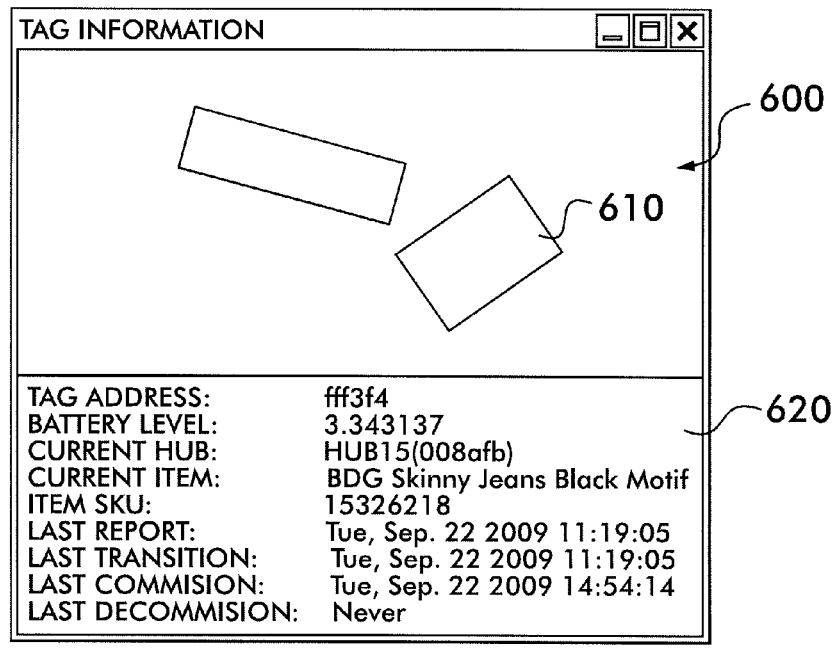
FIG. 6 illustrates a tag information window for displaying attribute information for a tag according to an example embodiment.

FIG. 6 illustrates an example tag information window 600 for attribute information associated with a tag or node. The example tag information window 600 depicts attribute information for a tag. An image 610 of an article to which the associated tag is affixed may be provided in the example tag information window 600. Further, additional attribute information may be provided in the tabular area 620, such as the tag address, the current battery level, the currently associated hub, a description of the affixed article, a stock-keeping unit (SKU) value, the time/date of the last report from the tag, the time/date of the last transition between nodes for the tag, the time/date of the last commission of the tag, the time/date of the last decommission of the tag, and the like.

Figure 7:
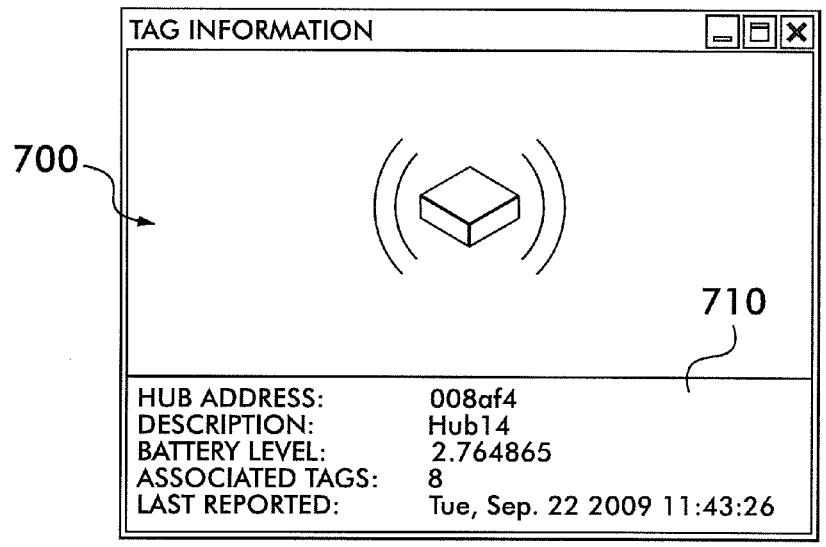
FIG. 7 illustrates a hub information window for displaying attribute information for a node according to an example embodiment.

FIG. 7 illustrates an example hub information window 700. The hub information window 700 may include a tabular area 710 that includes information about the hub (or node). Example hub attribute information may include the hub address, the hub label or description, the battery level for the hub, the current number of associated tags, the date/time that the hub last reported, for example, to the monitoring terminal, and the like.

Figure 8:
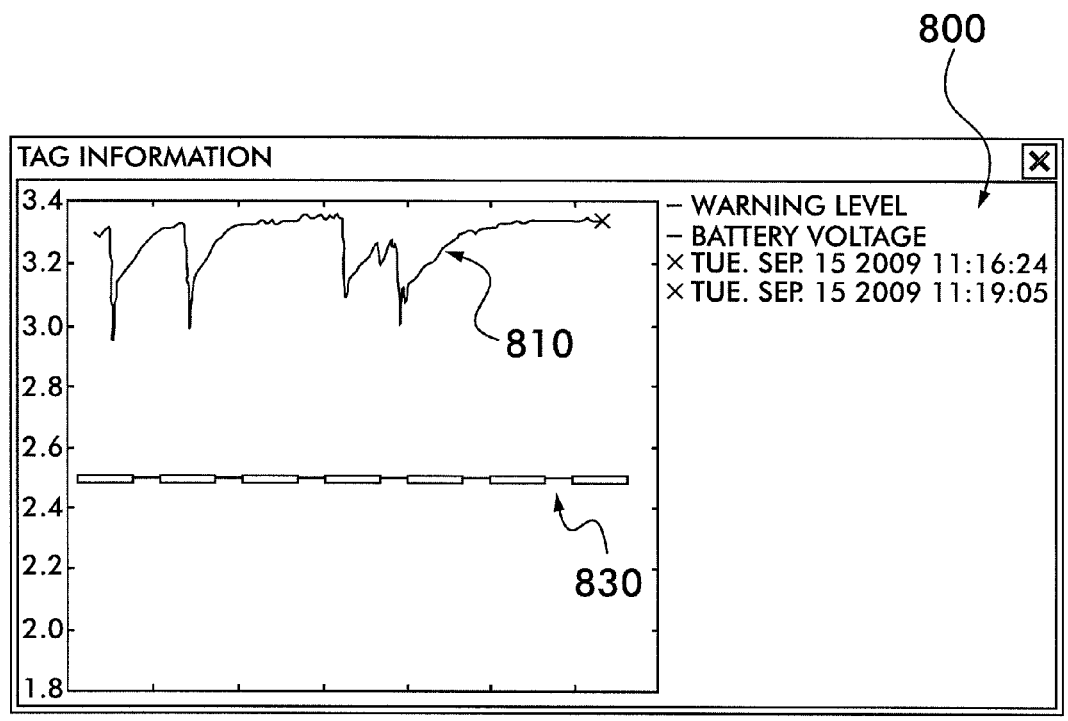
FIG. 8 illustrates a tag battery level window for displaying the battery level for a tag according to an example embodiment.

FIG. 8 illustrates an example battery level window 800 for a tag. The battery level window may include a graphical representation 810 of the past and current battery level on a line graph. The graph may be provided with respect to voltage on the y-axis, and time on the x-axis. A threshold battery level 830 may also be included on the graph, which may indicate the battery level that would place the tag in a low battery status.

Many applications and functionality described herein utilize wireless communications between the monitoring terminal 62 and the configurable monitoring devices. In addition to, or in lieu of, communicating with individual tags via this air interface, the communications interface 2S2 of the monitoring terminal 62 may communicate with a separate bridge device to forward and receive information and data to and from configurable monitoring devices. The bridge device may operate unilaterally or in conjunction with the monitoring terminal 62 to manage configurable monitoring devices. The bridge device, which may be a hand-held scanner-type device, can be configured to operate in one of two communication modes to interface with tags affixed to retail products for security, inventor, and other purposes. In a first communication mode, the bridge device is configured to communicate with tags that are configured for RFID type communications. For example, the tags and the bridge device may be configured to communicate in accordance with the Generation II Ultra High Frequency (UHF) RFID standards. In a second communication mode, the bridge device is configured to communicate with tags using a protocol built on the IEEE 802.15.4 standard, such as ZigBee or a proprietary protocol built on IEEE 802.15.4. To support the dual modes of communication, the bridge device may include a transmitter/receiver and an antenna configured to support IEEE 802.15.4, as well as, a modulator/demodulator, and possibly a separate antenna, to support RFID communications. According to some example embodiments, the bridge device may include a configurable monitoring device configured to operate a bridge device. Via seamless transition between the two communications modes, a single, possibly hand-held, bridge device can operate as a tag reader, and may be used to communicate with disparate types of tags. Communications with the tags may be performed for a variety of reasons, such as for counting inventory, price checking, tag firmware upgrades, tag encoding, and the like.

Figure 14:
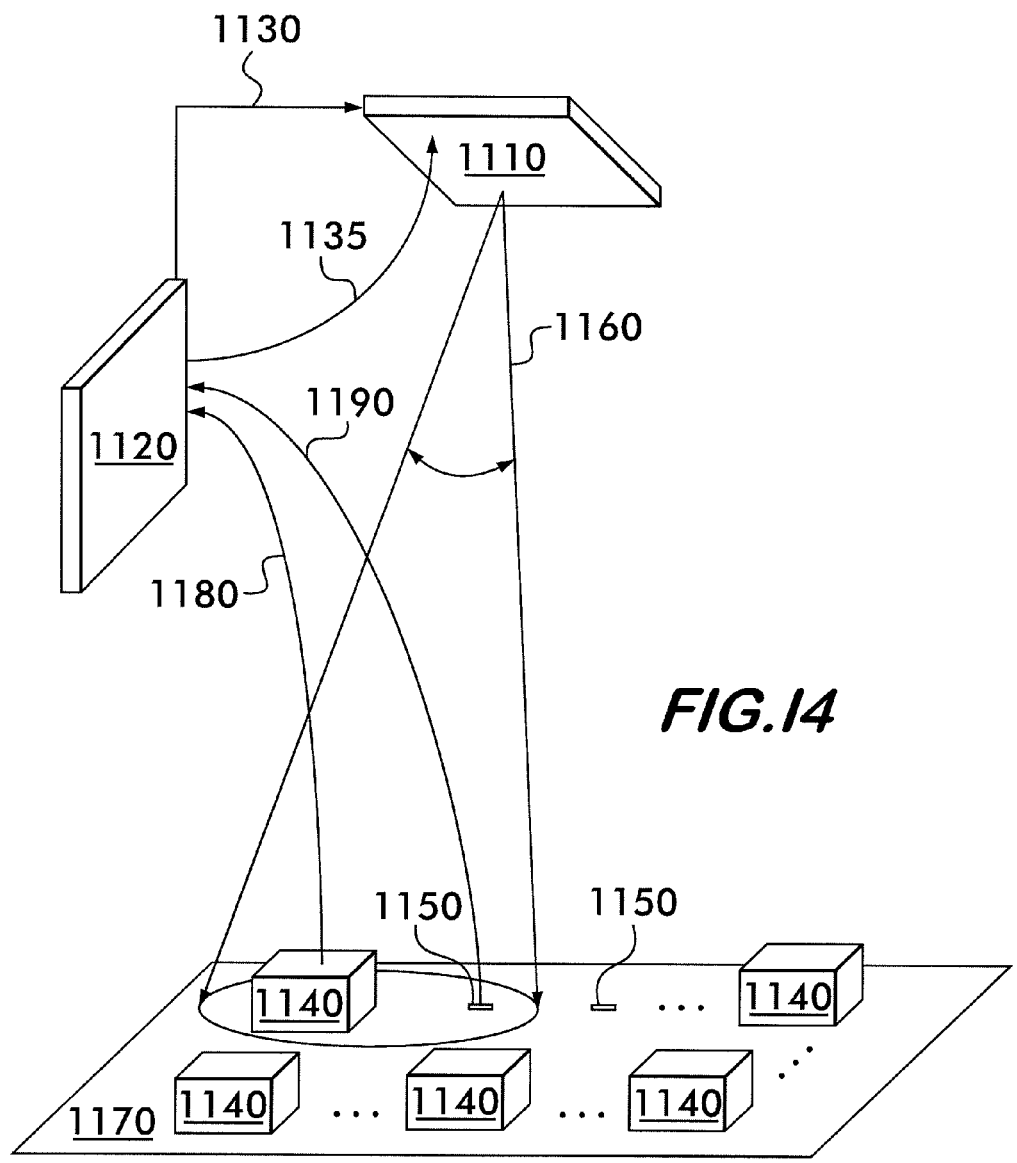
FIG. 14 illustrates a beamforming system for a radio frequency identification application, according to various embodiments of the present invention.

Referring now to FIG. 14, there is shown an embodiment of a beamforming calibration system according to the invention suitable for use in a configurable monitoring system. The beamforming calibration system of the present invention is useful for enhancing read range and reliability in RFID applications, and facilitates deployment of RFID applications by non-experts. A distributed architecture uses techniques for antenna beamforming and a feedback control loop to direct radio frequency (RF) energy onto a specific region, referred to as an interrogation zone, which includes a configurable monitoring device configured as a calibration node where one or more RFID tags may be located. It will be understood that any of the devices in the beamforming calibration system can be configurable monitoring devices.

The use of a beamforming system increases the signal strength in the interrogation zone for a given transmitted power, thus allowing for either increased range for a given amount of transmitted power, or for reduction in the transmitted power required to achieve a given signal strength in the interrogation zone. As a result, interference (e.g., inter-reader interference) can be reduced in applications where multiple RFID readers are deployed. The beamforming system also directs the transmitted signal and hence reduces the multi-path interference due to signal reflection from scattering, thus reducing signal fading and increasing reliability.

A feedback control loop using a configurable monitoring device configured as calibration node in the interrogation zone enables the beamforming system to automatically optimize the signal power and signal-to-noise ratio in the interrogation zone without manual configuration and/or tuning. The beamforming system, comprising beamforming nodes, calibration nodes, and a reader node, can self-calibrate to adjust for the environmental conditions and the relative positions of the nodes and the interrogation zone. Thus, the installation and maintenance of the beamforming system is simplified.

The beamforming system eliminates the need for connecting the beamforming nodes via coaxial cables, decreasing cost and increasing the flexibility of deployment. The flexibility in placement of the beamforming nodes also reduces fading and shadowing effects. For example, even if the path from one of the beamforming nodes to the RFID tags is blocked, the signal from the other beamforming nodes may provide enough received signal strength at the RFID tag for reliable operation and for communication with the reader.

Various embodiments of the invention include a system for radio frequency identification of a tagged item in an interrogation zone comprising configurable monitoring devices configured as a plurality of beamforming nodes, each configured to generate radio frequency identification signals in a first frequency band, at least one calibration node disposed in the interrogation zone configured to measure a signal strength of the radio frequency identification signals and to transmit a signal strength data in a second frequency band, and a reader node configured to receive the signal strength data in the second frequency band, adjust the radio frequency identification signals generated by the beamforming nodes, and receive a radio frequency identification data in the first frequency band from the tag.

Other embodiments of the invention include a method for beamforming comprising generating radio frequency identification signals, measuring a signal strength of the radio frequency identification signals in an interrogation zone, reading the signal strength, and adjusting the radio frequency identification signals based on the signal strength in a feedback control loop.

Still further embodiments of the invention include a method for beamforming comprising sending a command and power and/or phase data to a plurality of beamforming nodes, transmitting a radio frequency identification signal using the plurality of beamforming nodes, receiving the radio frequency identification signal using a calibration node, transmitting a signal strength data based on the radio frequency identification signal from the calibration node to the reader node, adjusting the command and the data based on the signal strength data, and sending the adjusted command and the adjusted data to the plurality of beamforming nodes.

The present invention includes systems and methods for beamforming in radio frequency identification applications. A distributed architecture of configurable monitoring devices uses techniques for antenna beamforming and a feedback control loop to direct radio frequency (RF) energy onto a specific region including a calibration node, referred to as an interrogation zone, where one or more RFID tags may be located.

The distributed architecture of the beamforming system is resistant to fading and shadowing effects, providing accurate RFID reader operation even in environments with multi-path reflections or environmental changes, such as people moving around, changes in the location of equipment, etc. By connecting the beamforming nodes to the RFID reader node using a wireless coupling, the need for coaxial cable is eliminated. The distributed architecture also enables the use of low-cost, low-data rate wires for communication between the reader node and the beamforming nodes. Furthermore, the architecture of the beamforming system provides flexibility in the number and the placement of the beamforming nodes.

The beamforming system is self-calibrating, eliminating the need for manual configuration of the RFID reader and antennas when the system is initially set up. In addition, the self-calibration feature enables the beamforming system to function when the radio frequency identification tags are in motion. The self-calibration feature is enabled by the use of a feedback control loop, using feedback from a calibration node placed in the vicinity of the tags (i.e., in the interrogation zone). In various embodiments, the beamforming nodes use the closed-loop feedback from one or more of the calibration nodes to adapt the phase of the radio frequency identification signal transmitted by the beamforming nodes, so as to maximize the power or the signal-to-noise ratio received by the RFID tags in the interrogation zone.

The feedback control loop provides flexibility in the positioning of the beamforming nodes. Thus, positioning of the beamforming nodes can be done based on a combination of practical considerations, such as ease of deployment, and performance considerations, such as maximization of power or signal-to-noise ratio. The closed-loop feedback is provided using a calibration node in the interrogation zone.

The closed-loop feedback adaptation of the powers and/or phases of the radio frequency identification signal transmitted by the beamforming nodes can be achieved by various iterative algorithms, including algorithms that require only one bit of feedback per iteration, see, e.g., Bernard Widrow and John M. McCool, "A Comparison of Adaptive Algorithms Based on the Methods of Steepest Descent and Random Search," IEEE Transactions on Antennas and Propagation, vol. 24, no. 5, pp. 615-637 (September 1976), and R. Mudumbai, J. Hespanha, U. Madhow, G. Barriac, "Scalable Feedback Control for Distributed Beamforming in Sensor Networks," Proc. 2005 IEEE International Symposium on Information Theory (ISIT 2005), Adelaide, Australia (September 2005).

In various embodiments, the configurable beamforming system can use the 900 MHz UHF frequency band for radio frequency identification signals for a first frequency band (the RFID band) employed by the signals received and transmitted by the RFID tag, and another band, for example the 2.4 GHz band, as a second frequency band for control signals to couple between the calibration node, the reader node, and beamforming nodes. The separation in frequency between the RFID band and the control band simplifies the design of the analog components of the beamforming system. The beamforming system may use frequency bands other than those identified herein for the first frequency band and the second frequency band. Furthermore, the RFID band and the second frequency band for control signals may partially or fully overlap in frequency.

With reference to FIG. 14, there is shown a configurable monitoring device beamforming system for a radio frequency identification application. The system comprises a beamforming module 1110 having two or more beamforming nodes which generate a radio frequency identification signal 1160, a reader module 1120, one or more RFID tags 1150, one or more calibration modules 1140, and an interrogation zone 1170 in which one or more calibration modules 1140 and RFID tags 1150 may be present. A control radio frequency connection 1135 couples the reader module 1120 and beamforming module 1110. A calibration data radio frequency connection 1180 couples the calibration module(s) 1140 to the reader module 1120, and a radio frequency identification data 1190 couples the RFID tags 1150 to the reader module 1120.

In various embodiments, the reader module 1120 may communicate with the beamforming module 1110 via beamforming control radio frequency connection 1135, via beamforming control hardwired connection 1130, or via both. The calibration module 1140 may also communicate with the reader module 1120 through a hardwired connection (not shown) rather than a calibration data radio frequency connection 1180, and directly with the beamforming module 1110 through either a wireless or a hardwired connection (not shown), rather than indirectly using reader module 1120. The calibration module 1140 may receive the radio frequency identification data 1190 transmitted by the RFID tags 1150 and communicate this data to the reader module 1120.

The calibration module 1140 measures the net received signal from the beamforming module 1110 via the radio frequency identification signal 1160. The calibration module 1140 communicates with the reader module 1120 (or directly with the beamforming module 1110 as above) to report the measurements of the received signal.

A feedback control loop comprising the calibration module 1140, the reader module 1120, and the beamforming module 1110 is used to adjust the power and phase of the radio frequency identification signal 1160 so as to increase the strength and/or signal-to-noise ratio of the radio frequency identification signal 1160 received at the calibration module 1140. The radio frequency identification signal 1160 transmitted by the beamforming module 1110 is in accordance with standard RFID reader-tag protocols, and the response from the RFID tags 1150 is processed in a standard manner by the reader module 1120. The reader module 1120 can be co-located with the beamforming module 1110. In various embodiments, the beamforming module 1110 is separated from the calibration module 1140 by one meter or more and/or the reader module 1120 is separated from the calibration module 1140 by one meter or more. In typical applications, these separation distances may vary from less than one meter to more than one meter.

Figure 15:
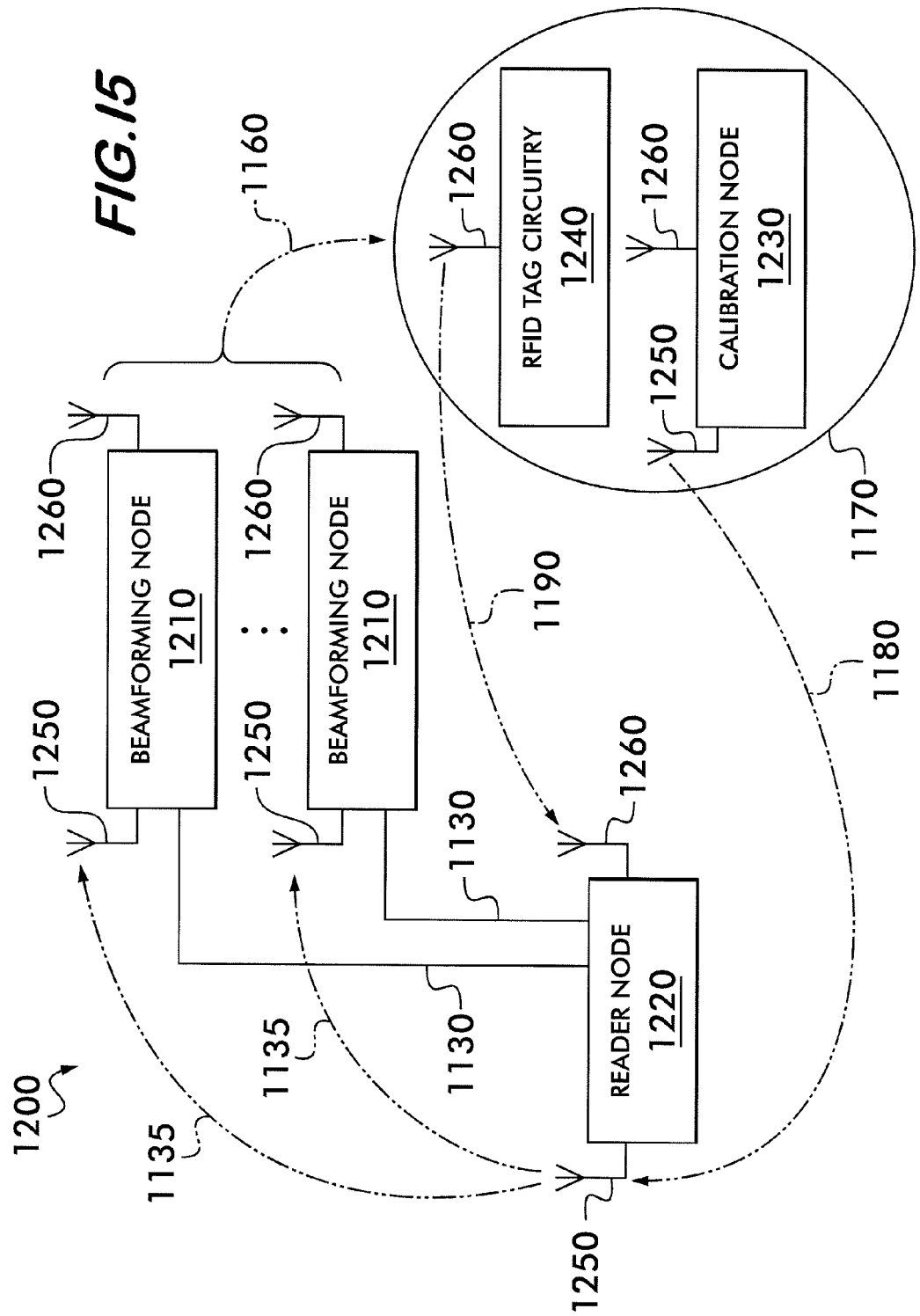
FIG. 15 is a block diagram of a beamforming system for a radio frequency identification application, according to various embodiments of the present invention.

FIG. 15 is a block diagram of a configurable monitoring device beamforming system for a radio frequency identification application. The beamforming system 1200 comprises the reader node 1220, a plurality of beamforming nodes 1210, a plurality of beamforming control channel antennas 1250, RFID channel antennas 1260, beamforming control hardwired connections 1130, beamforming control radio frequency connections 1135, one or more calibration nodes 1230, one or more RFID tags 1150 located in the interrogation zone 1170, the calibration data radio frequency connection 1180, the radio frequency identification data 1190, and the radio frequency identification signal 1160. The reader node 1220 may use the standard read/write protocols (e.g., governing the timing of acknowledgements, retransmissions, multiple-access arbitration) of a conventional RFID reader.

Beamforming nodes 1210 are coupled to two types of radio frequency antennas, beamforming control channel antennas 1250 and RFID channel antennas 1260. The RFID channel antennas 1260 are used by the beamforming nodes 1210 to form the radio frequency identification signal 1160 to energize and transmit data to the RFID tags 1150 in the interrogation zone 1170 using a first frequency band, such as the frequency band for standard RFID communication, herein termed the RFID band. The beamforming control channel antenna 1250 communicates with the reader node 1220 using a second frequency band, herein termed the control band. In some embodiments, the RFID band may be within the 900 MHz UHF radio frequency band and the control band may be within the 2.4 GHz unlicensed radio frequency band. The beamforming nodes 1210 generate the radio frequency identification signals 1160 with appropriate power, phase, and modulated data. They generate the signals 1160 according to the commands and data provided to the beamforming nodes 1210 by the reader node 1220, through either the beamforming control hardwired connection 1130 or the beamforming control radio frequency connection 1135.

The beamforming control channel antennas 1250 function in conjunction with each other to direct the radio frequency identification signals 1160 to the interrogation zone 1170. The calibration node 1230 takes measurements of the radio frequency identification signals 1160, such as net received power or signal-to-noise ratio, and relays feedback regarding this information back to the beamforming nodes 1210, either directly or through the reader node 1220 as above. A feedback control loop is employed by the beamforming nodes 1210 to adapt the phases and/or transmitted power of the radio frequency identification signals 1160 to maximize the power or signal-to-noise ratio received by the calibration node 1230, and hence any RFID tag circuitry 1240 in the interrogation zone 1170.

In various embodiments, the configurable monitoring device beamforming system 1200 may use any of a number of feedback control loop iterative algorithms. The feedback control loop maximizes the quality of the net received signal at the calibration node 1230, which may be determined by the net received power or the signal-to-noise ratio. The feedback control loop may provide a direct estimate of the average received power at the calibration node 1230, and/or an estimate of both the power and phase evolution of the received signal. Alternatively, the feedback control loop may provide an estimate of the difference in received powers corresponding to different phase settings employed by the beamforming nodes 1210. The feedback control loop can be employed for adaptation of a centralized antenna array. Thus, any algorithm that is used in such a centralized setting can be employed in a distributed setting as well, as long as the beamforming weight $w_i$ for the ith array element depends only on its prior values and on the feedback. In this case, the ith beamforming node 1210 becomes equivalent to the ith array element in a centralized adaptive antenna array.

One application of the algorithm described in Mudumbai et al. to the beamforming system 1200 is as follows. The beamforming nodes 1210 transmit at constant gain, and vary only their phases. Thus, the beamforming weight for the ith beamforming node 1210 is $w_i = e^{j\Phi_i}$. The iterative algorithm then performs the following steps. First, the reader node 1220 commands the beamforming nodes 1210 to randomly perturb their phases by a small random number, whose distribution is symmetric around zero. For example, the perturbation may be chosen with equal probability to be +a or −a, where a is a small phase value. Alternately, the perturbation may be chosen to be uniform over the interval [−a, a]. Next, the calibration node 1230 computes the received power P. This value is transmitted back to the reader node 1220. In some embodiments, a single bit, denoting whether the present value of P is larger or smaller than the value at the previous iteration, may be transmitted back to the reader node 1220. If the received power P is larger than the previous iteration, the phase changes made at the beamforming nodes 1210 are kept. Otherwise the phases from the previous iteration are kept. These steps may be repeated. Using this algorithm, the radio frequency identification signal 1160 generated by the beamforming nodes 1210 will converge to the optimal phase values, thus maximizing the received power at the RFID tags 1150 in the interrogation zone 1170.

When the received power P is reported to the reader node 1220 in a feedback loop control, an iterative algorithm such as a gradient ascent algorithm may also be used to maximize the received power at the calibration node 1230. For example, in the ascent algorithms such as the DRD and LRS algorithms in Widrow and McCool, the ith beamforming weight $w_i$ depends only on its past value and the feedback. These gradient ascent algorithms can therefore be employed for adaptation of the beamforming weights, even though the beamforming nodes 1210 may not be collocated.

An advantage of the feedback control loop is a reduced need for careful manual alignment of the RFID channel antennas 1260. In various embodiments, the beamforming nodes 1210 use iterative algorithms taking as input the measured data provided by calibration nodes 1230 to optimize radio frequency identification signals 1160, thus maximizing the signal quality received at the calibration node 1230. Alternatively, reader nodes 1220 compute and provide commands to the beamforming nodes 1210 to optimize the radio frequency identification signals 1160, thus maximizing the signal quality received at the calibration node 1230. In various embodiments, an iterative adaptive algorithm may be implemented in software, firmware, hardware, or a combination to implement the feedback control loop.

The use of multiple antenna elements (for example multiple RFID channel antennas 1260) for improvements in link power budget, diversity, and spatial multiplexing can be combined with other techniques known to those of skill in the art of antenna design and/or wireless communications, in various embodiments. For example, instead of the beamforming nodes 1210 locking onto a reference frequency signal from the reader node 1220, their local oscillators can operate in open loop. The frequency offset of the radio frequency identification signal 1160 at each beamforming node 1210 from its nominal value can be corrected using feedback from the calibration node 1230. For example, the calibration node 1230 can use its local oscillator as a reference to compute the estimated frequency offset for the ith instance of beamforming node 1210, and feed that information back to the ith instance of beamforming node 1210. This calibration can be done one at a time for each beamforming node 1210. Each beamforming node 1210 can then apply an appropriate frequency offset correction in transmit circuitry as will be described with reference to FIG. 18. The residual phase drift can be corrected using the feedback control algorithm. Alternatively, if the local oscillator tolerances of the beamforming node 1210 are small enough, then the frequency drift can be corrected as part of the feedback control algorithm, without requiring any initial calibration when the beamforming system is set up.

Figure 16:
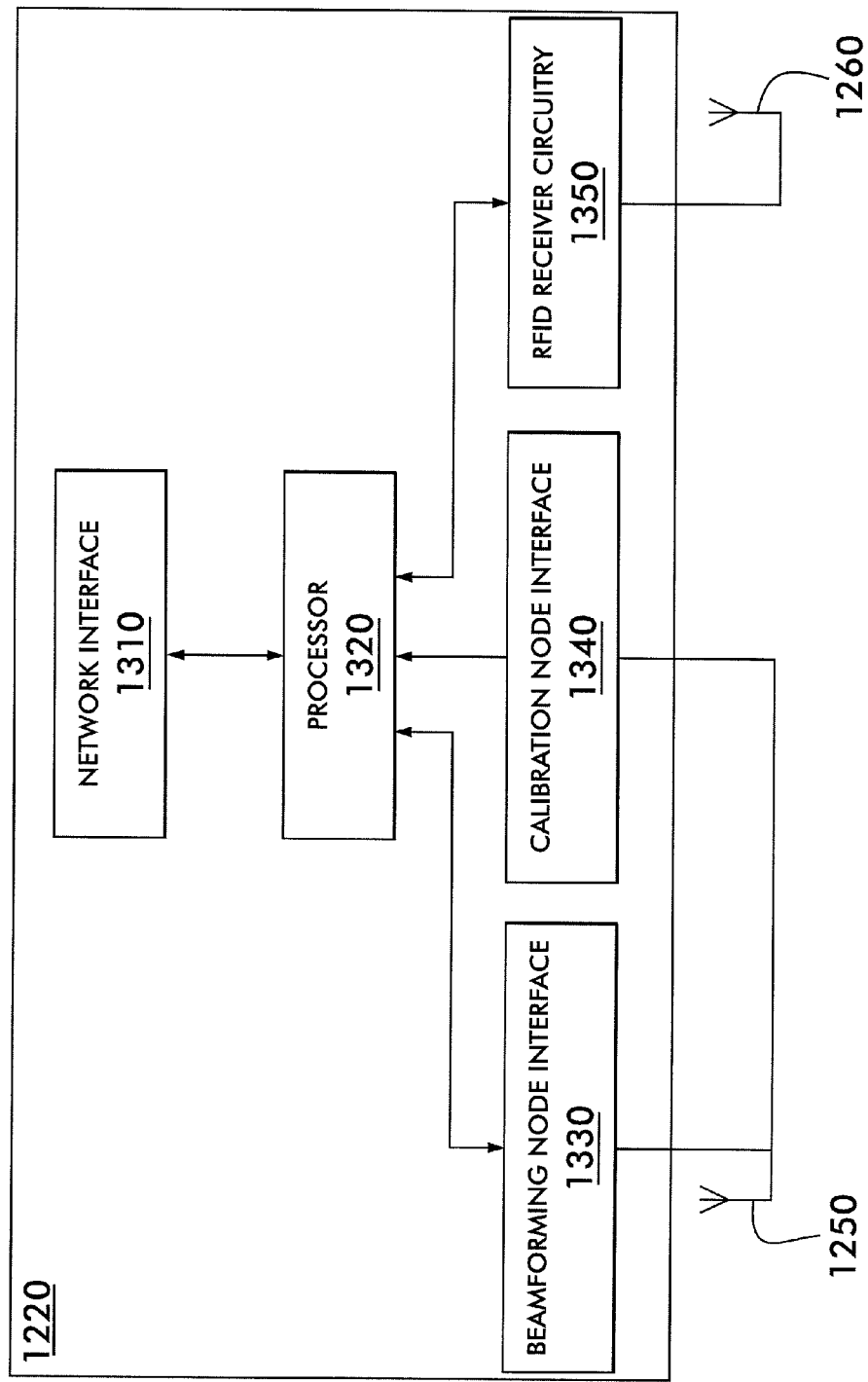
FIG. 16 is a block diagram of a reader node, according to various embodiments of the present invention.

FIG. 16 is a block diagram of a configurable monitoring device reader node 1220. The reader node 1220 comprises a network interface 1310, a processor 1320, a beamforming node interface 1330, a calibration node interface 1340, and RFID receiver circuitry 1350. The reader node 1220 couples to the beamforming control channel antenna 1250 and the REID channel antenna 1260. The RFID receiver circuitry 1350 receives the modulated and backscattered radio frequency identification data 1190 returning from the RFID tag 1150 (shown in FIG. 14 using the RPM channel antenna 1260, demodulates the data, and provides the data to the processor 1320. The network interface 1310 enables communication between the reader node 1220 and external computing and communication devices not shown), and may be implemented using any wired or wireless communication channel. The network interface 1310 may connect with the processor 1320 for communication and control between these external computing and communication devices and the beamforming system 1200, and may share RFID tag data from the processor 1320 with these external computing and communication devices. This RFID tag data comprises the identity, number and/or location of the RFID tags 1150 (shown in FIG. 14) within an interrogation zone 1170. The processor 1320 contains the standard RFID signal decoding algorithms known to those of skill in the art of RFID systems that are used to process the data received by the RFID receiver circuitry 1350 through the RFID channel antenna 1260.

The processor 1320 connects to the beamforming nodes 1210 through the beamforming node interface 1330 to control the beamforming operations. The beamforming operations comprise specifying which region is to be scanned and specifying the data that is to be sent to the RFID tags 1150 (shown in FIG. 14). The beamforming node interface 1330 may communicate with the beamforming nodes 1210 through a beamforming control hardwired connection 1130 and/or a beamforming control radio frequency connection 1135 utilizing a beamforming control channel antenna 1250.

The data received by the processor 1320, through the calibration node interface 1340, controls the algorithm used to direct the radio frequency identification signal 1160 generated by the beamforming module 1110 within the interrogation zone 1170. The calibration node interface 1340 may communicate with the calibration nodes 1230 through a hardwired connection (not shown), a calibration data radio frequency connection 1180 using a beamforming control channel antenna 1250, or both. If the calibration node 1230 communicates directly with the beamforming nodes 1210 rather than with the reader node 1220, as above, the reader node 1220 need not contain the calibration node interface 1340.

Figure 17:
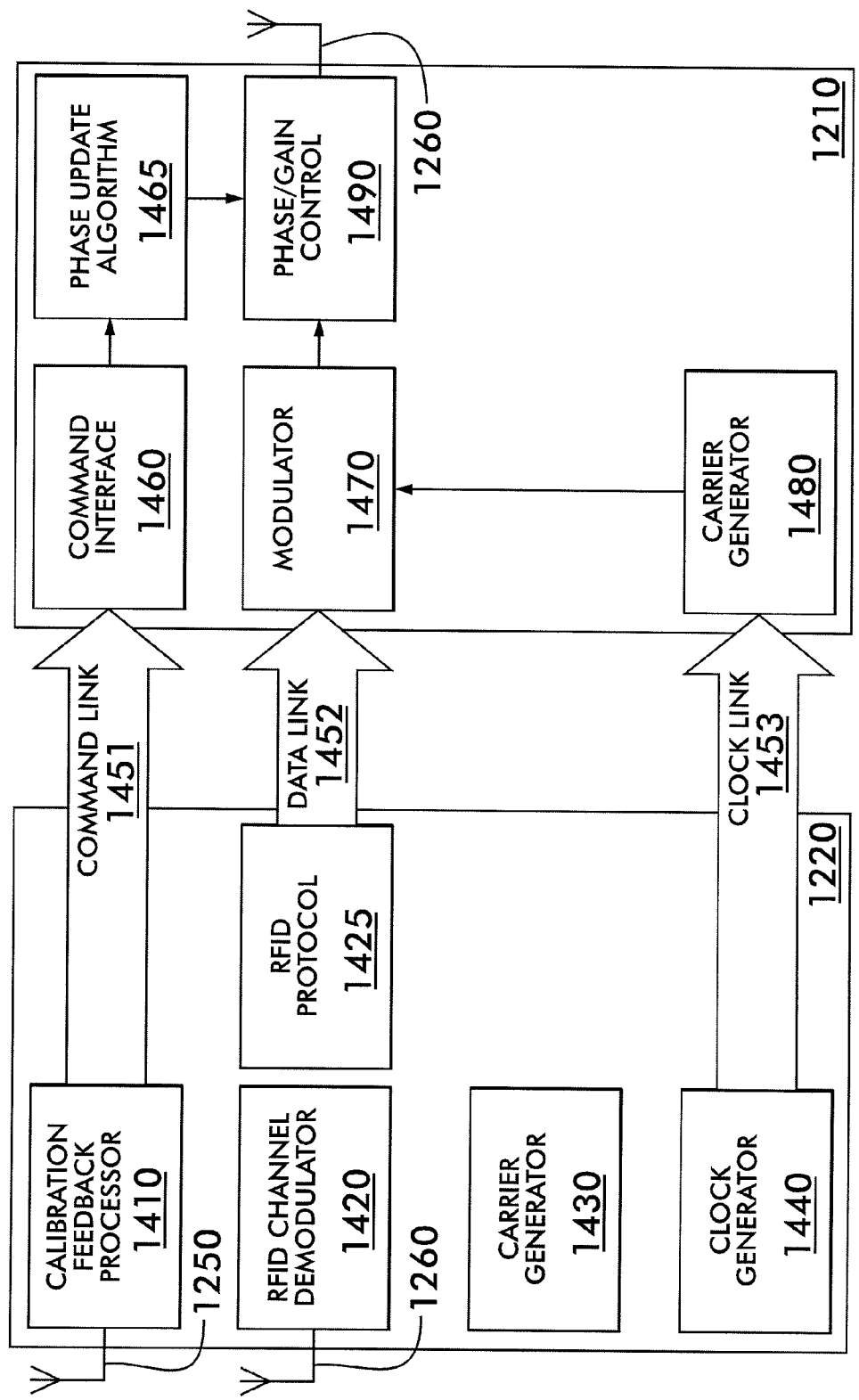
FIG. 17 is a block diagram of a beamforming control system, according to various embodiments of the present invention.

FIG. 17 is a block diagram of a configurable monitoring beamforming control system. The beamforming control system comprises the reader node 1220 and a plurality of beamforming nodes 1210. The reader node 1220 can communicate with the beamforming nodes 1210 through three logical links which may be communicated through one or more hardwired or wireless connections, as described with reference to FIG. 15. These logical links are the command link 1451, the data link 1452, and the clock link 1453. The reader node 1220 comprises a calibration feedback processor 1410, an RFID channel demodulator 1420, a carrier generator 1430, and a clock generator 1440. The beamforming node 1210 comprises a command interface 1460, a modulator 1470, a phase/gain control 1490, and a carrier generator 1480. The reader node 1220 couples to RFID channel antenna 1260 and a beamforming control channel antenna 1250. Reader node 1220 uses an RFID protocol 1425 to send data to modulator 1470. Beamforming node 1210 uses a phase update algorithm 1465 to adjust the phase/gain control 1490.

The reader node 1220 receives feedback information from the calibration nodes 1230 through the beamforming control channel antenna 1250. The information is demodulated and processed by the calibration feedback processor 1410, and using command link 1451, is distributed to the beamforming nodes 1210. In some embodiments, the calibration feedback processor 1410 simply passes the data received by the calibration nodes 1230 to the beamforming nodes 1210 via the command link 1451. In other embodiments, the calibration feedback processor 1410 processes the data received from the calibration nodes 1230 using an algorithm to generate specific commands for the beamforming nodes 1210 to control the phase and/or gain of the radio frequency identification signal 1160 transmitted using RFID channel antenna 1260. The reader node 1220 generates a clock signal using the clock generator 1440 which is then used to generate a carrier frequency using the carrier generator 1430. The reader node also distributes the clock signal from the clock generator 1440 to the beamforming nodes 1210 over the clock link 1453. This clock signal is used by the beamforming nodes 1210 to achieve frequency synchronization among all beamforming nodes 1210. The carrier generator 1430 is used by the RFID channel demodulator 1420 to demodulate the data from the RFID tags 1150 within the interrogation zone 1170. The RFID protocol 1425 is used by the reader node 1220 to distribute RFID tag-specific data to the beamforming nodes 1210 over the data link 1452. This RFID tag-specific data is transmitted to the RFID tags 1150 (shown in FIG. 14) within the interrogation zone 1170.

The beamforming node 1210 interfaces with the reader node 1220 through the command link 1451, the data link 1452, and the clock link 1453. The clock link 1453 is used by the carrier generator 1480 to achieve frequency synchronization with the other beamforming nodes 1210. The data link 1452 can contain the RFID tag-specific data to be transmitted by the beamforming nodes 1210 over the RFID channel antenna 1260. The RFID tag-specific data is modulated onto a carrier at the RFID link frequency in the RFID band (the first frequency band) using a modulator 1470. The modulated carrier's phase and power level are set by the phase/gain control 1490 and subsequently transmitted through the RFID channel antenna 1260. Using command link 1451, the command interface 1460 receives information from the reader node 1220 regarding the received radio frequency identification signal 1160 at the calibration node 1230. The beamforming node 1210 uses this information, using the phase update algorithm 1465, to control the gain and phase of the complex envelope of radio frequency identification signal 1160 transmitted over RFID channel antenna 1260. The gain g and phase ϕ together define a complex-valued beamforming weight $w_i = ge^{j\phi}$, where $j=\sqrt{-1}$.

Figure 18:
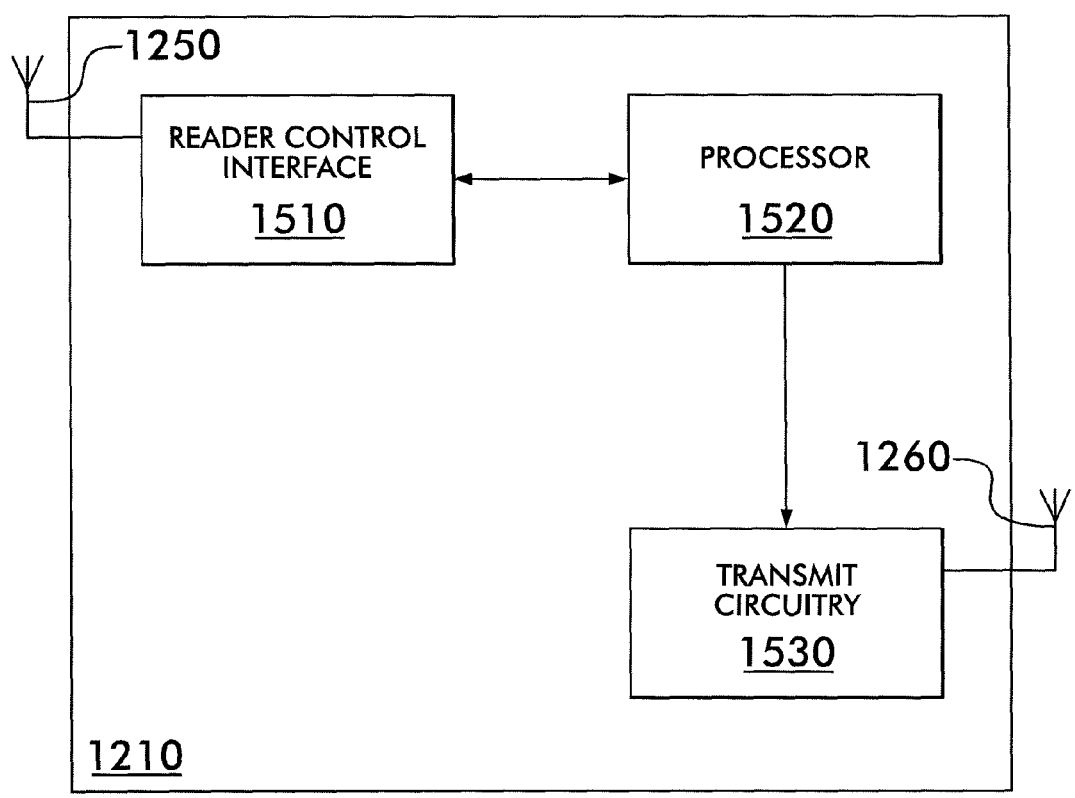
FIG. 18 is a block diagram of a beamforming node system, according to various embodiments of the present invention.

FIG. 18 is a block diagram of a configurable monitoring device beamforming node system. The beamforming node 1210 comprises a reader control interface 1510, a processor 1520, and transmit circuitry 1530. The beamforming node 1210 is coupled to the beamforming control channel antenna 1250. The beamforming node 1210 is also coupled to an RFID channel antenna 1260. The reader control interface 1510 receives the data and the commands sent over the command link 1451 and data link 1452 from the reader node 1220. As above, the beamforming node 1210 may interface with the reader node 1220 via a beamforming control channel antenna 1250, a beamforming control hardwired connection 1130, or a combination thereof. The processor 1520 utilizes the data and commands provided by the reader control interface 1510, along with the clock link 1453 from the reader node 1220, to generate the radio frequency identification signal 1160 using the transmit circuitry 1530 which then drives RFID channel antenna 1260 to transmit the radio frequency identification signal 1160.

Figure 19:
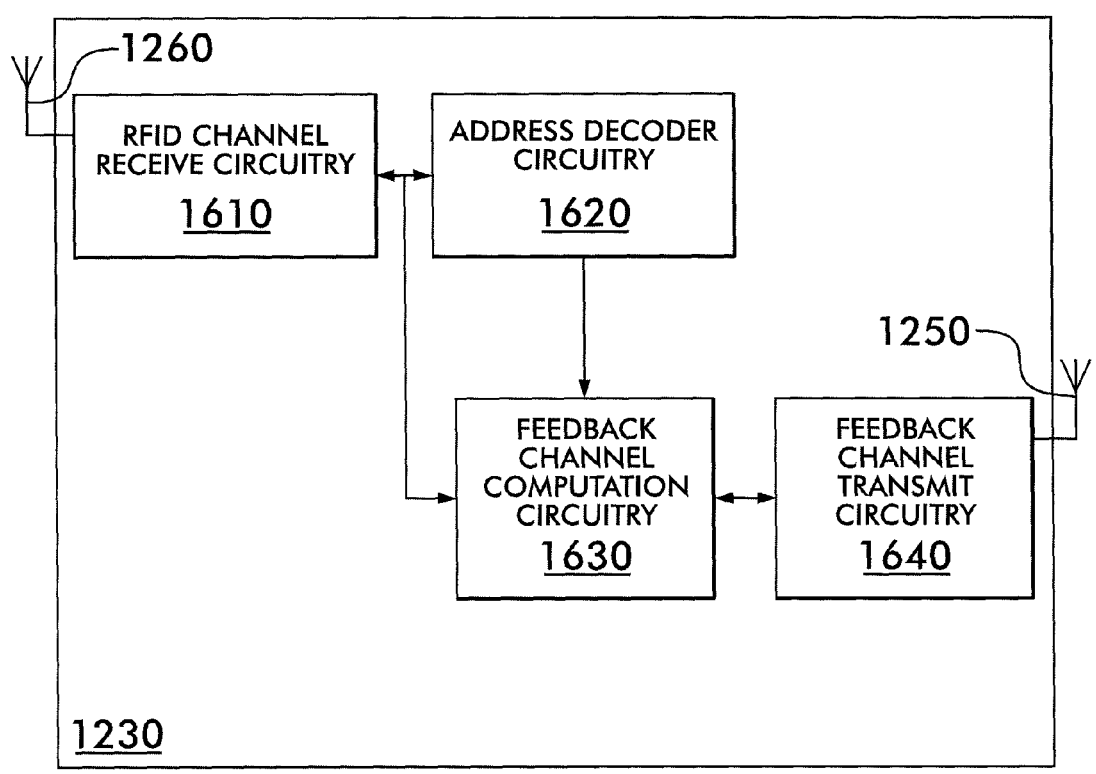
FIG. 19 is a block diagram of a calibration node system, according to various embodiments of the present invention.

FIG. 19 illustrates a block diagram of a configurable monitoring device calibration node system, according to various embodiments. The calibration node 1230 comprises RFID channel receive circuitry 1610, address decoder circuitry 1620, feedback channel computation circuitry 1630, and feedback channel transmit circuitry 1640. The calibration node is coupled to an RFID channel antenna 1260 and a beamforming control channel antenna 1250. As above, in some embodiments, the calibration node 1230 may connect directly to either the reader node 1220 or the beamforming node 1210 via a hardwired connection (not shown). Through RFID channel antenna 1260, the calibration node 1230 receives and demodulates the radio frequency identification signal 1160 using RFID channel receive circuitry 1610. The feedback channel computation circuitry 1630 then analyzes the received signal for use in the feedback loop to control the radio frequency identification signal 1160 generated by the beamforming nodes 1210. The analysis depends on the specific beamforming algorithm implemented in the beamforming control system 1200. The resulting data may include signal-to-noise ratio, received signal strength, and complex amplitudes. The data is quantized to the required number of bits by the feedback channel computation circuitry 1630 and transmitted back to the reader node 1220 using the feedback channel transmit circuitry 1640.

In a typical system, one or more calibration nodes 1230 may be positioned in the interrogation zone 1170. The reader node 1220 may select feedback information from any or all of the calibration nodes 1230. In addition, the reader node 1220 synchronizes the calibration nodes 1230 so that they do not send data at the same time in a way that causes interference. To accomplish this, in various embodiments each calibration node 1230 within the beamforming system 1200 has a unique address. In these embodiments, the reader node 1220 first transmits the address of the calibration node 1230 that should respond. This transmission may be accomplished via the beamforming nodes 1210 using the radio frequency identification signal 1160. Each calibration node 1230 receives this address information using the RFID channel antenna 1260. After demodulation by the RFID channel receive circuitry 1610, the received address is decoded and compared to the predetermined calibration node address by the address decoder circuitry 1620. Each calibration node 1230 only responds to the reader node 1220 if the received address matches its predetermined address.

Figure 20:
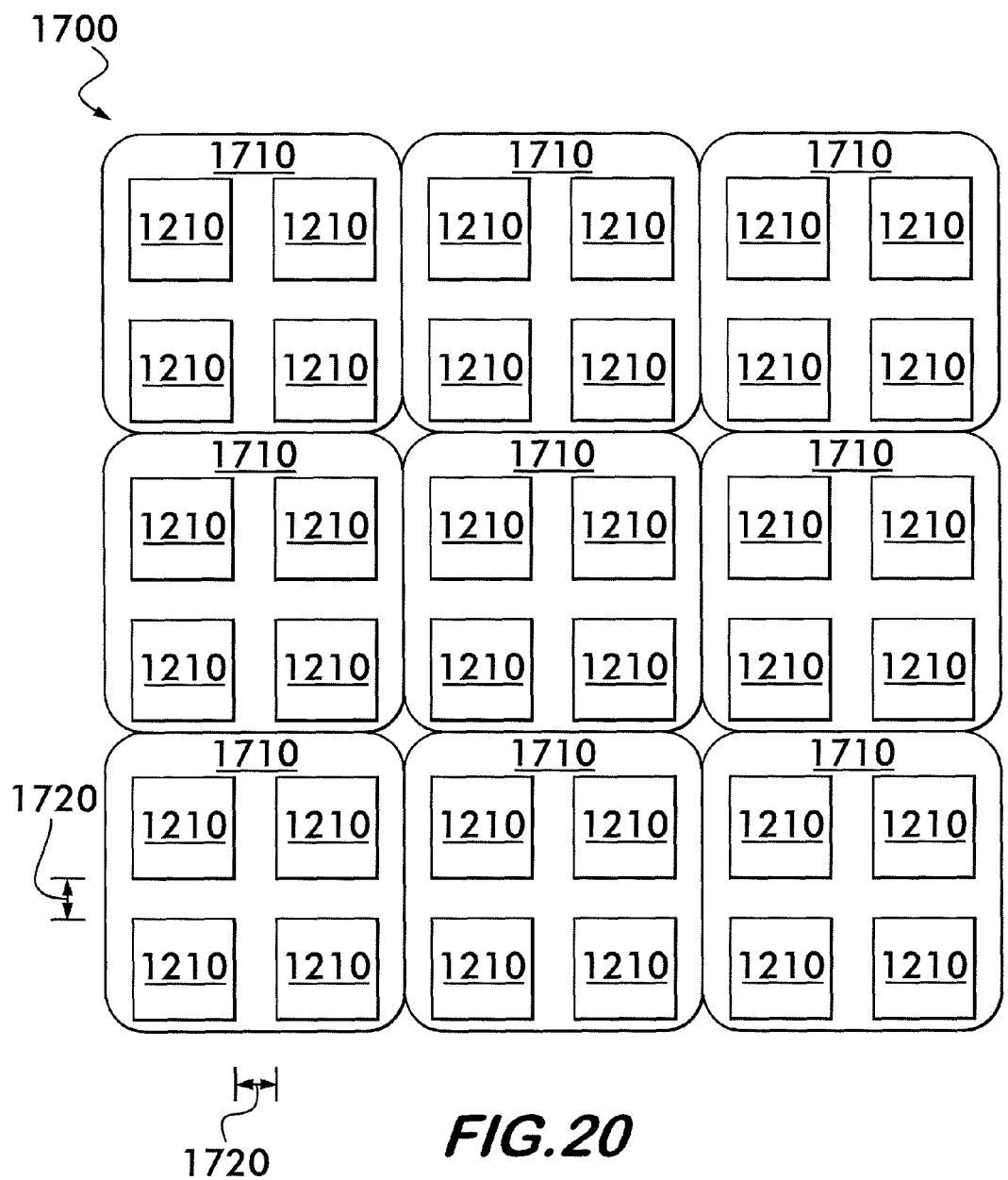
FIG. 20 illustrates a beamforming array, according to various embodiments of the present invention.

FIG. 20 illustrates a beamforming panel array, according to various embodiments. The beamforming array 1700 consists of a plurality of beamforming panels 1710, each of which includes a plurality of beamforming nodes 1210 and their respective beamforming control channel antennas 1250 and RFID channel antennas 1260 (not shown). A beamforming array 1700 may include any number of beamforming nodes 1210 on a beamforming panel 1710, and may include any number of beamforming panels 1710, as long as there are at least two beamforming nodes 1210 in the beamforming array 1700. Any number of the beamforming panels 1710 can be configurable monitoring devices. To improve the beamsteering capabilities for the radio frequency identification signal 1160, the beamforming array 1700 may be arranged such that the distance between all beamforming nodes 1210 is equal to a distance 1720, where distance 1720 is optimally one half the wavelength of the radio frequency identification signal 1160 transmitted by the beamforming array 1700. In various embodiments, the beamforming array 1700 may extend into one, two or three spatial dimensions.

To reduce interference and increase read range and reliability, more beamforming panels 1710 may be used in the beamforming array 1700 to produce a radio frequency identification signal 1160 directed to a narrower region of space. In other embodiments, however, the beamforming nodes 1210 may be arbitrarily arranged without a uniform distance between each of the beamforming nodes 1210. The feedback control loop described herein enables automated self-calibration, which may be used to compensate for an unknown arrangement of a set of beamforming nodes 1210 in a beamforming panel 1710 and/or an arbitrarily arranged set of beamforming panels 1710 in the beamforming array 1700.

Figure 21:
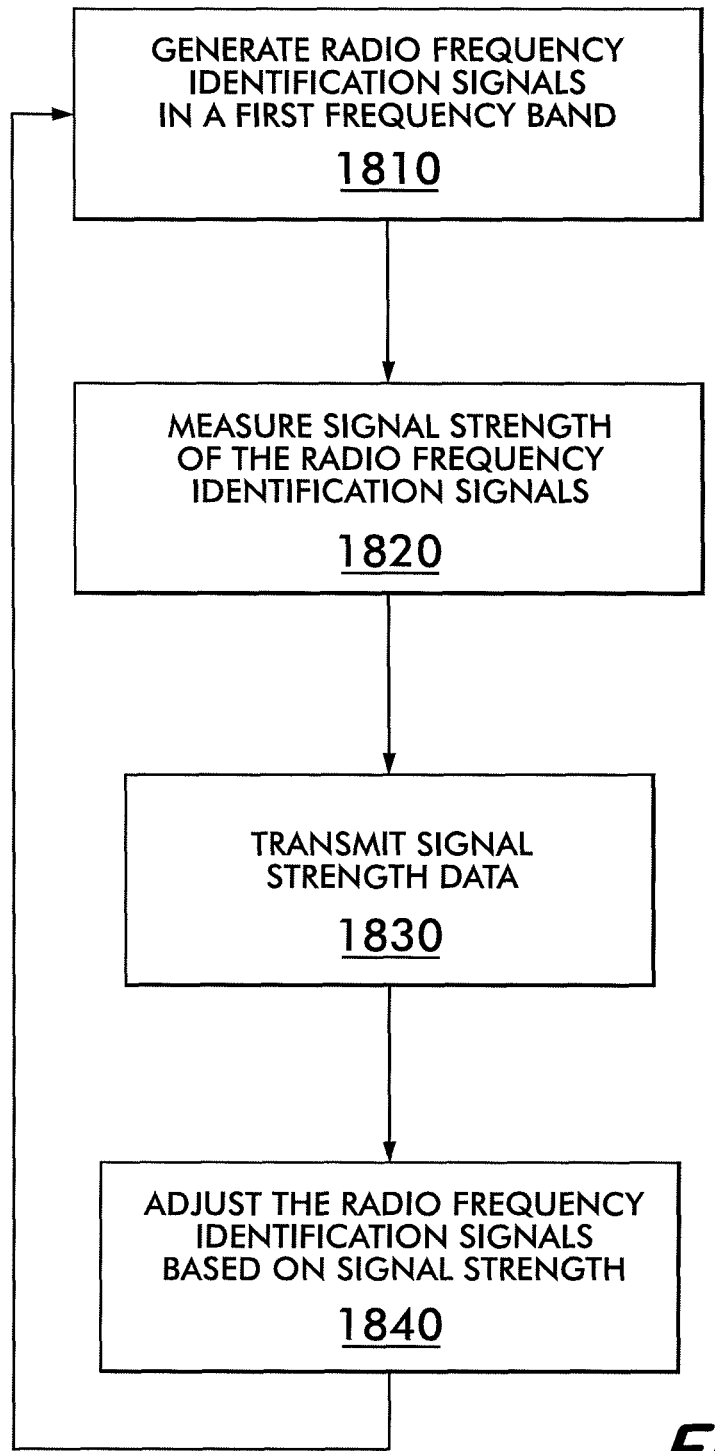
FIG. 21 illustrates methods of beamforming, according to various embodiments of the present invention.

FIG. 21 is a flowchart of a method of beamforming, according to various embodiments of the present invention. A feedback control loop is used to control a directional electromagnetic energy beam that energizes and communicates with the RFID tags 1140, 1150 within the interrogation zone 1170. In step 1810, the radio frequency identification signal 1160 is generated in a first frequency band. In step 1820, the calibration node 1230 takes measurements of the received radio frequency identification signal 1160, such as average power and/or signal-to-noise ratio. In step 1830, the calibration node 1230 transmits the signal measurement data measured in step 1820 to either the reader node 1220, to the beamforming nodes 1210, or both. In step 1840, the phase and/or power level of the radio frequency identification signal 1160, transmitted by for example the beamforming nodes 1210 and/or the RFID channel antenna 1260, and is adjusted based on the signal measurement data using a feedback loop. The feedback loop may use one of a variety of algorithms for beamforming as discussed above. Following step 1840, the method returns to step 1810 and may repeat.

Figure 22:
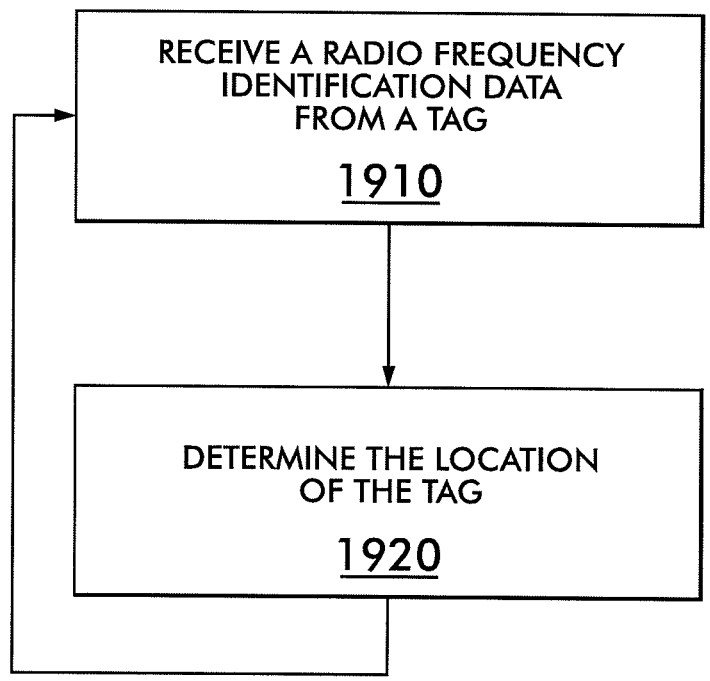
FIG. 22 illustrates methods of reading data from RFID tags, according to various embodiments of the present invention.

FIG. 22 is a flowchart of a method of reading data from RFID tags, according to various embodiments of the present invention. In this method, data from the RFID tag circuitry 1240 is read by the reader node 1220, which then determines the location of specific RFID tags 1150 based on, for example, the beamsteering features of a beamforming array 1700. In step 1910, the reader node 1220 receives data transmitted by the RFID tag circuitry 1240 via the modulated and backscattered radio frequency identification data 1190. In step 1920, the reader node uses information received from the RFID tag circuitry 1240, including for example an identification number, along with the data from the calibration node 1230 and data from the beamforming control algorithm to determine the physical location of RFID tag circuitry 1240, and consequently the item tagged by RFID tag circuitry 1240. In various embodiments, the location of an RFID tag 1150 may be determined using the signal strength of the radio frequency identification data 1190 as a function of the radio frequency identification signal 1160 received by an RFID tag 1150 and the one or more calibration nodes 1230.

Figure 23:
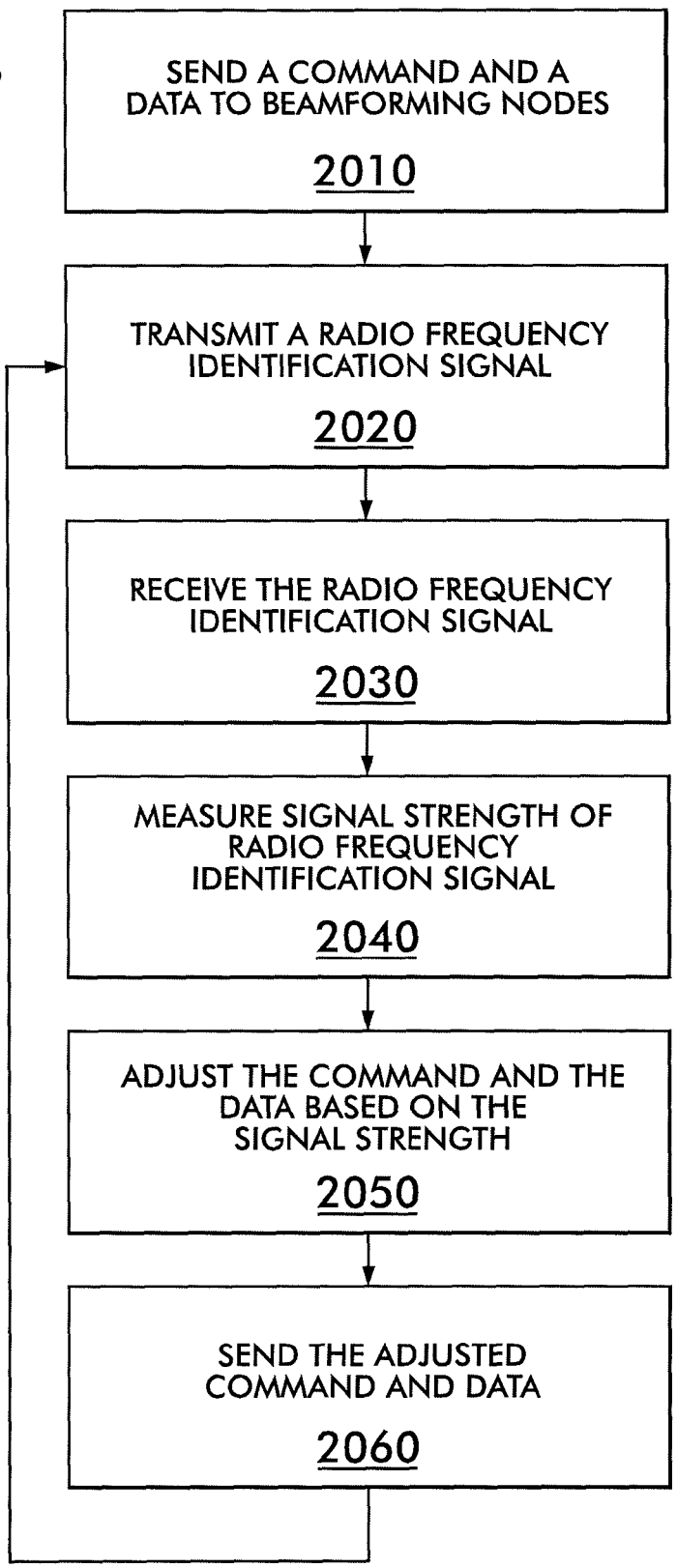
FIG. 23 illustrates methods of beamforming, according to various embodiments of the present invention.

FIG. 23 illustrates the methods of beamforming, according to various embodiments of the present invention. In these methods, a feedback control loop is utilized to control a directional electromagnetic energy beam that energizes and communicates with the RFID tags 1150 within the interrogation zone 1170. In step 2010, the reader node 1220 sends a command and data to the beamforming nodes 1210 to control the generation of the radio frequency identification signal 1160. In step 2020, the beamforming nodes 1210 transmit a radio frequency identification signal 1160 directed toward the interrogation zone 1170. In step 2030, the calibration nodes 1230 receive the radio frequency identification signal 1160 transmitted by the beamforming nodes 1210. In step 2040, the calibration node 1230 transmits a signal strength data, based on measurements of the radio frequency identification signal 1160, to the reader node 1220. In step 2050, the reader node 1220 adjusts the command and data to be sent to the beamforming nodes 1210 based on the signal strength data. In step 2060, the reader node 1220 sends the adjusted command and data to the plurality of beamforming nodes 1210. Following step 2060, the method returns to step 2020 and may repeat.

Figure 24:
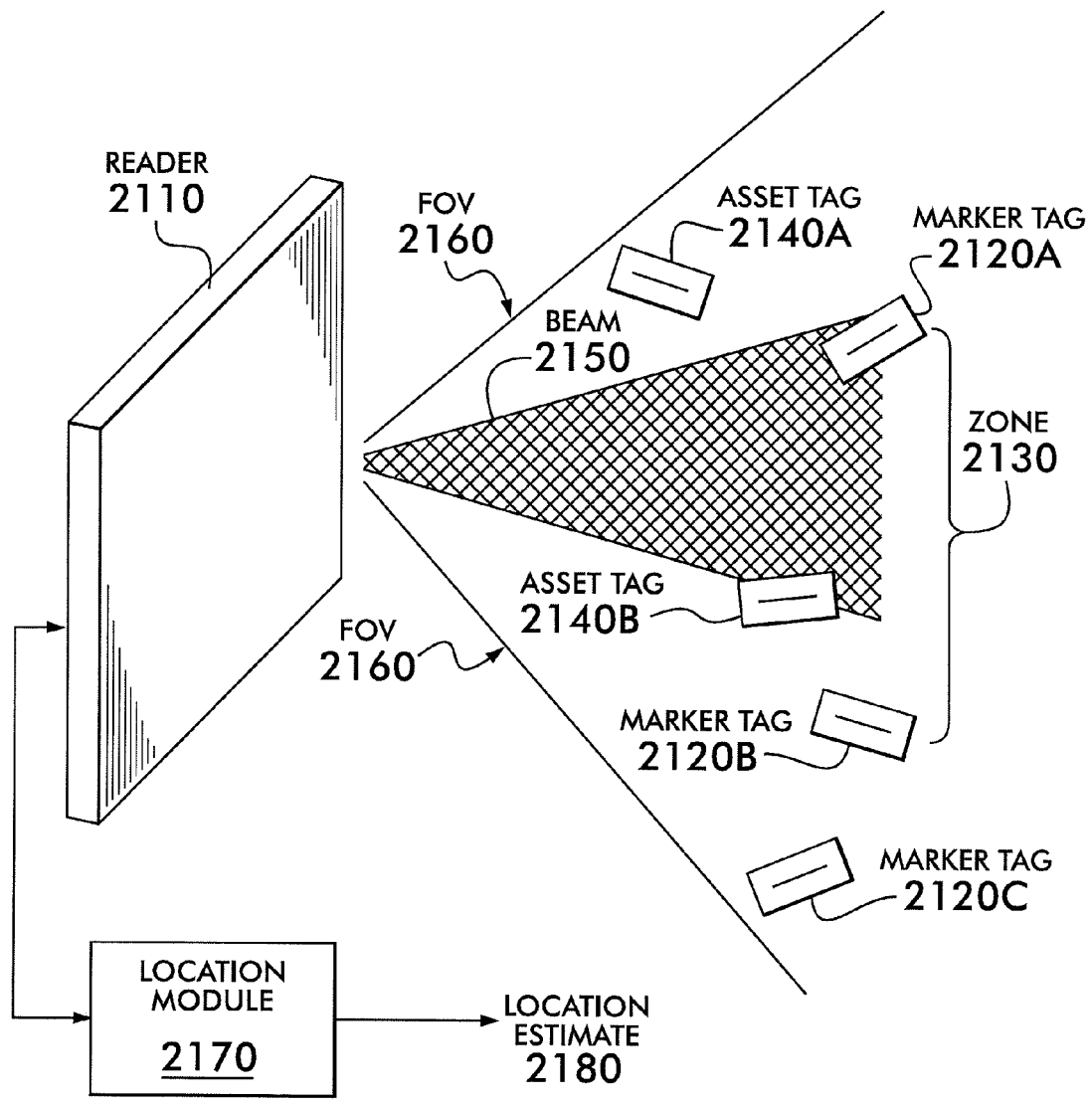
FIG. 24 illustrates a localizing system using marker tags and asset tags.

Referring now to FIG. 24, there is shown an embodiment of a localization system according to the invention suitable for use in a configurable monitoring system. Embodiments of the invention include a method for receiving modulated backscatter signals using a reader node from one or more marker tags or marker nodes, receiving a modulated backscatter signal using the reader from an asset tag, estimating parameters of the modulated backscatter signals received from the one or more marker tags and estimating a parameter of the modulated backscatter signal received from the asset tag. Any of the tags or nodes in the localization system can be configurable monitoring devices. The method further includes determining a location estimate for the asset tag, the location estimate based on the estimated parameters of the modulated backscatter signals received from the one or more marker tags and the estimated parameter of the modulated backscatter signal received from the asset tag.

According to another embodiment, a method includes estimating first parameters of modulated backscatter signals received from a plurality of marker tags when a reader is at a first position, estimating a second parameter of a modulated backscatter signal received from an asset tag when the reader is at the first position, moving the reader to a second position, estimating third parameters of the modulated backscatter signals received from the plurality of marker tags when the reader is at the second position, and estimating a fourth parameter of the modulated backscatter signal received from the asset tag when the reader is at the second position. The method further includes estimating a location of the asset tag based on the first parameters, the second parameter, the third parameters and the fourth parameter.

Embodiments of the invention include means for receiving modulated backscatter signals from one or more marker tags, means for receiving a modulated backscatter signal from an asset tag, means for estimating parameters of the modulated backscatter signals received from the one or more marker tags, means for estimating a parameter of the modulated backscatter signal received from the asset tag and means for determining a location estimate for the asset tag, the location estimate based on the estimated parameters of the modulated backscatter signals received from the one or more marker tags and the estimated parameter of the modulated backscatter signal received from the asset tag.

The present invention includes methods and systems for localizing an asset using the modulated backscatter from an asset tag and one or more marker tags. The modulated backscattered signals from marker tags may be used by a reader and a location module to estimate location of the reader and the asset tags. An asset is any item whose location is of interest, and an asset tag is a tag associated with the asset, for example, by affixing the asset tag to the asset. Assets may be inanimate objects such as books, or persons, animals, and/or plants.

The methods and systems enable location-enabled inventory, where the estimated locations of tagged assets are determined in an area of interest. Furthermore, in embodiments including a mobile reader, the methods and systems can localize asset tags and determine tag motion throughout a large area and can, for example, take an inventory of tagged assets throughout the large area.

The system includes the reader and the location module and one or more marker tags that are used to provide location estimates for the asset tag based partially on a prior knowledge of the location of each of the one or more marker tags. The location for each marker tag may be stored in a database. A location estimate for an asset tag may be determined based on the marker tags. Once the location of an asset tag is estimated, the asset tag may act as a marker tag, and is described herein as a simulated marker tag.

A location module determines a location estimate for the asset tag using the estimated parameters of the modulated backscatter signals received from one or more marker tags and from the asset tag. The parameters may be represented by scalar or vector values, and may include, for example, the angle of arrival of the modulated backscatter signals with respect to an axis of the reader, and/or a range (i.e., distance) from the marker tag and/or the asset tag to the reader. Using the known locations of the marker tags and the estimated parameters, the location estimate of the asset tag can be determined. A location estimate may be a relative location, an absolute location, and/or a zone including the marker tags.

In one example, a zone including an asset tag may be determined by marker tags at each end of a bookshelf. When the asset tag is affixed to an item on the bookshelf, such as a book, the book may thereby be determined to be in the zone, and likewise on the bookshelf. In this configuration, a relative location of the reader may also be determined by processing the received modulated backscatter signals from the asset tag and the marker tags.

With reference to FIG. 24, there is shown a configurable monitoring system for localizing using marker tags and asset tags. The localizing system of the invention includes methods and systems for localizing an asset using the modulated backscatter from an asset tag and one or more marker tags. The modulated backscattered signals from marker tags may be used by a reader and a location module to estimate location of the reader and the asset tags. An asset is any item whose location is of interest, and an asset tag is a tag associated with the asset, for example, by affixing the asset tag to the asset. Assets may be inanimate objects such as books, or persons, animals, and/or plants.

The methods and systems enable location-enabled inventory, where the estimated locations of tagged assets are determined in an area of interest. Furthermore, in embodiments including a mobile reader, the methods and systems can localize asset tags throughout a large area and can, for example, take an inventory of tagged assets throughout the large area.

The system includes the reader and the location module and one or more marker tags that are used to provide location estimates for the asset tag based partially on a prior knowledge of the location of each of the one or more marker tags. The location for each marker tag may be stored in a database. A location estimate for an asset tag may be determined based on the marker tags. Once the location of an asset tag is estimated, the asset tag may act as a marker tag, and is described herein as a simulated marker tag.

A location module determines a location estimate for the asset tag using the estimated parameters of the modulated backscatter signals received from one or more marker tags and from the asset tag. The parameters may be represented by scalar or vector values, and may include, for example, the angle of arrival of the modulated backscatter signals with respect to an axis of the reader, and/or a range (i.e., distance) from the marker tag and/or the asset tag to the reader. Using the known locations of the marker tags and the estimated parameters, the location estimate of the asset tag can be determined. A location estimate may be a relative location, an absolute location, and/or a zone including the marker tags.

In one example, a zone including an asset tag may be determined by marker tags at each end of a bookshelf. When the asset tag is affixed to an item on the bookshelf, such as a book, the book may thereby be determined to be in the zone, and likewise on the bookshelf. In this configuration, a relative location of the reader may also be determined by processing the received modulated backscatter signals from the asset tag and the marker tags.

FIG. 24 illustrates a configurable monitoring system localizing system using marker tags and asset tags. The localizing system comprises a reader 2110 and a location module 2170. The reader 2110 may generate a transmitted electromagnetic signal represented by beam 2150. Field of view (FOV) 2160 may represent the field of view for reception of the modulated backscatter signals received from marker tags 2120 (or marker nodes 2120) and/or asset tags 2140 (or asset nodes 2140). FOV 2160 is shown in two-dimensions in FIG. 24 for simplicity, and may be a three-dimensional field of view. A zone 2130 may be a region between marker tag 2120A and marker tag 2120B, as shown for simplicity in two dimensions in FIG. 24. As illustrated in FIG. 24, asset tag 2140B falls within zone 2130. In various embodiments, the zone 2130 may also be a three dimensional region (not shown). Thus, one or more marker tags 2120 may be used to define zones having two-dimensional and/or three-dimensional geometries.

In various embodiments, the reader 2110 includes one or more antennas (not shown) for transmitting electromagnetic signals to the marker tags 2120 and the asset tag 2140, and one or more antennas for receiving the modulated backscatter signals from the marker tags 2120 and the asset tag 2140. The reader 2110 may operate in one or more of the following modes: (i) single antenna transmission, multi-antenna reception; (ii) multi-antenna transmission, multi-antenna reception; and/or (iii) multi-antenna transmission, single antenna reception.

The marker tags 2120 and asset tags 2140 communicate with the reader 2110 using modulated backscatter signals. Reader 2110 receives modulated backscatter signals from the marker tags 2120 and the asset tag 2140, and estimates parameters of the modulated backscatter signals. As used herein, an estimated parameter of a modulated backscatter signal received from a marker tag 2120 and/or an asset tag 2140 includes any measurable quantity, characteristic, or information determined and/or estimated from the modulated backscatter signal.

An estimated parameter may include, but is not limited to, an RFID preamble, an RFID payload data and/or additional information, a signal strength of the modulated backscatter signal received from a marker tag 2120 and/or an asset tag 2140, an angle of arrival of the modulated backscatter signal received from a marker tag 2120 and/or an asset tag 2140, an antenna array response for a modulated backscatter signal received from a marker tag 2120 and/or an asset tag 2140, a range from a marker tag 2120 and/or an asset tag 2140 to the reader 2110, a time of flight of the modulated backscatter signal from the marker tag 2120 and/or asset tag 2140 to the reader 2110. When reader 2110 estimates the parameters of the modulated backscatter signals over time, the location module 2170 may determine a direction of motion of an asset tag 2140 and/or a velocity of an asset tag 2140.

The location of the marker tag 2120 may be stored in a database (not shown) that is accessible to the location module 2170. The location of the marker tag 2120 may include an absolute or relative location in two-dimensional (x,y) coordinate space, or an absolute or relative location in three-dimensional (x,y,z) coordinate space.

The location module 2170 may provide a location estimate 2180 of the asset tag 2140 by having reader 2110 read (e.g., receive modulated backscatter signals) from one or more of the marker tags 2120 and the asset tag 2140 in the FOV 2160 of reader 2110. The location estimate 2180 may be an absolute or a relative location estimate of the asset tag 2140, may provide a determination that asset tag 2140 is included in the zone 2130, may provide a probabilistic estimate of the absolute or relative location of asset tag 2140, and/or may provide a probabilistic estimate whether the asset tag 2140 is included in the zone 2130. For example, when the reader 2110 reads asset tag 2140B, the location module 2170 may compare the location of asset tag 2140B to the location of the marker tags 2120A and 2120B and provide the location estimate 2180 including the determination that the zone 2130 includes the asset tag 2140B.

In various embodiments, the location module 2170 may provide the location estimate 2180 at multiple time instances and/or over multiple time periods. Thus, the location estimate 2180 may be used to determine a direction of motion and velocity of the asset tag 2140. This enables, for example, a reader 2110 located at a doorway to determine whether an asset tag 2140 may be entering or exiting a particular region of interest.

In various embodiments, marker tags 2120 and/or asset tags 2140 may be passive, semi-passive, active, or combinations of these kinds of tags. For example, some marker tags 2120 may be semi-passive in order to provide a high spatial-resolution identification of zones, while asset tags 2140 may be passive tags in order to reduce cost. If a range between reader 2110 and the marker tags 2120 and asset tags 2140 is larger than suitable for passive tags, then both marker tags 2120 and asset tags 2140 may be semi-passive.

Once the location of an asset tag 2140 has been estimated, the asset tag 2140 can play the role of a marker tag 2120, thus reducing the density of marker tags 2120. An asset tag 2140 used in this manner may be referred to as a simulated marker tag. A zone may thus be determined based on one or more simulated marker tags.

Figure 25:
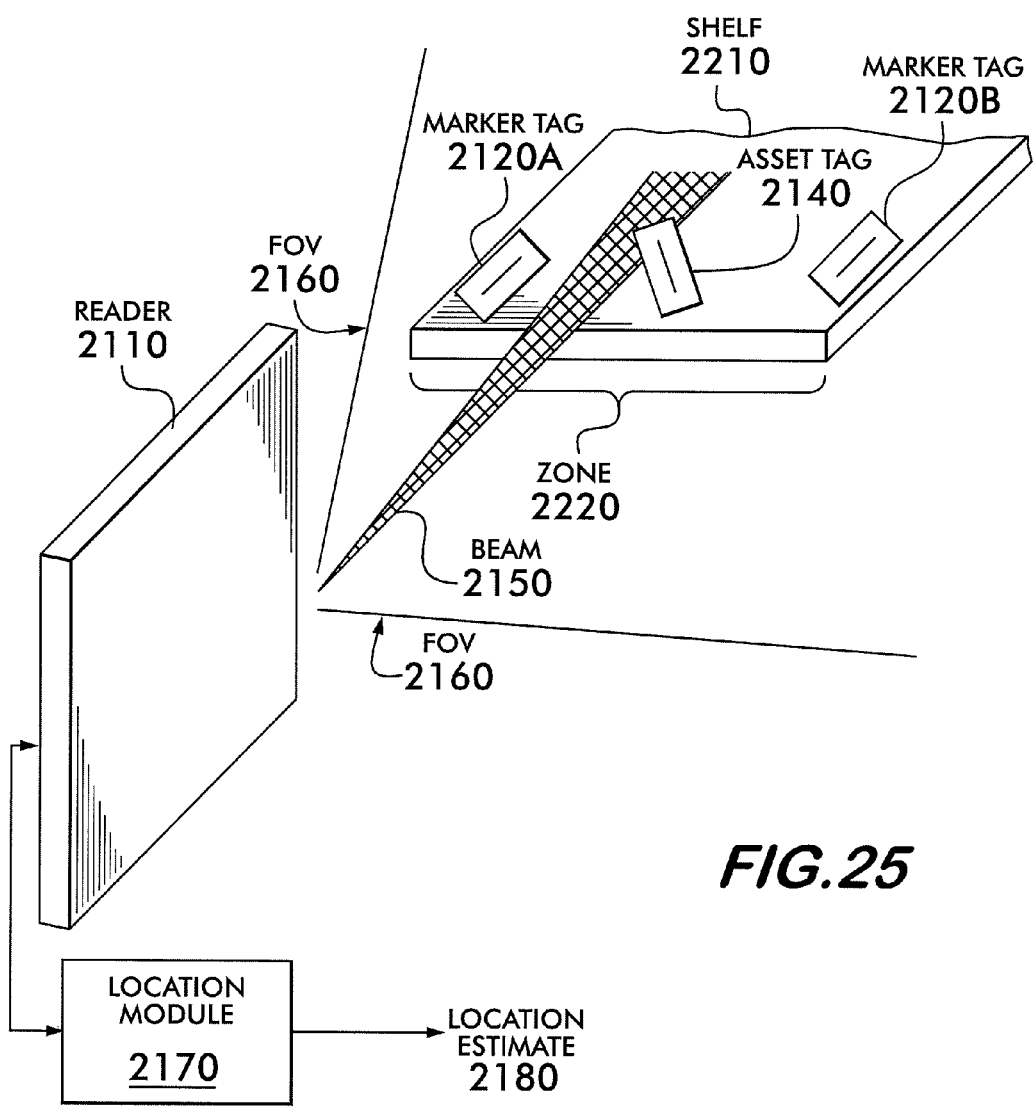
FIG. 25 illustrates a localizing system in a shelf application.

FIG. 25 illustrates a localizing system in a shelf application. The marker tag 2120A may be positioned at one shelf end of shelf 2210, and the marker tag 2120B at the other end of shelf 2210. A zone 2220 may then be defined as the region on the shelf between the two marker tags 2120A and 2120B. In this application, the location module 2170 may provide the location estimate 2180 that includes whether the asset tag 2140 is in the zone 2220.

Figure 26:
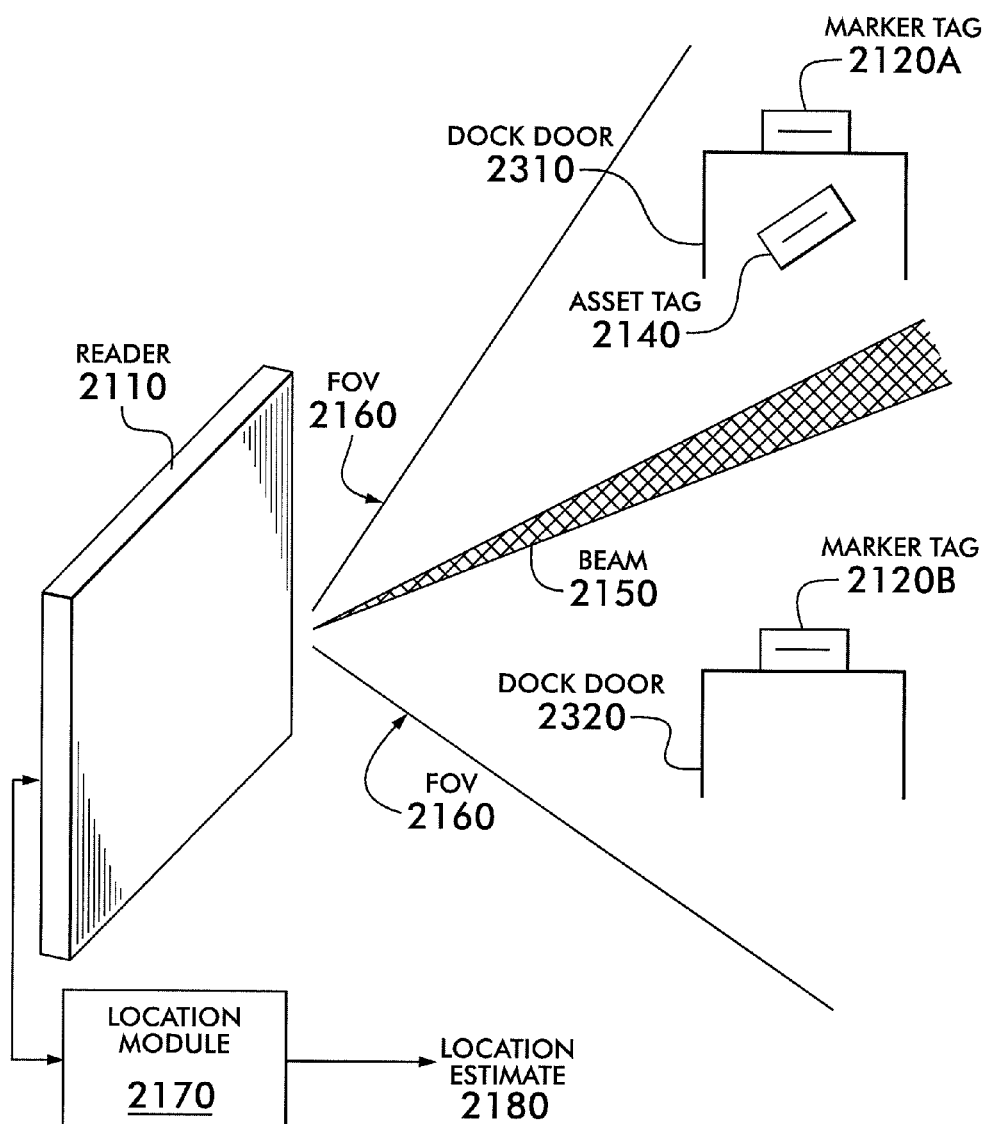
FIG. 26 illustrates a localizing system in a dock door application.

FIG. 26 illustrates a localizing system in a dock door application. In this application, a zone including dock door 2310 may be defined by a radius from a marker tag 2120A, and another zone including dock door 2320 may be defined by a radius from a marker tag 2120B. Although FIG. 26 illustrates a dock door application including two dock doors (dock door 2310 and dock door 2320), the localizing system may be used with a single dock door (not shown), or more than two dock doors (not shown).

The reader 2110 may receive modulated backscatter signals from an asset tag 2140 that is passing through dock door 2310. Determining that the asset tag 2140 is passing through dock door 2310 may be based on a location estimate 2180 that is within a radius from marker tag 2120A.

Figure 27:
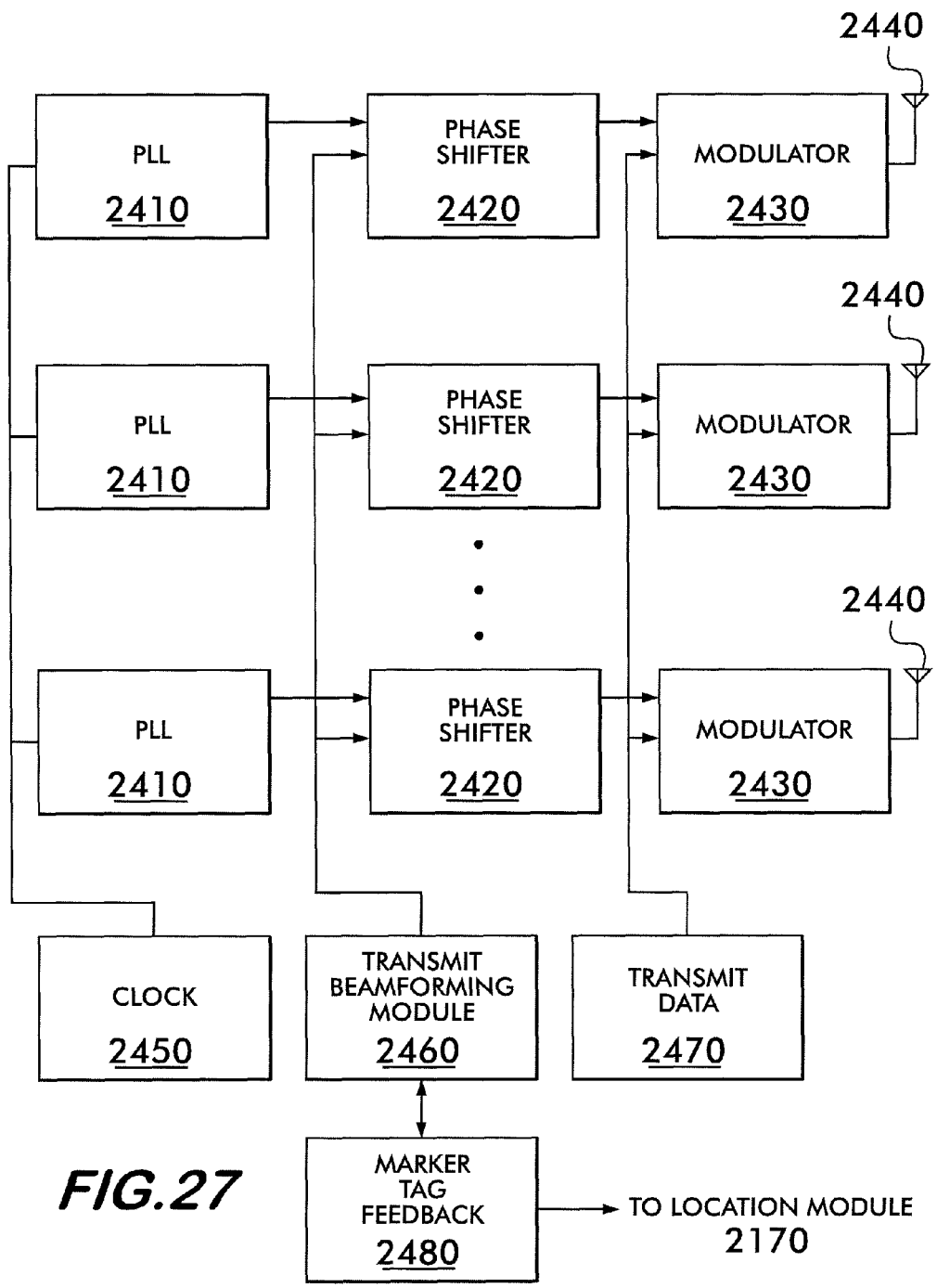
FIG. 27 is a block diagram of an exemplary transmitter beamforming system.

FIG. 27 is a block diagram of an exemplary transmitter beamforming system for use in a configurable monitoring system. The transmitter beamforming system comprises phase locked loops (PLL) 2410, phase shifters 2420, modulators 2430, antennas 2440, clock 2450, transmit beamforming module 2460, transmit data 2470 and marker tag feedback 2480. Each of the antennas 2440 may be an individual antenna, or an antenna element. Transmitter beamforming uses two or more antennas 2440 to direct the transmitted beam to a certain region in space. In various embodiments, reader 2110 (FIG. 24) includes transmitter beamforming capability which enables reader 2110 to select where to direct the energy of its beam 2150.

In terms of the standard complex baseband representation for passband signals, if the transmitter beamforming system has N antenna elements, then the transmitted signal $u_i(t)$ from the ith antenna, i=1, ..., N, is given by $w_i s(t)$, where $w_i$ is a complex gain termed the ith beamforming coefficient, and $s(t)$ is the signal (in general, complex-valued) to be transmitted. In a vector format, $$u(t) = (t), \ldots, u_N(t))^T,$$

$$w = (w_i, \ldots, w_N)^T, \text{ and}$$

$$u(t) = ws(t).$$

If the signal s(t) is narrowband (i.e., its bandwidth is small relative to the coherence bandwidth of the channel), then the channel gain from the ith transmit element to the marker tag 2120 and/or asset tag 2140 in such a system can be modeled as a complex scalar $h_i$. Defining the channel vector $$h=(h_1,\ldots,h_N)^T,$$

the received signal at the marker tag 2120 and/or asset tag 2140 can be modeled as:

$$y(t)=h^T w s(t)+n(t),$$

where n(t) denotes noise.

The modulated backscattered signal from the marker tag 2120 and/or asset tag 2140 therefore has power proportional to $(h^T w)^2$. The channel vector h depends on the location of the marker tag 2120 and/or asset tag 2140 relative to the antennas 2440. For example, when antennas 2440 are linear array with elements spaced by d, the channel vector for a marker tag 2120 and/or asset tag 2140 lying at an angle θ relative to the broadside is given by:

$$a(\theta)=(1,\alpha,\alpha^2,\ldots,\alpha^{N-1})^T,$$

where $\alpha=\exp(j2\pi d \sin\theta/\lambda)$, and λ denotes the carrier wavelength. Thus, the strength of the modulated backscatter signal from the marker tag 2120 and/or asset tag 2140 is related to the location of the marker tag 2120 and/or asset tag 2140 relative to the reader 2110.

Using transmitter beamforming, the location module 2170 may provide the location estimate 2180 from the modulated backscatter signals as follows. A main lobe of the transmit beam, such as beam 2150, may be scanned through a region. The beam 2150 is electronically steered using an array of antennas 2440 by controlling the relative phases and amplitudes of the radio frequency (RF) signals transmitted from the antennas 2440. The strength of the received modulated backscatter signal from the marker tags 2120 as a function of the scan angle may be provided to marker tag feedback 2480 and to the localization module 2170. Using this information the location estimate 2180 including the angle of arrival of the modulated backscatter signals received from the marker tags 2120 can be estimated.

The peak in the modulated backscatter signal strength as a function of the scan angle, for example, can be used to estimate parameters of the received modulated backscatter signal including the angle of arrival. For a high spatial-resolution estimate, suppose that $w_k$ is the vector of transmit beamforming coefficients corresponding to the kth scan, where k=1, ..., K, and that h(x) is the channel vector from the reader 2110 to a marker tag 2120 and/or an asset tag 2140 at location x relative to the reader 2110. Here x may denote a three-dimensional position, a two-dimensional position, or an angle of arrival and/or departure relative to the transmit beamforming array of reader 2110. The vector of received powers over the K scans is then proportional to:

$$Q(x)=((h(x)^T w_1)^2,\ldots,(h(x)^T w_K)^2).$$

A comparison of the actual vector of received powers $P=(P_1,\ldots,P_K)$ with Q(x) can therefore be used to estimate x from among a set of feasible values for x. For example, consider an array with array response a(θ). In order to form a beam towards angle $\theta_k$ on the kth scan, the beamforming coefficients are set to $w_k=a^*(\theta_k)$, so that the peak of $(h^T w_k)^2$ occurs at $h=a(\theta_k)$. The vector of expected receive powers from the marker tag 2120 and/or the asset tag 2140 at angle θ is therefore given by:

$$Q(\theta)=((a(\theta)^H a(\theta_1))^2,\ldots,(a(\theta)^H a(\theta_K))^2).$$

A comparison of the actual vector of received powers $P=(P_1,\ldots,P_K)$ with Q(θ) can now be used to estimate θ.

This technique generalizes to two-dimensional arrays, which enables the estimation of two angles. While angle estimation may be based on comparing the shape of P with Q(θ), the strength of P (the received signal strength) can be used to estimate the range of the marker tag 2120 and/or the asset tag 2140 relative to the reader 2110. Thus, a two-dimensional transmit beamforming array can be used in a configurable monitoring system to estimate the three-dimensional location of a marker tag 2120 and/or an asset tag 2140 relative to the reader 2110, by combining estimates of two angles and a range.

If the marker tag 2120 transmits a modulated backscatter signal including a known data sequence, then a correlation against the sequence can be used to provide an estimate of the parameters of the received modulated backscatter signal. The modulated backscatter signal from a marker tag 2120 and/or an asset tag 2140 is also known as an uplink. The correlation can provide an estimate of the complex baseband channel gain, which is proportional to $h^T w$, and can be used for adaptation of the transmit beamforming coefficients w. For example, let sample y[l] correspond to the lth symbol, b[l], transmitted on the uplink. Then:

$$y[l]=b[l]\beta h^T w + N[l],$$

where N[l] denotes noise, and β is the overall complex gain seen on the uplink due to modulated backscatter from the marker tag 2120 and/or the asset tag 2140 and the propagation to reader 2110. Then, the correlation $$\sum_l y[l] b^*[l]$$

provides an estimate of $\beta h^T w$ which can be used to adapt w to maximize the gain $(h^T w)^2$.

This technique is an implicit feedback mechanism, since the reader 2110 is extracting information about, and possibly adapting, the downlink based on information extracted from the uplink signal. Alternatively, if the data demodulation on the uplink is reliable enough, then this can be used for decision-directed parameter estimation by reader 2110 to reduce the requirement for marker tag 2120 to send a known segment of data. Thus, the symbols b[l] can be replaced by their estimates in such a decision-directed adaptation. The reader 2110 could also estimate the average received power on the uplink by, for example, computing an average of $|y[l]|^2$. The parameter being estimated may include explicit feedback sent by the marker tag 2120 to the reader 2110. An example of explicit feedback is when the marker tag 2120 encodes specific information regarding its received signal in the data that it is sending back in the modulated backscatter signal.

The reader 2110 may also use transmitter beamforming to reduce interference between conventional RFID systems and/or other transmitter beamforming systems that may be in the same area. Using the marker tags 2120, the reader 2110 may use transmitter beamforming to direct the transmitted RF energy, such as beam 2150, to desired areas and away from undesired areas using marker tag feedback 2480 to control transmit beamforming module 2460. The feedback from the marker tag 2120 can be implicit or explicit, as discussed herein. Thus, transmitter beamforming and/or power control as described herein can reduce interference and thus accommodate multiple RFID systems and/or multiple readers 2110 in close proximity.

Figure 28:
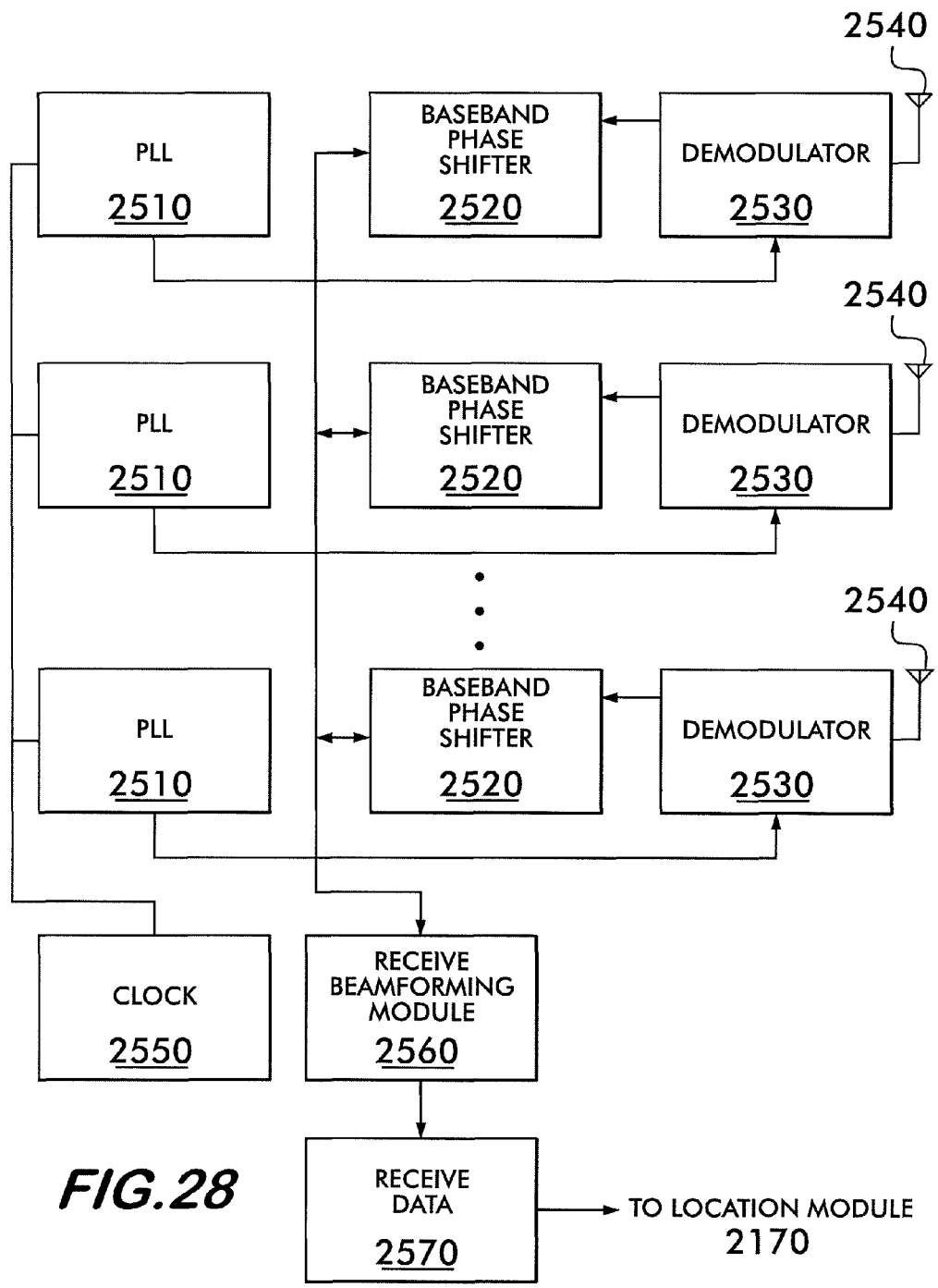
FIG. 28 is a block diagram of an exemplary receiver beamforming system.

FIG. 28 is a block diagram of an exemplary receiver beamforming system which can include two or more configurable monitoring devices. The receiver beamforming system comprises phase locked loops (PLL) 2510, baseband phase shifters 2520, demodulators 2530, antennas 2540, clock 2550, receive beamforming module 2560 and receive data 2570. Each of the antennas 2540 may be an individual antenna, or an antenna element. Receiver beamforming may use two or more antennas 2540 to tune the sensitivity of the reader 2110 to a region in space, such as FOV 2160. In various embodiments, the antennas 2540 may be the same as the antennas 2440 described with reference to FIG. 27. In various embodiments, reader 2110 includes receive beamforming capability which enables reader 2110 to determine localization information including an angle of arrival of the modulated backscatter signals received from the marker tags 2120 and the asset tag 2140.

Reader 2110 may include receive beamforming implemented in baseband, as shown in FIG. 28. Using receiver beamforming, the localizing of asset tags 2140 can be based on the relationship between the modulated backscatter signals received at the antennas 2540 from the one or more marker tags 2120 and the asset tag 2140. The receive beamforming module 2560 can estimate the receive array response corresponding to the modulated backscatter signal from a marker tag 2120 and/or an asset tag 2140 by correlating the received signals at the antennas 2540 against known or estimated data signals.

For example, consider narrowband signaling (in which the signal bandwidth is smaller than the channel coherence bandwidth) and a reader 2110 with M antennas. Using the complex baseband representation for the passband received signals at the M antennas, the received signal for the jth antenna, where j=1, ..., M, can be written as $y_j(t)=h_j v(t)+n_j(t)$, where v(t) is the signal backscattered by the tag, $h_j$ is the complex channel gain from the tag to the jth antenna element, and $n_j(t)$ is the noise seen by the jth antenna element. Using the vector notation:

$$y(t)=(y_1(t), \ldots, y_M(t))^T,$$

$$h=(h_1, \ldots, h_M)^T,$$

$$n(t)=(n_1(t), \ldots, n_M(t))^T, \text{then}$$

$$y(t)=hv(t)+n(t).$$

The vector h may be called the receive array response, or the spatial channel from the marker tag 2120 and/or asset tag 2140 to the reader 2110.

It is also useful to consider a discrete-time mode of the preceding representation (possibly obtained by filtering and sampling the continuous-time vector signal y(t)), as follows:

$$y[l]=hb[l]+n[l],$$

where b[l] may denote the lth symbol transmitted on the uplink. A receiver beamforming system may form a spatial correlation of the vector received signal with complex-valued receive beamforming coefficients. Thus, let $w=(w_1, \ldots, w_M)^T$ denote a vector of complex-valued beamforming coefficients, or beamforming weights. Then a receiver beamforming system may form the inner product:

$$r(t)=w^H y(t)=(w^H h)v(t)+w^H n(t).$$

For the discrete-time model, the corresponding inner product may follow the model:

$$r[l]=w^H y[l]=(w^H h)b[l]+w^H n[l].$$

An implementation of such a beamforming operation can correspond to phase shifts, implemented in baseband as shown in FIG. 28, as well as amplitude scaling (not shown).

In various embodiments, receive beamforming may be implemented in the RF band using a phase adjustment of the modulated backscatter signals received by individual elements of antennas 2540, according to beamforming techniques known in the art. The beamforming coefficients w may be adapted by the receive beamforming module in order to track a desired signal of interest, which might, for example, be known symbols sent on the uplink by the tag. The values of the adapted weights provide information regarding the receive array response h. Alternatively, the receive beamforming module may estimate the receive array response h directly from y(t), for example, by correlating it against a set of known or estimated symbols. Another quantity of interest is the spatial covariance matrix C:

$$C=E[y(t)y^H(t)],$$

which can be estimated, for example, by summing or averaging the outer products $y[l]y^H[l]$.

The receive array response corresponding to the marker tag 2120 and/or asset tag 2140 can then be used by the location module 2170 to provide the location estimate 2180 for asset tag 2140, according to techniques known in the art. The location module 2170 may also use second order statistics, such as the spatial covariance matrix C. In typical RFID protocols, the data modulated by a conventional RFID tag includes a known preamble, followed by a payload that may include a tag identity and/or additional information. In various embodiments, the marker tag 2120 and/or the asset tag 2140 may use a known preamble to estimate the receive array response. In addition to the preamble provided by the RFID protocol, a larger training sequence that improves the estimation of the receive array response can be provided by explicitly configuring the payload to contain additional information including a known data segment. For example, for the discrete-time model:

$$y[l]=hb[l]+n[l],$$

the receive array response h may be estimated using the correlation $$\sum_l b*[l]y[l],$$

where the sequence of symbols b[l] is known a priori due to being part of a known preamble or training sequence, as discussed herein.

The receive beamforming module 2560 may combine the signals received from antennas 2540 using a combination of training and decision-directed adaptation according to techniques known in the art. For example, the receive beamforming module 2560 may include adaptive algorithms known in the art based on the linear minimum mean squared error (MMSE) criterion. For example, for the discrete-time model:

$$r[l]=w^H y[l]=(w^H h)b[l]+w^H n[l],$$

the receive beamforming coefficients w may be adapted to minimize the mean squared error $E[|w^H y[l]-b[l]|^2]$. This can be implemented by algorithms that are known in the art, including least mean squares (LMS), recursive least squares (RLS) or block least squares (BLS), and/or variations thereof. If a marker tag 2120 and/or asset tag 2140 is communicating with the reader, and the noise is white, then the MMSE beamforming coefficients are a scalar multiple of h. Thus, adaptation of w provides information about the receive array response h. The beamforming coefficients w thus determined may be provided to the location module 2170. The location module can also be provided with any additional information such as the spatial covariance matrix C.

In various embodiments, reader 2110 may perform data demodulation without using a receiver beamforming system such as illustrated in FIG. 28. In these embodiments, demodulation can be accomplished separately for each antenna (not shown) in an antenna array. Data demodulation can be performed first using one or more antennas, and then the decisions can be correlated against the received signals at the different antenna elements to estimate the receive array response. For example, for the discrete-time model:

$$y[l]=hb[l]+n[l],$$

a decision-directed estimation of h may estimate the receive array response h using the correlation $$\sum_l b*[l]y[l],$$

where the estimates of the symbols b[l] are obtained from demodulators.

As described herein, the receiver array response h may be estimated by various methods including direct estimation by correlation of the vector received modulated backscatter signal against known or estimated signals, and indirect estimation by adapting receive beamforming weights w. Estimates of the receive array response may be used by the location module 2170 to provide the location estimate 2180 for the marker tag 2120 and/or asset tag 2140, relative to the reader 2110, since the receive array response h depends on the location of the marker tag 2120 and/or asset tag 2140 relative to the antennas 2540 in the receive antenna array.

For example, when antennas 2540 are a linear array with elements spaced by d, the channel vector for a marker tag 2120 and/or asset tag 2140 at an angle θ relative to the broadside is given by:

$$a(\theta)=(1,\alpha,\alpha^2,\ldots,\alpha^{N-1})^T,$$

where $\alpha=\exp(j2\pi d \sin \theta/\lambda)$ and $\lambda$ denotes the carrier wavelength. For a line of sight (LOS) link between the antennas 2540 and the marker tag 2120 and/or asset tag 2140, the direction in which the marker tag 2120 and/or asset tag 2140 lies, relative to the current position of the antennas 2540, can be estimated by maximizing $|a^H(\theta)h|$ as a function of $\theta$ over its permissible range. For an embodiment where antennas 2540 are a two-dimensional antenna array, two angles may be estimated. Furthermore, the received signal strength can be used to estimate the range, which then enables three-dimensional location. Other techniques known in the art for estimating the range can also be used, such as using frequency modulated continuous wave (FMCW) waveforms.

Once the location of the marker tags 2120 and/or asset tag 2140 relative to the reader 2110 have been determined by the location module 2170, a comparison of these locations can be used to determine the location estimate 2180 of the asset tag 2140 relative to the marker tags 2120. Thus, if the absolute location of the marker tags 2120 is known, then the absolute location of the asset tag 2140 can be determined. Alternatively, the location module 2170 may compare location-related parameters such as transmit or receive beamforming coefficients, or estimates of the receive array response, in order to provide the location estimate 2180 for the asset tag 2140 relative to the marker tags 2120. Such a location estimate 2180 may be quantized to a zone, as described herein, instead of being an explicit estimate in a two-dimensional or three-dimensional coordinate system. As discussed with reference to FIG. 24, FIG. 25 and FIG. 26, a zone may be defined as a region around one or more marker tags 2120, without requiring that the absolute coordinates of the marker tags are known.

If the antennas 2440 described with reference to FIG. 27 and the antennas 2540 described with reference to FIG. 28 are the same antenna array, the beamforming coefficients determined by receive beamforming module 2560 may be used for transmission by transmit beamforming module 2460, thereby directing beam 2150 more precisely to the region of a marker tag 2120 and/or an asset tag 2140. Alternatively, to reduce interference from marker tags 2120 in a particular region, the transmit beamforming module 2460 may synthesize a null in the direction of particular marker tags 2120 by adapting the transmit beamforming coefficients to be near-orthogonal to the receive beamforming coefficients.

A reader 2110 including transmitter and/or receiver beamforming may provide improved performance by using space division multiple access (SDMA) methods known in the art. For example, reader 2110 can direct its transmitted energy in beam 2150 to a small region, thereby reducing the number of marker tags 2120 that are illuminated by beam 2150. In various embodiments, the use of SDMA may simplify the task of singulation. For a reader 2110 including receive beamforming, multiuser detection techniques and algorithms such as MUSIC can be used to successfully decode simultaneous responses from multiple marker tags 2120 based on the differences in their receive array responses. Furthermore, if the marker tag 2120 payload includes data encoded in a direct sequence spread spectrum format, then multiple tags may be read at the same time by employing code division multiple access (CDMA) techniques known in the art to successfully decode multiple responses by received by reader 2110. In a reader 2110 with receiver beamforming capabilities, such CDMA techniques can be used in conjunction with SDMA.

Reader 2110 may also be used to determine range estimates. The geometry for a reader 2110 is analogous to radar and/or sonar since the modulated backscatter signals from marker tags 2120 and asset tags 2140 are electronically reflected back to reader 2110. Therefore, according to methods known in the art, radar and/or sonar techniques can be used to estimate range information. For example, the reader 2110 can transmit beam 2150 including a frequency modulated continuous wave (FMCW) waveform instead of a continuous wave (CW) tone. It can process the return from the marker tag 2120 and/or asset tag 2140 to detect the frequency difference between the transmitted FMCW waveform and the received FMCW waveform, and thereby estimate the range as may be done in FMCW radar. Reader 2110 may be used to determine range information using the strength of a modulated backscatter signal received from a marker tag 2120 and/or an asset tag 2140.

Figure 29:
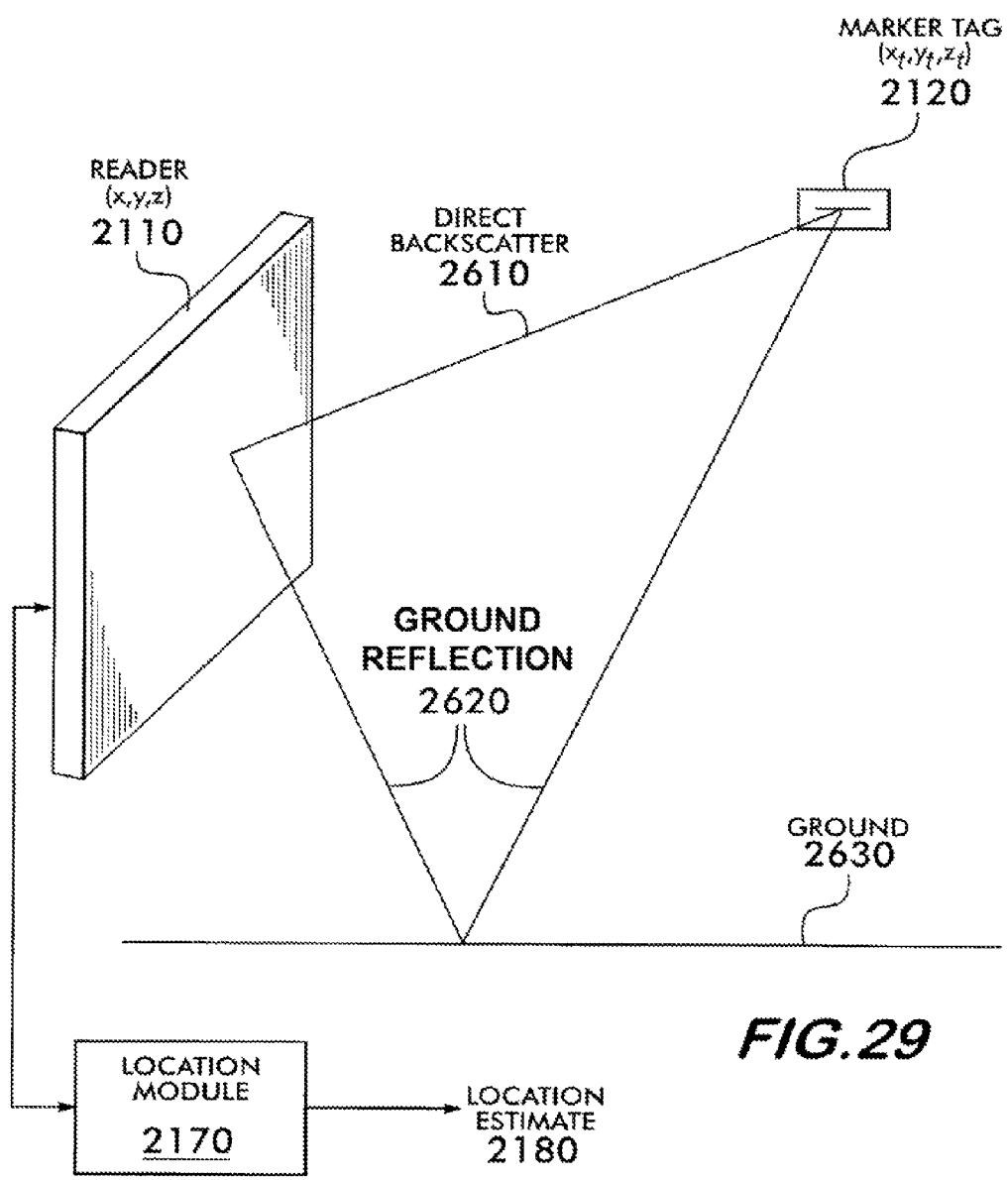
FIG. 29 illustrates a localizing system in a multipath environment.

FIG. 29 illustrates a localizing system in a multipath environment. Reader 2110 and location module 2170 may localize marker tags 2120 and/or asset tags 2140 in the presence of multipath components from reflecting or scattering objects. One such reflecting or scattering object is a ground surface. As illustrated in FIG. 29, a multipath environment may include reader 2110 at a location (x, y, z), ground 2630, a marker tag 2120 at location $(x_t, y_t, z_t)$. The reader 2110 receives direct backscatter 2610 from marker tag 2120, and ground reflection 2620.

In a simple line of sight (LOS) environment without a ground reflection 2620, a maximum likelihood (ML) estimate of the location of the marker tag 2120 and/or the asset tag 2140 corresponds to maximizing the correlation of the received array response against the array manifold. However, for a multipath environment, the ML estimate depends on the geometry. In one example, a dominant multipath component may be the ground reflection 2620 reflected from ground 2630. Other reflecting or scattering objects between the reader 2110 and marker tag 2120 and/or asset tag 2140 may also produce multipath components.

The complex baseband received array response corresponding to the multipath environment illustrated in FIG. 29 may be modeled by:

$$h = \alpha_1 a_1(x_t, y_t, z_t) + \alpha_2 a_2(x_t, y_t, z_t) + N$$

where $a_1$ is the array response corresponding to the direct backscatter 2610 (LOS path), $a_2$ is the array response corresponding to path from the ground reflection 2620, $\alpha_1$, $\alpha_2$ are complex gains corresponding to these paths and depend on the propagation environment, and may be unknown, and N is noise. The receive array response h above may denote an estimate of the receive array response, obtained using one of the techniques discussed herein, and the noise N may be interpreted as estimation noise, which is typically well approximated as white and Gaussian.

One approach to modeling these complex gains is to obtain a joint ML estimate of the complex gains and the location of marker tag 2120, $(x_t, y_t, z_t)$, by performing the minimization:

$$\min_{\alpha_1 \alpha_2} \min_{(x_t, y_t, z_t)} (y - \alpha_1 a_1(x_t, y_t, z_t) + \alpha_2 a_2(x_t, y_t, z_t))^H (y - \alpha_1 a_1(x_t, y_t, z_t) + \alpha_2 a_2(x_t, y_t, z_t))$$

where H is the conjugate transpose and the minimization is optimal when the noise, N, is additive white Gaussian.

One solution known in the art is to choose a location of marker tag 2120 $(x_t, y_t, z_t)$ that minimizes the projection of y orthogonal to the subspace spanned by $a_1(x_t, y_t, z_t)$ and $a_2(x_t, y_t, z_t)$. The search for the best estimate of the location $(x_t, y_t, z_t)$ can be constrained further based on additional information (e.g., range estimates, or prior knowledge of the distance of the reader 2110 from the location estimate of the marker tag 2120.)

Other solutions known in the art include use of algorithms such as MUSIC or ESPRIT for finding the dominant multipath components, based on the spatial correlation matrix. In general, finding the best fit location for marker tag 2120 for a particular receive array response can be achieved using standard ML or Bayesian techniques that take into account models of the multipath environment.

For a rich scattering environment, where the multipath is not sparse enough to model as described herein, the dependence of the receive array response for the location of marker tag 2120 may not be correctly modeled as described herein. However, the received array response still varies smoothly with the location of marker tag 2120. Thus, if one or more marker tags 2120 are placed densely enough, then a comparison of the array response for an asset tag 2140 (FIG. 24) with those of marker tags 2120 (e.g., by computing the normalized correlation between the estimated parameters) can be used to estimate the location of the asset tag 2140. If $h_a$ and $h_b$ are the estimated receive array responses for tags a and b, then the normalized correlation may be defined as:

$$\frac{|h_a^H h_b|}{\sqrt{(h_a^H h_a)(h_b^H h_b)}}.$$

For example, if the received array response is highly correlated with those for the marker tags 2120 on a shelf 2210 (FIG. 25), as determined by a clustering algorithm, then one would estimate that the asset tag 2140 is on the shelf 2210.

Figure 30:
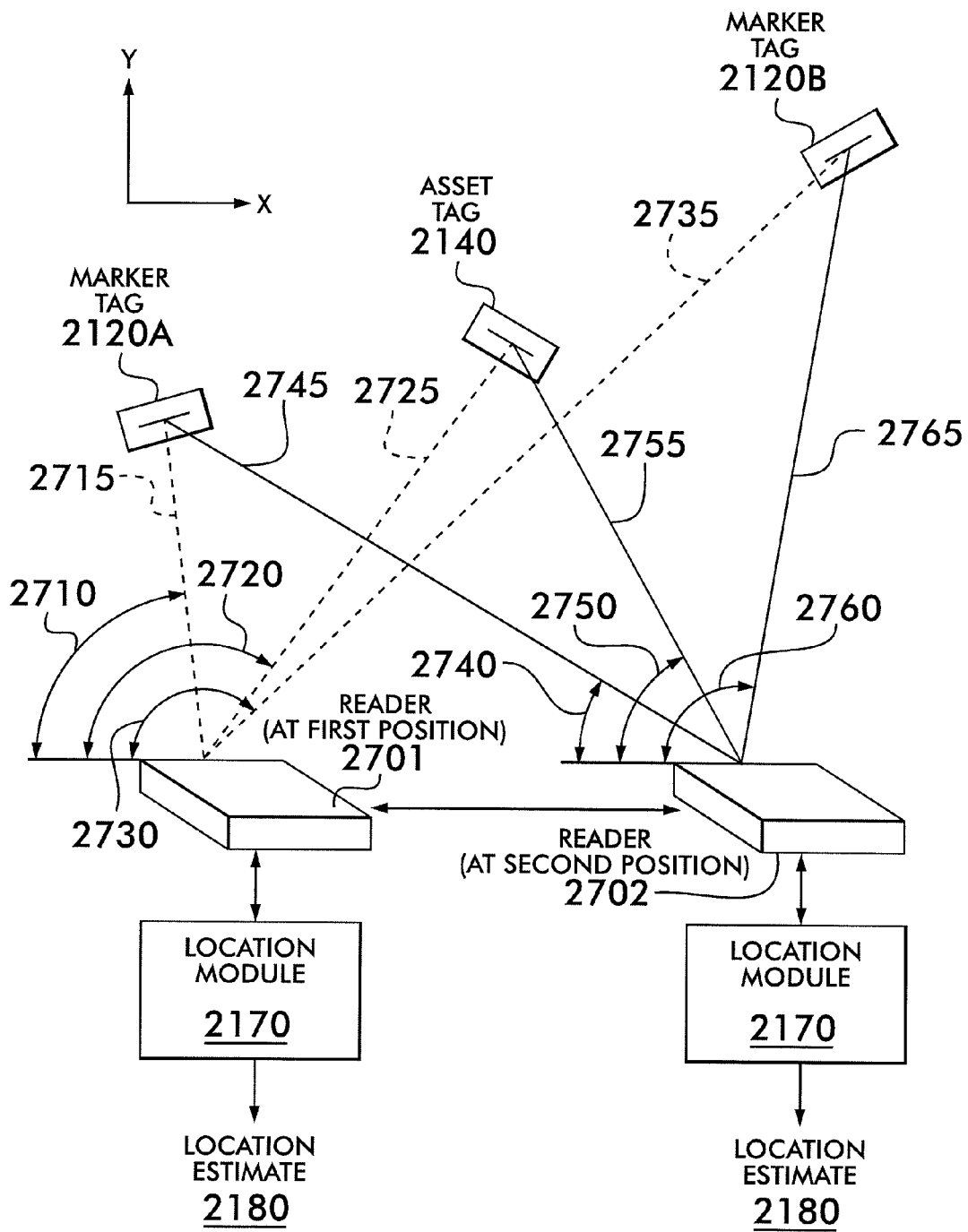
FIG. 30 illustrates a localizing system in a two-dimensional mobile reader configuration.
Figure 3I:
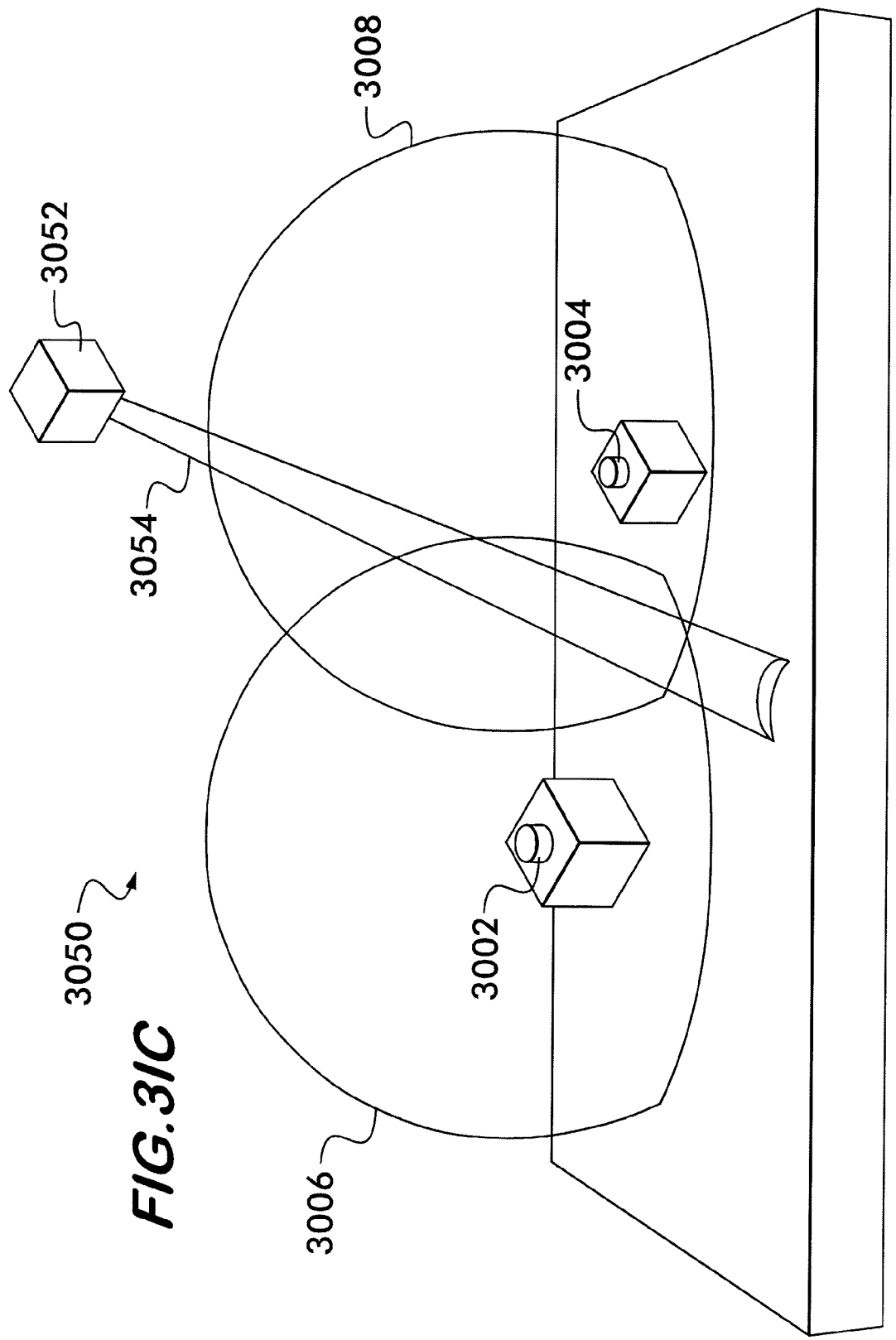
Figure 3D:
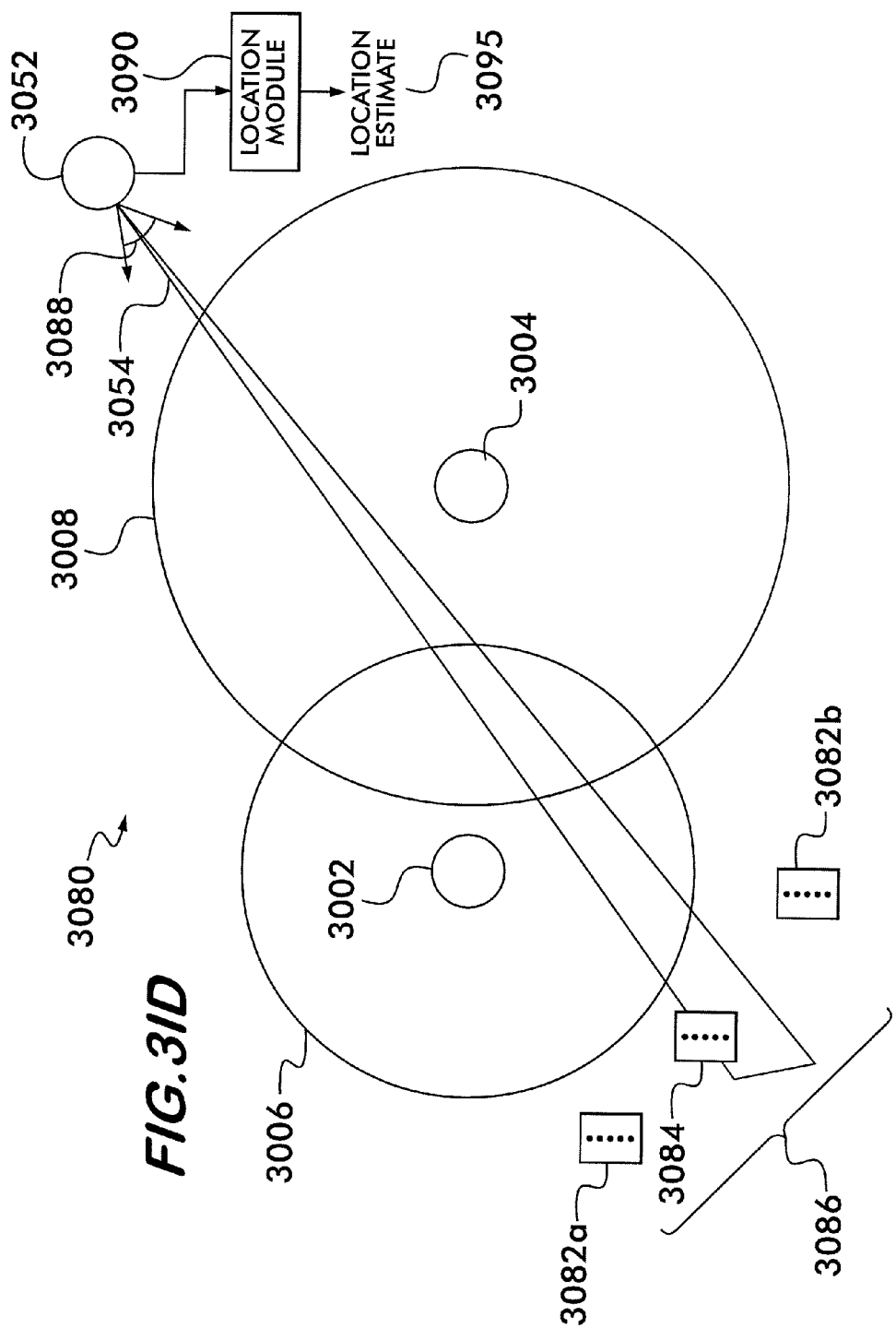

FIG. 30 illustrates a localizing system in a two-dimensional mobile reader configuration. In various embodiments, the reader 2701 may be mobile, i.e., the reader 2701 may be moved from a first position to a second position (indicated as reader 2702). A mobile reader configuration may used to take an inventory of asset tags 2140 over an entire store.

In the mobile configuration, reader 2110 may receive modulated backscatter signals from a plurality of marker tags 2120 and an asset tag 2140 using a reader 2701, where reader 2701 is an embodiment of reader 2110 at the first position. Then, the reader 2702 may receive modulated backscatter signals from the plurality of marker tags 2120 and the asset tag 2140, where reader 2702 is an embodiment of reader 2110 at the second position.

As illustrated in FIG. 30, an angle 2710 may be defined as an angle between the marker tag 2120A and an axis of reader 2701. Likewise, an angle 2720 may be defined between the asset tag 2140 and the axis of reader 2701, and an angle 2730 may be defined as an angle between the marker tag 2120B and the axis of reader 2701. Range 2715 is defined as the distance between the marker tag 2120A and the reader 2701. Likewise, range 2725 is defined as the distance between the asset tag 2140 and the reader 2701, and range 2735 is defined as the distance between the marker tag 2120B and the reader 2701.

Similarly, angles 2740 and 2760 may be defined from the marker tags 2120A and 2120B, respectively, and the axis of reader 2702. Angle 2750 may be defined from the asset tag 2140 and the axis of reader 2702. Likewise, ranges 2745 and 2765 may be defined from the marker tags 2120A and 2120B, respectively, and the reader 2702. Range 2755 may be defined as the distance from asset tag 2140 and reader 2702.

In one embodiment, estimated parameters of the modulated backscatter signals received from marker tags 2120A and 2120B include the angles 2710 and 2730 (with respect to the axis of reader 2701), and angles 2740 and 2760 (with respect to the axis of reader 2702). In this embodiment, the estimated parameters of the modulated backscatter signals received from the asset tag 2140 include the angles 2720 and 2750.

Since the positions of the marker tags 2120A and 2120B are known, the location module 2170 may provide the location estimate 2180 for the asset tag 2140 using the locations of marker tags 2120A and 2120B, the angles 2710, 2720, 2730, 2740, 2750, 2760, and geometry, by first estimating the locations of the reader 2701 and the reader 2702. The location of the reader 2701 can be estimated using the locations of the marker tags 2120A and 2120B, the angles 2710 and 2730, and simple geometric calculations. The location of the reader 2702 can likewise be estimated.

The location module 2170 may provide the location estimate 2180 for the asset tag 2140 as follows: denote $(x_1, y_1)$ the location of marker tag 2120A, $(x_2, y_2)$ the location of marker tag 2120B, $\theta_1$ the angle 2730, and $\theta_2$ the angle 2710. Then, the location $(a_1, b_1)$ of reader 2701 can be estimated by solving the following equations:

$$\frac{y_1 - b_1}{a_1 - x_1} = \tan\theta_1, \quad \frac{y_2 - b_1}{x_2 - a_1} = \tan\theta_2.$$

The location module 2170 may estimate the location of the reader 2702 using the locations of the marker tags 2120A and 2120B, the angles 2740 and 2760, and similar geometric calculations.

Subsequently, the location of the asset tag 2140 may be estimated using the estimates of the locations of the readers 2701 and 2702, the angles 2720 and 2750, and similar geometric calculations. Although FIG. 30 is shown in two dimensions for simplicity, the location of the asset tag 2140, reader 2701 and reader 2702 may also be estimated in three dimensions using similar geometrical calculations generalized to three-dimensions.

In various embodiments, estimated parameters of the modulated backscatter signals received from marker tags 2120A and 2120B include the ranges 2715 and 2735 (to reader 2701) and ranges 2745 and 2765 (to reader 2702). In these embodiments, the estimated parameters of the modulated backscatter signals received from the asset tag 2140 include the ranges 2725 and 2755.

Since the positions of the marker tags 2120A and 2120B are known, the location module 2170 may provide the location estimate 2180 for the asset tag 2140 using, for example, the locations of marker tags 2120A and 2120B, the ranges 2715, 2725, 2735, 2745, 2755, 2765, and geometry. By first estimating the locations of the reader 2701 and the reader 2702, the location of the asset tag 2140 may be estimated. The location of the reader 2701 can be estimated using the locations of the marker tags 2120A and 2120B, the ranges 2715 and 2735, and geometric calculations. The location of the reader 2701 may be likewise estimated.

The location module 2170 may estimate the location of an asset tag 2140 as follows: denote by $(x_1, y_1)$ the location of marker tag 2120A, $(x_2, y_2)$ the location of marker tag 2120B, $r_1$ the range 2715, and $r_2$ the range 2735. Then, the location $(a_1, b_1)$ of reader 2701 can be estimated by solving the following equations:

$$(a_1-x_1)^2+(b_1-y_1)^2=r_1^2, (a_1-x_2)^2+(b_1-y_2)^2=r_2^2.$$

There are two possible solutions, corresponding to the two intersections of circles of radius $r_1$ and $r_2$ centered at the marker tags 2120A and 2120B, respectively. (If the circles do not intersect, then there is no solution to the preceding equation.) The solution that corresponds to the location of the reader 2701 can be determined based on, for example, by knowing which side of the marker tags 2120A and 2120B the reader 2110 is on.

The location module may estimate the location of the reader 2702 using the locations of the marker tags 2120A and 2120B, the ranges 2745 and 2765, and similar geometric calculations. Subsequently, the location estimate 2180 of the asset tag 2140 may be estimated using the estimates of the locations of the readers 2701 and 2702, the ranges 2725 and 2755, and similar geometric calculations. The location of the asset tag 2140, reader 2701 and 2702 may also be estimated in three dimensions using geometry.

In various embodiments, the estimated parameters of the modulated backscatter signals received from marker tags 2120 and/or asset tag 2140 are received array responses. In an environment with multipath propagation, location module 2170 may provide the location estimate 2180 for the marker tags 2120 and/or asset tag 2140 using the received array responses and may use prior knowledge of, or models of, the multipath environment. For example, if the multipath environment consists primarily of a line-of-sight path and a ground reflection, as illustrated in FIG. 29, then a ML or Bayesian approach may be used for estimating the locations of the reader 2110 (e.g., reader 2701 and reader 2702), marker tags 2120 and asset tag 2140 by taking into account the complex gains associated with each path.

With reference to FIG. 31A, there is shown a configurable monitoring device system 3000. The configurable monitoring device system 3000 is suitable for beamforming and localization of devices in tag communications systems including tag communications systems having configurable monitoring devices, according to an embodiment of the system and method of the invention. The configurable monitoring device system 3000 can include configurable monitoring devices 3002, 3004. The configurable monitoring devices 3002, 3004 can be configured to operate as beacons 3002, 3004, each having a plurality of signal ranges. Additionally, the configurable monitoring device system 3000 can include any number of configurable monitoring devices configured to operate as any other types of nodes. For example, six configurable monitoring devices can be configured to operate as tags 3012a-f within the configurable monitoring device system 3000. While the configurable monitoring device system 3000 is shown in two-dimensions, it will be understood that it can be extended into three-dimensions.

When the tags 3012a-f are within the areas reached by the signals from the beacons 3002, 2004 they can respond to the beacon signals in a conventional manner, for example by backscatter. The response of the tags 3012a-f to the beacon signals from the configurable monitoring devices 3002, 3004 can be reported to an information gathering node. For example they can report to the monitoring terminal 62, by way of a gateway node 64, as previously described with respect to the monitoring system 60 shown in FIG. 1. The response of the tags 3012a-f to the beacon signals can be reported to the information gathering node by way of a mesh of tags 68a-i, by way of communications routing or tag locating nodes 66, directly to reader modules, as also shown in FIG. 1, or by any other method.

In an illustrative case, each beacon 3002, 3004 can have two signal ranges, a weak, short range and a strong, long range. The radius 3006 of the weak signal from the beacon 3002, and the radius 3008 of the strong signal from the beacon 3004 are illustrated in FIG. 31A. As shown, the tags 3012a,e,f are not in the range of the weak signal from the beacon 3002. Thus, the tags 3012a,e,f do not respond to the signal from the beacon 3002, and the monitoring terminal 62 of the monitoring system 60 can determine that items tagged with the tags 3012a,e,f are not within the radius 3006 of the beacon 3004 from the lack of such response.

Additionally, as illustrated in FIG. 31A, the tags 3012b,c,d are within the radius 3006 of the beacon 3002, and they do respond to the signal from the beacon 3002. Therefore, the monitoring terminal 62 within the monitoring system 60 can determine that items having the tags 3012b,c,d are within the radius 3006 of the beacon 3002, based on the information it receives from the signals transmitted by the beacon 3002 in the configurable monitoring device system 3000.

Accordingly, useful localization information with respect to items tagged with the tags 3012a-f can be obtained by the monitoring terminal 62 using the signals provided by the beacon 3002. However, based on the information whether the tags respond to the signal from the beacon 3002, it is only possible to determine whether the tags 3012a-f are inside the radius 3006 or outside the radius 3006. It is not possible to determine where inside the radius 3006 or where outside the radius 3006 they are located.

In the same manner, the monitoring terminal 62 can determine that the tags 3012a,b,f are not within the radius 3008 of the beacon 3004, and that the tags 3012c,d,e are within the radius 3008. However, based on this information alone, it is only possible to determine whether the tags 3012a-f are inside the radius 3008 or outside the radius 3008. It is not possible to determine where inside or outside the radius 3008 they are located based on this information.

By performing logical or arithmetic operations on the data from the two beacons 3002, 3004, additional localization of some of the tags 3012a-f can be performed. For example, since the tags 3012c,d are within both radius 3006 and radius 3008, a determination can be made that they are somewhere in the region 3010, where the ranges of the beacons 3002, 3004 overlap with each other. Any number of additional beacons can be provided in order to further localize the configurable monitoring devices of the invention in this manner. Furthermore, the beacons 3002, 3004 are understood to be any configurable monitoring devices or other tag communication device that can transmit radio frequency signals at the desired power levels and at the desired times.

Determinations can be made which tags 3012a-f are within each range of each beacon as the beacons cycle through their multiple power levels. For example, a tag 3012a-f can be located within the radius of the strong signal from a beacon, but not within the radius of the weak signal from the same beacon. Under these circumstances the tag 3012a-f can be localized to a donut shaped region around the beacon in the two-dimensional case. Logical or arithmetic operations can be performed on all of the range information obtained using the foregoing techniques.

Additionally, as previously described, the various nodes of a mesh system formed by the configurable monitoring devices of the invention can communicate with each other directly. For example, the tags 3012a,b are close enough to communicate with each other as shown by the arrow 3014. Thus, using tag to tag communication, tag 3012a can communicate by way of the mesh that it can receive a communication from tag 3012b, or tag 3012b can communicate by way of the mesh that it can receive a communication from tag 3012a, or both. Alternately, the tags 3012a,b can communicate this information in a different manner. Since the tags 3012a,b can communicate with each other, they can thus provide the monitoring terminal 62 with information that they are within range of each other.

Logical or arithmetic operations can be performed on information regarding communications such as the communications between the tags 3012a,b, of a mesh system, along with the information whether the tags 3012a-f are within the various signal ranges of the beacons 3002, 3004. These operations can permit a determination to be made, for example, that the tag 3012a is outside the radius 3006 of the beacon 3002, but within the range of the tag 3012b, thereby providing some further localization information for the tags 3012a,b. The information that the tags 3012a,b are within range of each other can be reported to the information gathering node, such as the monitoring terminal 62, by way of the mesh of tags 68a-i, the communications routing or tag locating nodes 66, directly to reader modules, or by any other method.

With reference to FIGS. 31B-C, there are shown two-dimensional and three-dimensional representations, respectively, of a configurable monitoring device system 3050. The configurable monitoring device system 3050 is suitable for beamforming and localization of configurable monitoring devices according to an embodiment of the system and method of the invention. The configurable monitoring device system 3050 can include the elements of the configurable monitoring system 3000, with the addition of a configurable monitoring device 3052. In a preferred embodiment of the invention the configurable monitoring device 3052 can include a collocated reader module and beamformer module having any number of beamformer nodes to provide a reader/beamformer 3052. Accordingly, calculations of power, phase and modulated data can be performed for any number of channels and any number of array elements within the beamformer module provided within the reader/beamformer 3052. In another preferred embodiment, the reader and the beamformer modules may be provided as separate devices.

Using the beamforming techniques of the invention, the beamformer module within the reader/beamformer 3052 can generate a radio frequency identification signal 3054, as previously described with respect to the radio frequency identification signal 1160 shown in FIG. 14. The radio frequency identification signal 3054 can be used to provide further localization information for localizing the tags 3012a-f. The further localization information obtained using the radio frequency identification signal 3054, such as angle of arrival information, time of flight information, phase information, etc. can be combined with the localization information obtained by the configurable monitoring system 3000, to further localize the tags 1012a-f. For example, the radio frequency identification signal 3054 can be used to narrow the location of the tag 3012d from anywhere in the region 3910 to the region 3056. Thus, it will be understood that when a tag such as the tag 3012d is localized in this manner, the range information and the angle information used to localize it can be represented by backscatter signals from at least two different sources of electromagnetic signals, in this case a beacon 3002, 3904 and the reader/beamformer 3052.

Furthermore, logical or arithmetic operations can be performed on any information or sets of information obtained by the configurable monitoring device systems 3000, 3050, 3080 (described below) in order to further localize the configurable monitoring devices. For example, angle of arrival information or phase angle information can be logically or arithmetically combined with distance information regarding the distance between a tag and one or more beacons or readers. The angle of arrival information or phase angle information with respect to marker tags and/or asset tags can be combined with distance information regarding the distance between two or more communicating configurable monitoring devices in a mesh. Power information can be combined with distance information, etc. The distance information can be communicated to an information gathering node by way of the mesh or any other paths.

As previously described, the beamformer module within the reader/beamformer 3052 can receive control radio frequency information from the reader module for controlling the beamforming operations. Selected configurable monitoring devices 3012a-f within the configurable monitoring device system 3050 can be configured to operate as calibration modules, or calibration nodes for calibrating the beamformers of the reader/beamformer 3052. For example, selected devices 3012a-f can be configured to operate as calibration modules 1140, as described above with respect to the interrogation zone 1170. The control radio frequency information from the reader module can thus be based on calibration data radio frequency information received from calibration modules and tags within the interrogation zone of the reader module.

In various embodiments, the reader module may communicate with the beamforming module within the reader/beamformer 3052 via beamforming control radio frequency connections, hardwired connections, or both. A configurable monitoring device 3012a-f, configured as a calibration module within the interrogation zone, can measure the net received signal from the beamforming module via the radio frequency identification signal, and communicate with the reader module to report the measurements of the received signal.

A control feedback control loop is thus formed comprising one or more of the calibration modules, the reader module, and the beamforming module within the reader/beamformer 3052. The control feedback loop is used to adjust the power and phase of the radio frequency identification signal from the beamformer module, so as to increase the strength and/or signal-to-noise ratio of the radio frequency identification signal received at the calibration node.

As previously described with respect to the beamforming system 1200, the configurable monitoring device system 3050 can include a reader node, and a plurality of beamformer nodes. A plurality of beamforming control channel antennas and RFID channel antennas corresponding to the plurality of beamforming nodes are also included. Beamforming control hardwired connections and beamforming control radio frequency connections can also be included for the plurality of beamforming nodes. One or more calibration nodes, one or more RFID tags located in the interrogation zone, the calibration data radio frequency connection, the radio frequency identification data, and the radio frequency identification signal can also be included. The reader node may use any standard read/write protocols (e.g., governing the timing of acknowledgements, retransmissions, multiple-access arbitration) of a conventional RFID reader.

The calibration nodes take measurements of the radio frequency identification signals, such as net received power or signal-to-noise ratio, and relay feedback regarding this information back to the beamforming nodes, either directly or through the reader node. The beamformer feedback control loop is employed by the beamforming nodes to adapt the phases and/or transmitted power of the radio frequency identification signals to maximize the power or signal-to-noise ratio received by the calibration node, and hence any RFID tag circuitry in the interrogation zone.

In various embodiments, the beamforming feedback system may use any of a number of feedback control loop iterative algorithms. The feedback control loop algorithms maximize the quality of the net received signal at the calibration node, which may be determined by the net received power or the signal-to-noise ratio. The feedback control loop may provide a direct estimate of the average received power at the calibration node, and/or an estimate of both the power and phase evolution of the received signal. Alternatively, the feedback control loop may provide an estimate of the difference in received powers corresponding to different phase settings employed by the beamforming nodes. The feedback control loop can be employed for adaptation of a centralized antenna array.

Any algorithm that is used in such centralized settings can be employed in a distributed setting as well, as long as the beamforming weight $w_i$ for the ith array element depends on its prior values and on the feedback. In this case, the ith beamforming node becomes equivalent to the ith array element in a centralized adaptive antenna array. For example, the Mudumbai et al. algorithm may be applied as previously described, wherein the beamforming weight for the ith beamforming node, $w_i = e^{j\phi}$ is iteratively calculated after random perturbations of its phase. The received power P reported to the reader node by the control feedback loop control under these conditions, can be calculated and optimized.

With reference to FIG. 31D, there is shown a configurable monitoring device system 3080. The configurable monitoring device system 3080 is suitable for beamforming and localization of configurable monitoring devices configured as marker tags 3082a,b and asset tags such as the asset tag 3084 according to a preferred embodiment of the system and method of the invention.

The reader 3052 of the configurable monitoring device system 3080 may generate a electromagnetic signal represented by the beam 3054. Field of view (FOV) 3088 of the reader 3052 may represent the field of view for reception of the modulated backscatter signals received from the marker tags 3082a,b and/or the asset tag 3084. The FOV 3088 is shown in two-dimensions in FIG. 31D for simplicity, and may be extended to a three-dimensional field of view. A zone 3086 may be defined between the marker tag 3082a and the marker tag 3082b, as shown for simplicity in two dimensions in FIG. 31D. The asset tag 3084 falls within the zone 3086. In various embodiments, the zone 3086 may also be a three dimensional region (not shown). Thus, one or more marker tags 3082a,b may be used to define zones having two-dimensional and/or three-dimensional geometries for localizing asset tags such as the asset tag 3084.

In various embodiments, the reader 3052 includes one or more antennas (not shown) for transmitting electromagnetic signals to the marker tags 3082a,b and the asset tag 3084. Additionally, the reader 3052 can include one or more antennas or virtual antennas for receiving the modulated backscatter signals from the marker tags 3082a,b and the asset tag 3084. The reader 3052 may operate in one or more of the following modes: (i) single antenna transmission, multi-antenna reception; (ii) multi-antenna transmission, multi-antenna reception; and/or (iii) multi-antenna transmission, single antenna reception.

The marker tags 3082a,b and the asset tag 3084 can communicate with the reader 3052 using modulated backscatter signals. The reader 3052 receives modulated backscatter signals from the marker tags 3082a,b and the asset tag 3084, and estimates parameters of the modulated backscatter signals. An estimated parameter of a modulated backscatter signal received from a marker tag 3082a,b or an asset tag 3084 can include any measurable quantity, characteristic, or information determined and/or estimated from the modulated backscatter signal as previously described. The location of a marker tag 3082a,b may include an absolute location or a relative location in two-dimensional (x,y) coordinate space, or an absolute or relative location in three-dimensional (x,y,z) coordinate space.

The location module 3090 may provide a location estimate 3095 of the asset tag 3084 by having the reader 3052 read (e.g., receive modulated backscatter signals from) one or more of the marker tags 3082a,b and the asset tag 3084 in the FOV 3088 of reader 3052. The location estimate 3095 may be an absolute or a relative location estimate of an asset tag 3084a,b. It may provide a determination that the asset tag 3084 is included in the zone 3086. It may also provide a probabilistic estimate of the absolute or relative location of asset tag 3084, and/or it may provide a probabilistic estimate whether the asset tag 3084 is included in the zone 3086. For example, when the reader 3052 reads the asset tag 3084, the location module 3090 may compare the location of asset tag 3084 to the location of the marker tags 3082a,b, and provide the location estimate 3095, including the determination that the zone 3086 includes the asset tag 3084. Furthermore, the location information obtained in this manner may be logically combined with the location information obtained according to the responses of various configurable monitoring devices to the beacon signals of the beacons 3002, 3004 and communications between the nodes of the mesh, as described above.

The marker tag 3082a may be positioned at one end of a shelf, and the marker tag 3082b at the other end of the shelf. A zone may be defined as the region on the shelf between the two shelf marker tags 3082a,b. In this application, the location module 3090 may provide the location estimate 3095 that includes whether the asset tag 3084 is on the shelf. In another application, a zone including a dock door may be defined by a radius from a marker tag 3082a,b located at the dock door. The reader 3052 may then receive modulated backscatter signals from an asset tag 3084 that is passing through the dock door. Determining that the asset tag 3084 is passing through the dock door may be based on a location estimate 3095 that the asset tag 3084 is within a radius from marker tag 3082a,b.

The transmitter beamforming system within the reader/beamformer 3052 comprises phase locked loops, phase shifters, modulators, antennas, clock, transmit beamforming modules, transmit data and marker tag feedback. In another embodiment (not shown) the beamformer and the reader can be provided as separate devices rather than being collocated. Each of the antennas may be an individual antenna, or an antenna element. Transmitter beamforming uses two or more antennas to direct the transmitted beam to a certain region in space. In various embodiments of the invention, the system can include transmitter beamforming capability which enables the reader to select where to direct the energy of its beam.

For N antenna elements the transmitted signal $u_i(t)$ from the ith antenna, i=1, ..., N, is given by $w_i$ s(t), where $w_i$ is a complex gain termed the ith beamforming coefficient, and s(t) is the signal (in general, complex-valued) to be transmitted. In a vector format, $$u(t)=(u_1(t),\ldots,u_N(t))^T,$$

$$w=(w_1,\ldots,w_N)^T, \text{ and}$$

$$u(t)=ws(t).$$

If the signal s(t) is narrowband, the channel gain from the ith transmit element to the tag can be modeled as $h_i$. Defining the channel vector $$h=(h_1,\ldots,h_N)^T,$$

the received signal at the tag can be modeled as:

$$y(t)=h^T ws(t)+n(t),$$

where n(t) denotes noise.

The modulated backscattered signal from a tag therefore has power proportional to $(h^T w)^2$. The channel vector h depends on the location of the tag relative to the antennas. If the antennas are a linear array spaced by d, the channel vector for a tag at an angle θ relative to the broadside is:

$$a(\theta)=(1,\alpha,a^2,\ldots,\alpha^{N-1})^T,$$

where $\alpha=\exp(j2\pi d \sin \theta/\lambda)$, and λ is the carrier wavelength. The strength of the signal from the tag is related to the location of the tag relative to the reader.

The location estimate 3095 can be obtained as follows. A main lobe of the transmit beam may be scanned through a region. The beam is electronically steered using an array of antennas to control the relative phases and amplitudes of the signals transmitted from the antennas. The strength of the signal from the marker tags 3082a,b as a function of the scan angle may be provided to the marker tag feedback module and to the location module 3090. Using this information, including the angle of arrival of the modulated backscatter signals received from the marker tags 3082a,b, the location estimate 3095 can be estimated. Accordingly, the configurable monitoring device system 3080, configured to include a reader/beamformer can use information, such as angle and phase information, to determine whether a tag, such as the asset tag 3084, is located in a zone between marker tags. This information can be combined with location information obtained according to the responses of various configurable monitoring devices to the beacon signals of the beacons 3002, 3004 as previously described in order to further localize tags.

Figure 32:
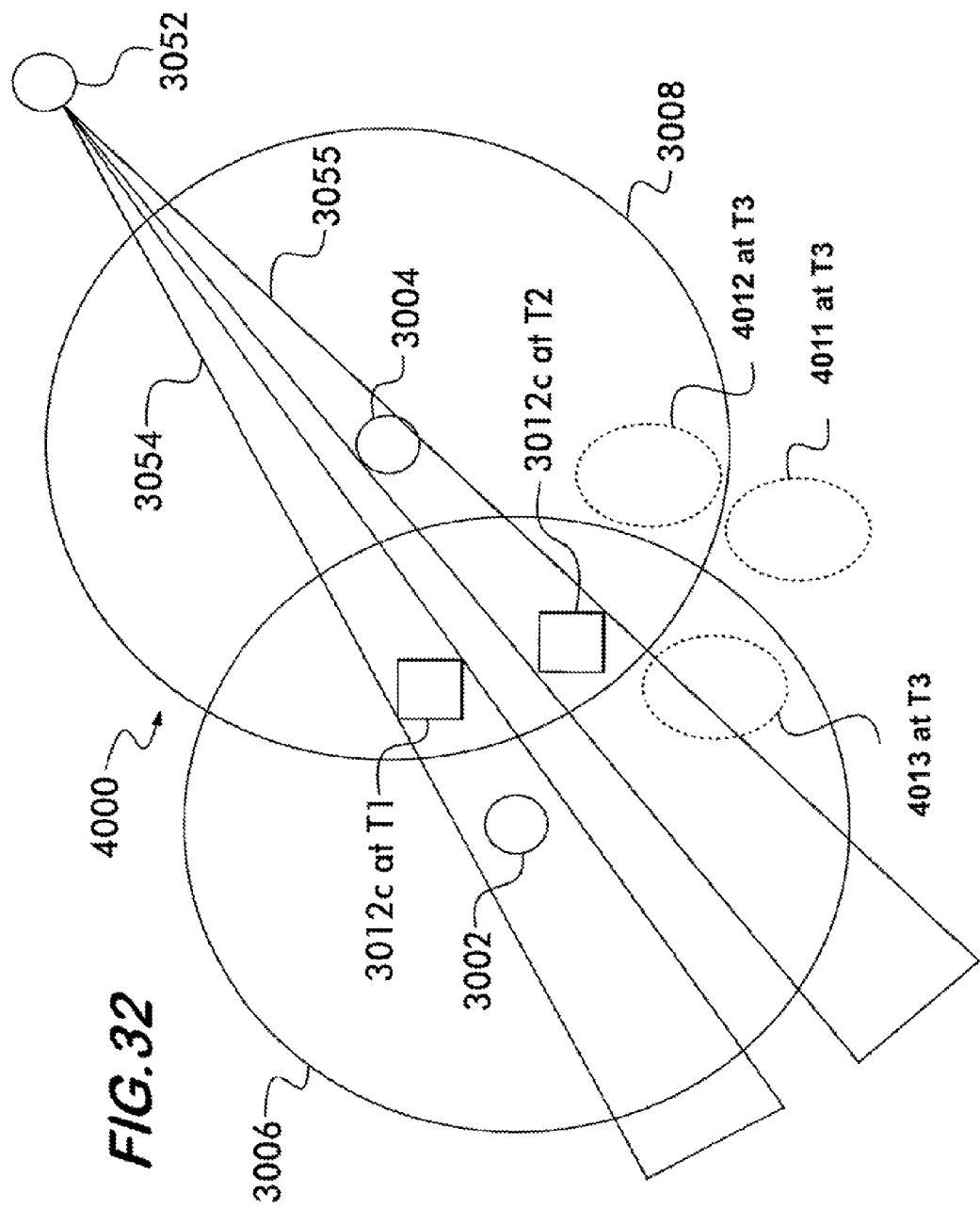
FIG. 32 illustrates an embodiment of the configurable monitoring system of the invention.

With reference to FIG. 32, there is shown a two dimensional representation of a configurable monitoring device system 4000 similar to system 3050 as described above. The radio frequency identification signal 3054 can be used in combination with a second radio frequency identification signal 3055 to provide vector information for localizing the tag 3012c. The further vector information may be obtained by comparing the radio frequency identification signals 3054 and 3055 attributes, such as angle of arrival information, time of flight information, phase information, etc., to compute a velocity and/or direction of movement of the tag 3012e between the time T1 that the responses to the radio frequency identification signal 3054 is received by reader/beamformer 3052 and the time T2 radio frequency signal 3055 is received by reader/beamformer 3052.

The vector information can be used in a variety of ways to infer that possible future locations of tag 3012c are more or less probable. For example, rules about the motion of tags can be devised a priori or by empirical observations of actual store operations, shopping, and theft events. Such rules could depend on the context in which the tag 3012c is situated. For instance, it could be inferred that a tag moving slowly along a shopping aisle is being moved, by a shopper, and therefore is likely that to continue to move slowly and eventually be brought to a store point-of-sale such as a cash register location. Similarly, in an open store floor plan, a tag in motion may be assumed that a to in motion is 50% likely to continue in the observed direction of motion, and 25% likely to mm left, and 25% likely to turn right.

Referring to FIG. 32, there are shown three likely locations for tag 3012c at a time T3 after vector information is obtained. For purposes of illustration, the system may be configured to place a 50% likelihood that the tag 3012c continued moving as observed at T2 and is therefore now in region 4011. It is 25% likely that it turned left and is now in region 4012, and 25% likely that it turned right and is in region 4013.

If the system next receives the information at T3 that tag 3012c is within range of beacon 3004, it can be inferred that the location of tag 3012c is most likely within region 4012. This inference can be drawn from a combination of the prior location information, prior vector information, and rules regarding the probable motion of tags. It is not necessary to obtain another reading from reader/beamformer 3052 or other system components before drawing the inference.

The embodiments discussed herein are illustrative of the present invention. As these embodiments are described with reference to illustrations, various modifications or adaptations of the specific elements or methods described may become apparent to those skilled in the art. All such modifications, adaptations, or variations that rely on the teachings of the present invention, and through which these teachings have advanced the art, are considered to be in the spirit and scope of the present invention. Hence, these descriptions and drawings should not be considered in a limiting sense, as it is understood that the present invention is in no way limited only to the embodiments illustrated.

What is claimed is:

1. A system for radio frequency identification of a tag in an interrogation zone, comprising:
    a calibration node disposed in the interrogation zone to measure a signal strength of radio frequency identification signals from a beamforming system and provide signal data in accordance with the signal strength; and
    a reader node configured to receive the signal data and adjust the radio frequency identification signals generated by the beamforming system based upon the signal data, wherein at least one of the calibration node, the reader node and the beamforming system is a configurable monitoring system.

2. The system of claim 1, wherein the calibration node, the reader node, and the beamforming system are coupled in a feedback control loop.

3. The system of claim 2, wherein the beamforming system further comprises a plurality of beamforming nodes.

4. The system of claim 3, wherein a signal of at least one beamforming node is optimized in accordance with the feedback control loop.

5. The system of claim 3, wherein a signal to noise ratio of at least one beamforming node is optimized in accordance with the feedback control loop.

6. The system of claim 3, wherein a phase of at least one beamforming node is optimized in accordance with the feedback control loop.

7. The system of claim 3, wherein the plurality of beamforming nodes form a one dimensional beamforming array.

8. The system of claim 3, wherein the plurality of beamforming nodes form a two dimensional beamforming array.

9. The system of claim 1, including a plurality of tags arranged in a mesh with tag to tag communication between at least two of the tags in the mesh.

10. The system of claim 9, wherein a tag within the interrogation zone is localized in accordance with range data based on the tag to tag communication.

11. The system of claim 9, wherein a tag within the interrogation zone is localized in accordance with a combination of the signal data and range data based on the tag to tag communication.

12. The system of claim 9, wherein a tag within the interrogation zone is localized in accordance with the signal data and a beacon signal provided within the interrogation zone.

13. The system of claim 12, wherein the beacon signal has multiple ranges for providing multiple range determinations to localize the tag by performing a logical operation on the multiple range determinations.

14. The system of claim 12, wherein the beacon signal is provided by a configurable monitoring device configured as a beacon.

15. The system of claim 9, wherein the signal data is transmitted to the reader node by way of the tag, to tag communication.

16. The system of claim 9, wherein the signal data is transmitted to the reader node by way of network activity nodes.

17. The system of claim 9, wherein the signal data is transmitted to the reader node by way of a gateway node.

18. The system of claim 1, wherein the beamformer system receives the signal data and adjusts the radio frequency identification signals based on the signal data.

19. The system of claim 18, wherein the beamformer system receives the signal data by way of a control radio frequency connection.

20. The system of claim 18, wherein the beamformer system receives the signal data by way of a hardwired connection.

* * * * *